US 6,538,591 B2

(12) United States Patent
Sato et al.

(10) Patent No.: US 6,538,591 B2
(45) Date of Patent: Mar. 25, 2003

(54) SIGNAL TRANSFER APPARATUS, AND IMAGING APPARATUS AND RADIATION IMAGE PICK-UP SYSTEM USING IT

(75) Inventors: Toshiaki Sato, Shizuoka (JP); Noriyuki Kaifu, Tokyo (JP); Masakazu Morishita, Kanagawa (JP); Shin Kikuchi, Kanagawa (JP); Eiji Shirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,711

(22) Filed: Sep. 7, 2001

(65) Prior Publication Data
US 2002/0050940 A1 May 2, 2002

(30) Foreign Application Priority Data

Sep. 7, 2000 (JP) .......................... 2000/271952
Oct. 6, 2000 (JP) .......................... 2000/308076
Sep. 5, 2001 (JP) .......................... 2001/268965

(51) Int. Cl.$^7$ .............................................. H03M 1/12
(52) U.S. Cl. ...................................................... 341/155
(58) Field of Search .......................... 341/155; 358/482, 358/463

(56) References Cited

U.S. PATENT DOCUMENTS

| 4,745,488 | A | | 5/1988 | Kaifu et al. ................. 358/294 |
|---|---|---|---|---|
| 4,875,099 | A | * | 10/1989 | Sakai et al. .............. 358/213.11 |
| 4,926,058 | A | | 5/1990 | Iwamoto et al. ......... 250/578.1 |
| 5,060,040 | A | | 10/1991 | Saika et al. .................... 357/30 |
| 5,233,442 | A | | 8/1993 | Kawai et al. ................. 358/482 |
| 5,272,548 | A | | 12/1993 | Kawai et al. ................. 358/482 |
| 5,317,406 | A | | 5/1994 | Kobayashi et al. ......... 348/307 |
| 5,335,094 | A | | 8/1994 | Kaifu et al. ................. 358/494 |
| 5,493,423 | A | * | 2/1996 | Hosier ........................ 358/482 |
| 5,737,095 | A | | 4/1998 | Kikuchi et al. ............. 358/475 |
| 5,812,109 | A | | 9/1998 | Kaifu et al. ................. 345/104 |
| 5,812,284 | A | | 9/1998 | Mizutani et al. ............ 358/482 |
| 5,841,180 | A | | 11/1998 | Kobayashi et al. ......... 257/448 |
| 5,914,485 | A | | 6/1999 | Kobayashi et al. ...... 250/208.1 |
| 6,034,406 | A | | 3/2000 | Kobayashi et al. ......... 257/435 |
| 6,127,684 | A | | 10/2000 | Kaifu .................... 250/370.09 |
| 6,144,466 | A | | 11/2000 | Mizutani et al. ............ 358/482 |
| 6,191,411 | B1 | | 2/2001 | Kaifu ...................... 250/214 R |
| 6,245,601 | B1 | | 6/2001 | Kobayashi et al. ......... 438/155 |
| 6,295,390 | B1 | | 9/2001 | Kobayashi et al. ......... 382/313 |
| 6,297,493 | B1 | | 10/2001 | Kobayashi et al. ..... 250/214 R |
| 6,300,615 | B1 | | 10/2001 | Shinohara et al. ...... 250/214 R |

FOREIGN PATENT DOCUMENTS

JP    62-202684    9/1987
JP    9-307698    11/1997

* cited by examiner

Primary Examiner—Peguy JeanPierre
(74) Attorney, Agent, or Firm—Fitzpatrick, Cella, Harper & Scinto

(57) ABSTRACT

A signal transfer apparatus of high S/N ratio and high read speed suitable for use in photoelectric conversion circuit units with a large pixel count and an imaging apparatus and radiation image pick-up system. The signal transfer apparatus, comprises a plurality of terminals connected to a plurality of signal sources, and a read circuit unit for converting signals received from the terminals into series signals and outputting the resulting series signals. The read circuit unit comprises first operational amplifiers connected to the terminals, and second operational amplifiers for receiving outputs of the first operational amplifiers. And each of the first operational amplifiers comprises an inverting input terminal connected to each of the terminals, an output terminal with an integral capacitor and switch being connected in parallel between it and the inverting input terminal, and a non-inverting input terminal supplied with a reference voltage.

48 Claims, 34 Drawing Sheets

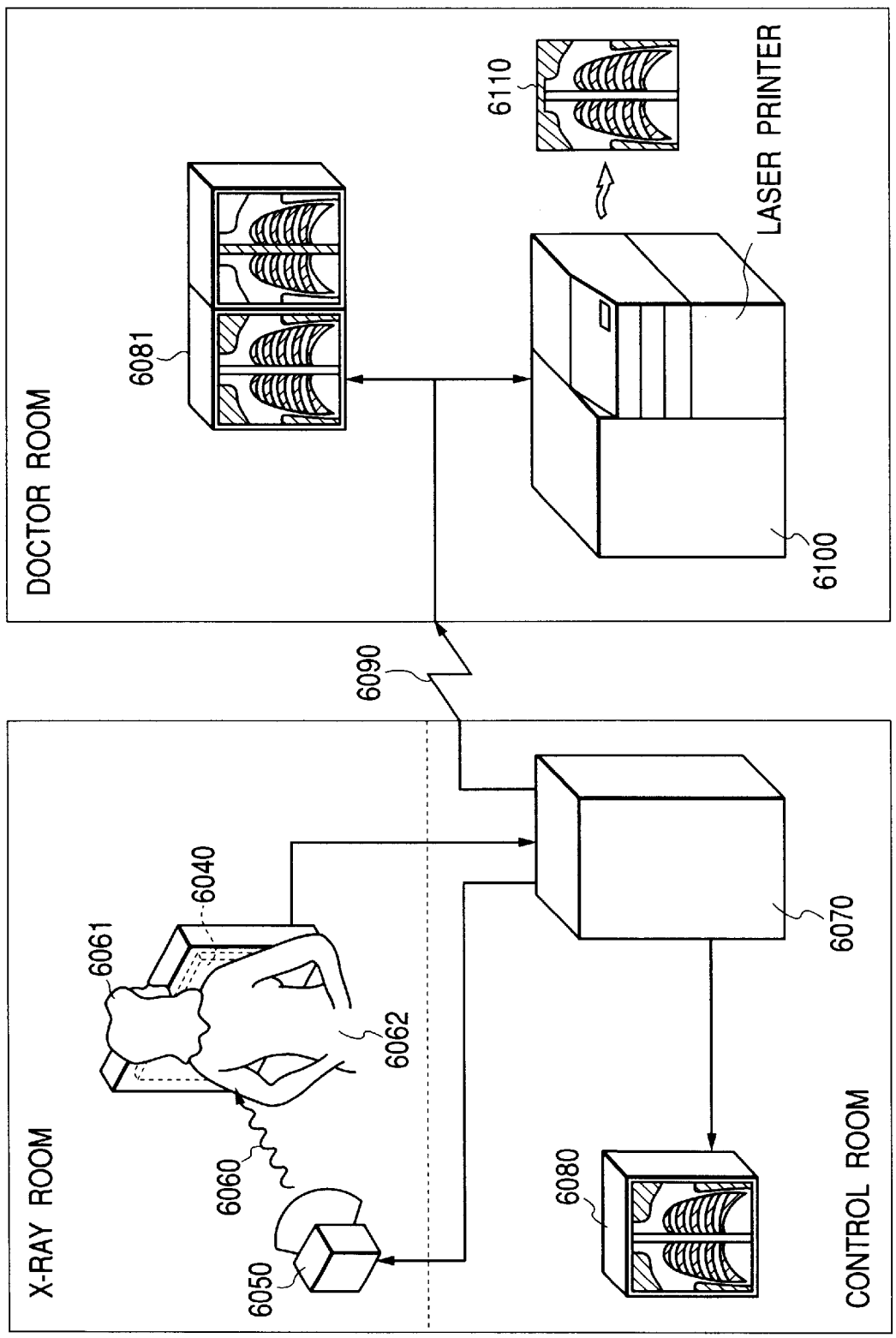

SIGNAL TRANSFER APPARATUS, AND IMAGING APPARATUS AND RADIATION IMAGE PICK-UP SYSTEM USING IT

BACKGROUND OF THE INVENTION

1. Field of the Invention

The present invention relates to a signal transfer apparatus, imaging apparatus and radiation image pick-up system using it. More particularly, it is suitable to photoelectric conversion apparatus applicable as image input units of X-ray detectors for medical or non-destructive internal inspection as well as business machines such as copying machines and facsimile machines.

2. Related Background Art

Currently, the mainstream of radiation image pick-up apparatus used for medical diagnosis is a so-called film-based type which involves exposing a human body to radiation, converting the rays that passed through the human body into visible light by means of a phosphor, and exposing a film to it.

However, there is a growing demand for "digitization of X-ray image information" because of improved diagnostic efficiency achieved by immediacy in acquisition of image information, which is not possible with the conventional film-based type that requires a developing process, as well as because of ease of image transmission necessary for recording, management, and remote medical diagnosis. Recently, X-ray image pickup apparatus have been proposed which employ CCD solid-state image sensing devices or amorphous silicon devices instead of films.

FIG. 29 shows an example of two-dimensional photoelectric conversion apparatus applicable to X-ray image pickup apparatus, described in Japanese Patent Application Laid-Open No. 9-307698.

In FIG. 29, reference numeral 101 denotes a photoelectric conversion circuit unit; 110 denotes a light-receiving area which converts incident light into signal charges; 111 denotes interelectrode capacitance for storing the signal charges resulting from photoelectric conversion carried out by the light-receiving area 110; $S_{1-1}$ to $S_{3-3}$ denote photoelectric conversion elements, each comprising a light-receiving area 110 and interelectrode capacitance 111; M1, M2, and M3 denote matrix signal wirings; $T_{1-1}$ to $T_{3-3}$ denote switching elements for transferring the signal charges formed by the photoelectric conversion elements $S_{1-1}$ to $S_{3-3}$ to the matrix signal wirings M1, M2, and M3; G1, G2, and G3 denote gate drive wirings for driving the switching elements $T_{1-1}$ to $T_{3-3}$; and C1, C2, and C3 denote load capacitances of the matrix signal wirings M1, M2, and M3, respectively. Reference numeral 102 denotes a shift register serving as a gate line drive circuit unit for applying drive signals to the gate drive wirings G1, G2, and G3. Reference numeral 107 denotes a bias supply for the photoelectric conversion elements.

Reference numeral 103 denotes a read circuit unit for converting parallel signals transferred from the matrix signal wirings M1 to M3 into series signals and outputting the resulting series signals; $S_{RES1}$, $S_{RES2}$, and $S_{RES3}$ denote reset switches of the load capacitances C1, C2, and C3, respectively; CRES denotes a control signal applied to $S_{RES1}$, $S_{RES2}$, and $S_{RES3}$; A1 to A3 denote buffer amplifiers whose non-inverting input terminals are connected with the matrix signal wirings M1 to M3 and which convert the impedance of output signals received from the matrix signal wirings; Sn1 to Sn3 denote sampling switches for sampling the output signals outputted via the buffer amplifiers A1 to A3; SMPL denotes a voltage pulse applied to the sampling switches Sn1 to Sn3; $C_{L1}$ to $C_{L3}$ denote sampling capacitors; B1 to B3 denote buffer amplifiers whose non-inverting input terminals receive sampled output signals and which convert the impedance of the output signals; Sr1 to Sr3 denote read switches for reading the outputs of the buffer amplifiers B1 to B3 in sequence as series signals; 104 denotes a shift register serving as a switch drive circuit unit for reading; and 105 denotes an output buffer amplifier.

Reference numeral 106 denotes an A/D conversion circuit unit for converting analog signals into digital signals.

Incidentally, although a 9-pixel (3×3), two-dimensional photoelectric conversion apparatus is shown in FIG. 29 for the sake of simplicity, actual photoelectric conversion apparatus consist of more pixels depending on their applications.

FIG. 30 is a timing chart illustrating the operation of the photoelectric conversion apparatus shown in FIG. 29.

The signal charges resulting from photoelectric conversion by the photoelectric conversion elements $S_{1-1}$ to $S_{3-3}$ are stored in the interelectrode capacitances 111 in the photoelectric conversion elements for a certain period of time. Then, when a first voltage pulse for transfer is applied to the gate drive wiring G1 by the shift register 102 for a time t1, the switching elements $T_{1-1}$ to $T_{1-3}$ are turned on and the signal charges stored in the photoelectric conversion elements $S_{1-1}$ to $S_{1-3}$ in the first row are transferred, respectively, to the load capacitances C1, C2, and C3 of the matrix signal wirings M1, M2, and M3. The potentials V1, V2, and V3 of the load capacitances C1, C2, and C3 after the signal charges are transferred vary with the amount of signal charge. FIG. 30 shows a case in which the signal charges differ in amount from one another. The operation described so far is referred to as a transfer operation.

The signal charges in the matrix signal wirings M1 to M3 have their impedance converted, respectively, by the buffer amplifiers A1 to A3 in the read circuit unit 103. Then, the sampling switches Sn1 to Sn3 are turned on by the SMPL pulse shown in FIG. 30 for a time t2 and the signal charges are transferred to the sampling capacitors $C_{L1}$ to $C_{L3}$. This operation is referred to as a sampling operation.

Next, the read switches Sr1 to Sr3 are turned on in sequence each for a time t3 by read pulses Sp1 to Sp3 from the shift register 104. Consequently, the parallel signal charges transferred to the sampling capacitors $C_{L1}$ to $C_{L3}$ have their impedance converted by buffer amplifiers B1 to B3, respectively, are read out as series signals from the final output amplifier 105, and digitized by the A/D conversion circuit unit 106. This operation is referred to as a read operation.

Then, the load capacitances C1 to C3 are reset by the application of the control signal CRES to the reset switches $S_{RES1}$ to $S_{RES3}$ for a time t4 to prepare for a read operation of the next row. This operation is referred to as a reset operation.

Similarly, the gate drive wirings G2 and G3 are driven in sequence by the shift register 102 to read out all the pixel data of the photoelectric conversion elements $S_{2-1}$ to $S_{3-3}$.

The load capacitances C1 to C3 of the matrix signal wirings M1 to M3 shown in FIG. 29 actually consist of interelectrode capacitances (Cgs) formed at the intersections of gate electrodes of the switching elements $T_{1-1}$ to $T_{3-3}$ and electrodes on the signal lines M1 to M3. For example, the load capacitance C1 is given as the sum of the interelectrode capacitances (Cgs) of the three switching elements $T_{1-1}$, $T_{2-1}$, and $T_{3-1}$ connected to the signal line M1. The same applies to the load capacitances C2 and C3. Thus, if the pixel array of the two-dimensional photoelectric conversion circuit unit consists of m rows and n columns, the load capacitance Ci (i=1 to n) of the matrix signal wiring Mi (i=1 to n) is given by the following general formula:

$$Ci = Cgs \times m \quad (1)$$

The signal charges stored in the interelectrode capacitances 111 in the photoelectric conversion elements are transferred to the load capacitances Ci (i=1 to n) of the matrix signal wirings Mi (i=1 to n) through the transfer operation described above. If the interelectrode capacitance in the photoelectric conversion element is Cs and the signal charge is Qi, the potential Vi of the load capacitance Ci is given by:

$$Vi = Qi/(Cs+Ci) = Qi/(Cs+mCgs) \quad (2)$$

Since the potential Vs of the interelectrode capacitance Cs before the transfer is $$Vs = Qi/Cs \quad (3)$$

the signal voltage Vi after the transfer is lower by the load capacitance Ci of the matrix signal wiring. Depending on the size of the photoelectric conversion circuit unit 101, the load capacitance Ci has small impacts if Cgs itself is small in its own way and the pixel array is as small as 3×3 similarly to the example of FIG. 29. However, as the number of pixels increases, the impacts of the load capacitance Ci cannot be ignored. For example, the photoelectric conversion circuit unit of a medical radiation image pick-up apparatus for lungs should be approximately 40 cm×40 cm. If a pixel pitch of 100 micrometers is used, the number of pixels will be as huge as 16 million (4,000×4,000). Suppose Cs=3 pF and Cgs=0.05 pF, which are values generally used if amorphous silicon TFTs are used for the switching elements described in Japanese Patent Application Laid-Open No. 9-307698, the ratio of the potential Vs to the potential Vi is given by:

$$Vs:Vi = 1/Cs : 1/(Cs+4000Cgs) = 1:1/68 \quad (4)$$

It can be seen that the load capacitance is dominant. In this way, if the potential of signal charges is compressed by a transfer operation, the S/N ratio will be affected adversely in the subsequent read operation.

Specifically, if Vn denotes the voltage noise downstream of the sampling switches Sn1 to Sn3 in the read circuit unit 103 of FIG. 29 (Vn is expressed as the root mean square of the following noises: the thermal noise caused by the switch-on resistance of the sampling switches Sn1 to Sn3 and read switches Sr1 to Sr3, and the noise produced by the buffer amplifiers B1 to B3 and output amplifier 105), then the S/N ratio is given by Vi/Vn. Thus, it can be seen that the S/N ratio is degraded by approximately 36 dB as compared with the case when the signal voltage is not compressed during the transfer operation. Incidentally, in the read circuit unit 103, in addition to Vn described above, there are thermal noise caused by the switch-on resistance of the reset switches $S_{RES1}$ to $S_{RES3}$ and noise produced by the buffer amplifiers A1 to A3. However, they are omitted in the above discussion of the S/N ratio because they are equivalent to Vi.

A photoelectric conversion apparatus which can ameliorate the signal-to-noise problem is shown in FIG. 31.

In FIG. 31, reference characters R7 and R8 denote resistor elements, and D1 to D3 denote non-inverting amplifiers whose non-inverting input terminals are connected with the matrix signal wirings M1 to M3 and which amplify the output signals from the matrix signal wirings by an amplification factor G determined by the resistances R7 and R8.

Description of the components denoted by the same reference characters as those described above will be omitted.

FIG. 31 shows an example in which the photoelectric conversion circuit unit 101 consists of 9 pixels (3×3) as is the case with FIG. 29. The difference from the example of FIG. 29 is that the buffer amplifiers A1 to A3 connected to the matrix signal wirings M1 to M3 in the read circuit unit 103 have been replaced by non-inverting amplifiers D1 to D3 having the amplification factor G determined by the resistances R7 and R8.

Regarding S/N ratio again, the signal charges Qi resulting from photoelectric conversion are transferred to the load capacitances C1 to C3 of the matrix signal wirings M1 to M3. The potentials V1 to V3 of the load capacitances C1 to C3 here are given by Equation (2) similarly to the example of FIG. 29. In the example of FIG. 31, the signal voltages V1 to V3 of the load capacitances C1 to C3 connected to the non-inverting input terminals by the non-inverting amplifiers D1 to D3 are multiplied by G before being output. To generalize a two-dimensional photoelectric conversion apparatus with a pixel configuration of m rows×n columns, output voltage Vout is given by $$Vout = G \times Vi = G \times Qi/(Cs+Ci) \quad (5)$$
$$= G \times Qi/(Cs+mCgs) \, (i = 1n)$$

If the amplification factor G of the non-inverting amplifiers D1 to D3 is set, for example, as follows, $$G = 1+(R8/R7) = 1+(mCgs/Cs) \quad (6)$$

the output voltage Vout is given by Equation (7), which is equivalent to Equation (3).

$$Vout = Qi/Cs = Vs \quad (7)$$

By comparing Equation (7) with Equation (2), it can be seen that the problem of compressed signal voltage due to the transfer operation has been solved, resulting in improved S/N ratio. As the amplification factor G, the value shown in Equation (6) is used for the simplicity of explanation, but any value can be used as long as it satisfies G>1. Besides, it is evidently advantageous in terms of S/N ratio that the value of G is as large as possible.

However, the example of FIG. 29 above needs improvement in versatility if the read circuit unit is to be used in combination with a two-dimensional photoelectric conversion circuit unit with different pixel arrays. Specifically, if the read circuit unit 103 is used for two photoelectric conversion circuit units having the same photoelectric conversion elements and equal photoelectric conversion efficiency (generating equal signal charges Qi for the same quantity of light), but different pixel arrays, i.e., k rows×l columns and m rows×n columns, it will produce two different output voltages—high and low—as shown below, respectively, according to Equation (5) due to the different load capacitances of the matrix signal wirings:

$$Vout = G \times Qi/(Cs+kCgs) \quad (8)$$
$$Vout' = G \times Qi/(Cs+mCgs) \quad (9)$$

This means the following: conventional film-based X-ray image pick-up apparatuses, for example, are very versatile, providing a constant dynamic range and S/N ratio if film sensitivity and X-ray dosage are constant even if film size is changed according to the region to be photographed, but it is necessary to provide a dedicated read circuit unit with an appropriate fixed amplification factor G for each of machines with different pixel arrays or provide a circuit for setting an amplification factor G for each machine because the performance of photoelectric conversion apparatus varies with the machine type. Regarding the former approach, it is practically impossible to prepare read circuit units for all machines including those to be commercially introduced in the future. Besides, it is uneconomical. As to the latter approach, it will complicate the circuits, adding to the costs.

Aside from the problem described above, in the case of known operational amplifiers, if integral capacitor is provided between the inverting input terminals and output terminals, it is difficult to provide a sufficiently short reset time for the integral capacitor. Also, further improvement is necessary to increase the operating speed of a signal transfer apparatus.

SUMMARY OF THE INVENTION

An object of the present invention is to provide a versatile signal transfer apparatus as well as an imaging apparatus and radiation image pick-up system using it.

Another object of the present invention is to provide a signal transfer apparatus high in S/N ratio and read speed and suitable for photoelectric conversion circuit units with a large pixel count as well as to provide an imaging apparatus and radiation image pick-up system using it.

A signal transfer apparatus of the present invention comprises a plurality of terminals connected to a plurality of signal sources; and a read circuit unit for converting signals received from the above described terminals into series signals and outputting the resulting series signals, wherein the above described read circuit unit comprises first operational amplifiers connected to the above described terminals, and second operational amplifiers for receiving outputs of the above described first operational amplifiers, each of the above described first operational amplifiers comprising an inverting input terminal connected to each of the above described terminals, an output terminal with an integral capacitor and switch being connected in parallel between it and the inverting input terminal, and a non-inverting input terminal supplied with a reference voltage.

Also, a signal transfer apparatus of the present invention comprises an operational amplifier, wherein the above described operational amplifier comprises: an inverting input terminal and output terminal with an integral capacitor and reset switch being connected in parallel between them, and a non-inverting input terminal supplied with a reference voltage; and the above described signal transfer apparatus is provided with a switching circuit for charging and discharging phase compensation capacitor of the above described operational amplifier and a control circuit for controlling the above described switching circuit according to the operation of the above described reset switch.

An imaging apparatus of the present invention comprises a circuit unit which contains conversion elements for converting at least either incident light or rays into electrical signals; a signal transfer circuit unit for transferring signals from the above described circuit unit; first operational amplifiers connected to the above described circuit unit; and second operational amplifiers which receive the output of the first operational amplifier, wherein an inverting input terminal is connected to the above described circuit unit, an integral capacitor and switch are connected between the inverting input terminal and output terminal of each of the above described first operational amplifiers, and a non-inverting input terminal is connected to a reference voltage source.

Also, an imaging apparatus of the present invention comprises a circuit unit containing conversion elements for converting at least either incident light or rays into electrical signals; and a signal transfer circuit unit for transferring signals from the above described circuit unit, wherein the above described circuit unit is connected with inverting input terminals of operational amplifiers of the above described signal transfer circuit unit, an integral capacitor and reset switch are connected in parallel between an output terminal and inverting input terminal of each of the above described operational amplifiers, a non-inverting input terminal of the operational amplifier is connected with a reference voltage source, and the above described signal transfer circuit unit is provided with a switching circuit for charging and discharging phase compensation capacitor of the above described operational amplifiers, and a control circuit for controlling the above described switching circuit according to the operation of the above described reset switches.

In the first aspect of the present invention, since the above described signal lines are connected to the inverting input terminals of the above described operational amplifiers, their potential is equal to the voltage of the non-inverting input terminals of the operational amplifiers. Therefore, the signal charges outputted from the above described signal sources are stored in the above described integral capacitor connected between the inverting input terminals and output terminals of the above described operational amplifiers. The output voltage is determined uniquely by the signal charges and the values of the above described integral capacitor. Thus, the output voltage of the above described operational amplifiers does not depend on the load capacitance of the above described signal lines. Consequently, the signal transfer apparatus can be applied versatilely, for example, to photoelectric conversion circuit units with various pixel arrays. Besides, since the signal charges outputted from the first operational amplifiers are input in other operational amplifiers, the signals can be amplified by subjecting the outputted signal charges to impedance conversion as required according to their use or by inputting them into still other operational amplifiers.

On the other hand, a second aspect of the present invention makes it possible to reset the integral capacitor at high speed by controlling the switching circuit for charging and discharging the phase compensation capacitor of the operational amplifiers according to the operation of the reset switches.

BRIEF DESCRIPTION OF THE DRAWINGS

FIG. 28 is a diagram showing an application of a radiation image pick-up apparatus of the present invention to a radiation image pick-up system;

DETAILED DESCRIPTION OF THE PREFERRED EMBODIMENTS

First Embodiment

Figure 1:
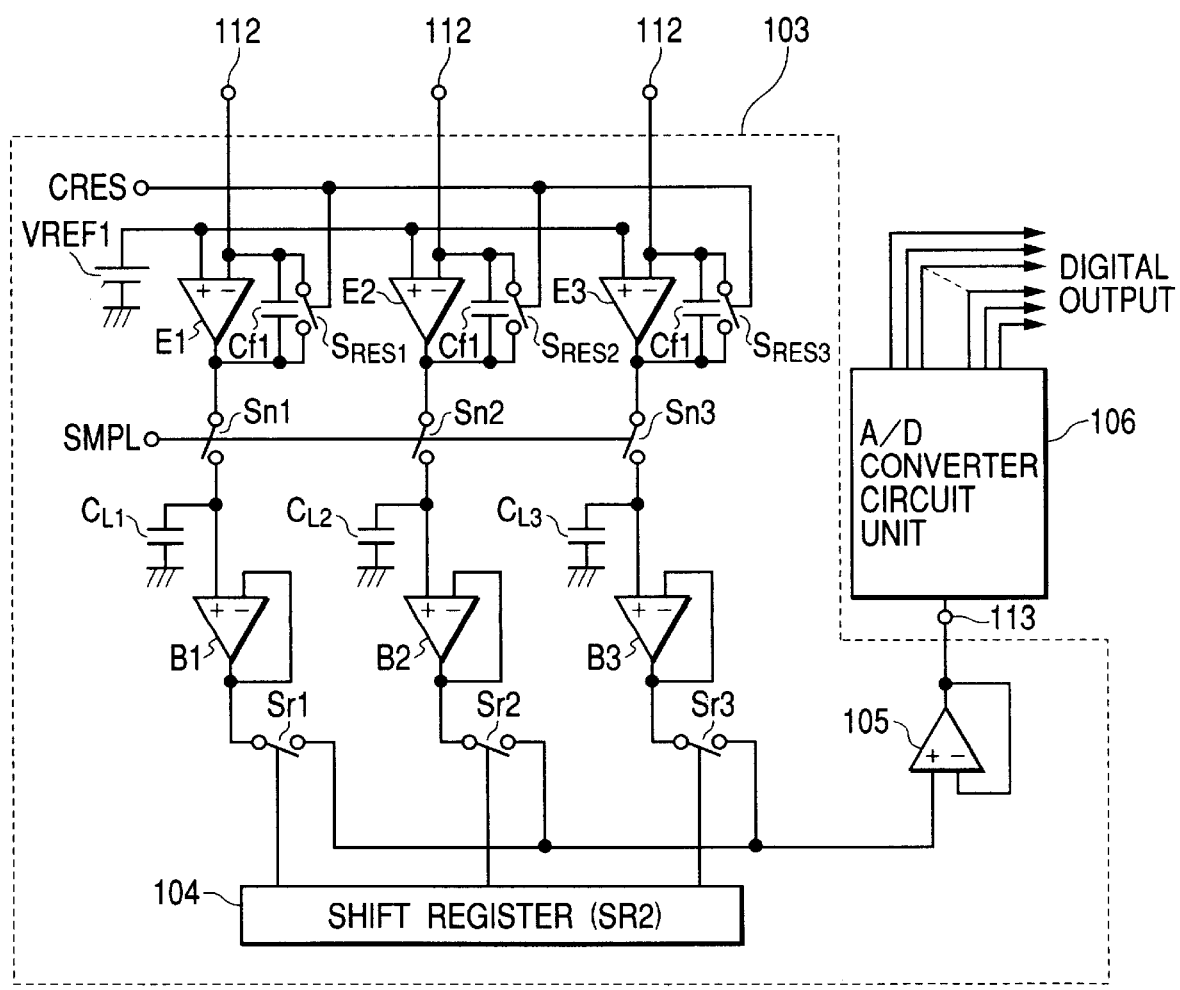
FIG. 1 is a circuit diagram of a signal transfer apparatus according to a first embodiment of the present invention.

FIG. 1 is a circuit diagram of a signal transfer apparatus according to a first embodiment of the present invention.

In FIG. 1, reference numeral 112 denotes a plurality of terminals connected to a plurality of signal lines connected to signal sources; 103 denotes a read circuit unit for converting parallel signals transferred via the terminals 112 into series signals and outputting the resulting series signals; E1 to E3 denote first operational amplifiers, i.e., first-stage operational amplifiers with respect to the terminals 112 out of operational amplifiers connected to the terminals 112; Cf1 denotes first integral capacitor connected between an inverting input terminal and output terminal of each of the first operational amplifiers E1 to E3; $S_{RES1}$ to $S_{RES3}$ denote first reset switches of the respective first integral capacitors Cf1; CRES denotes a control signal applied to $S_{RES1}$, $S_{RES2}$, and $S_{RES3}$; VREF1 denotes a first reference voltage set for the non-inverting input terminals of the first operational amplifiers E1 to E3; Sn1 to Sn3 denote sampling switches for sampling output signals outputted via the first operational amplifiers E1 to E3; SMPL denotes a voltage pulse applied to the sampling switches Sn1 to Sn3; $C_{L1}$ to $C_{L3}$ denote sampling capacitors; B1 to B3 denote buffer amplifiers for converting the impedance of the signal charges stored in the sampling capacitors $C_{L1}$ to $C_{L3}$; Sr1 to Sr3 denote read switches for reading the outputs of the buffer amplifiers B1 to B3 in sequence as series signals; 104 denotes a switch drive circuit unit (shift register SR2) for reading; 105 denotes an output buffer amplifier; and 113 is a terminal for sending output signals from the output buffer amplifier 105 to another circuit according to their use.

Reference numeral 106 denotes an A/D converter circuit unit. According to this embodiment, the output signals from the read circuit unit 103 are sent to the A/D converter circuit unit 106, but this configuration is not restrictive. For example, the A/D converter circuit unit 106 may be included in the read circuit unit 103 and connected to a processing circuit such as a memory via the terminal 113.

The signal transfer apparatus of the present invention can be suitably used in an imaging apparatus described below. The operation of the signal transfer apparatus will be described later with reference to imaging apparatus that use it.

Second Embodiment

Figure 2:
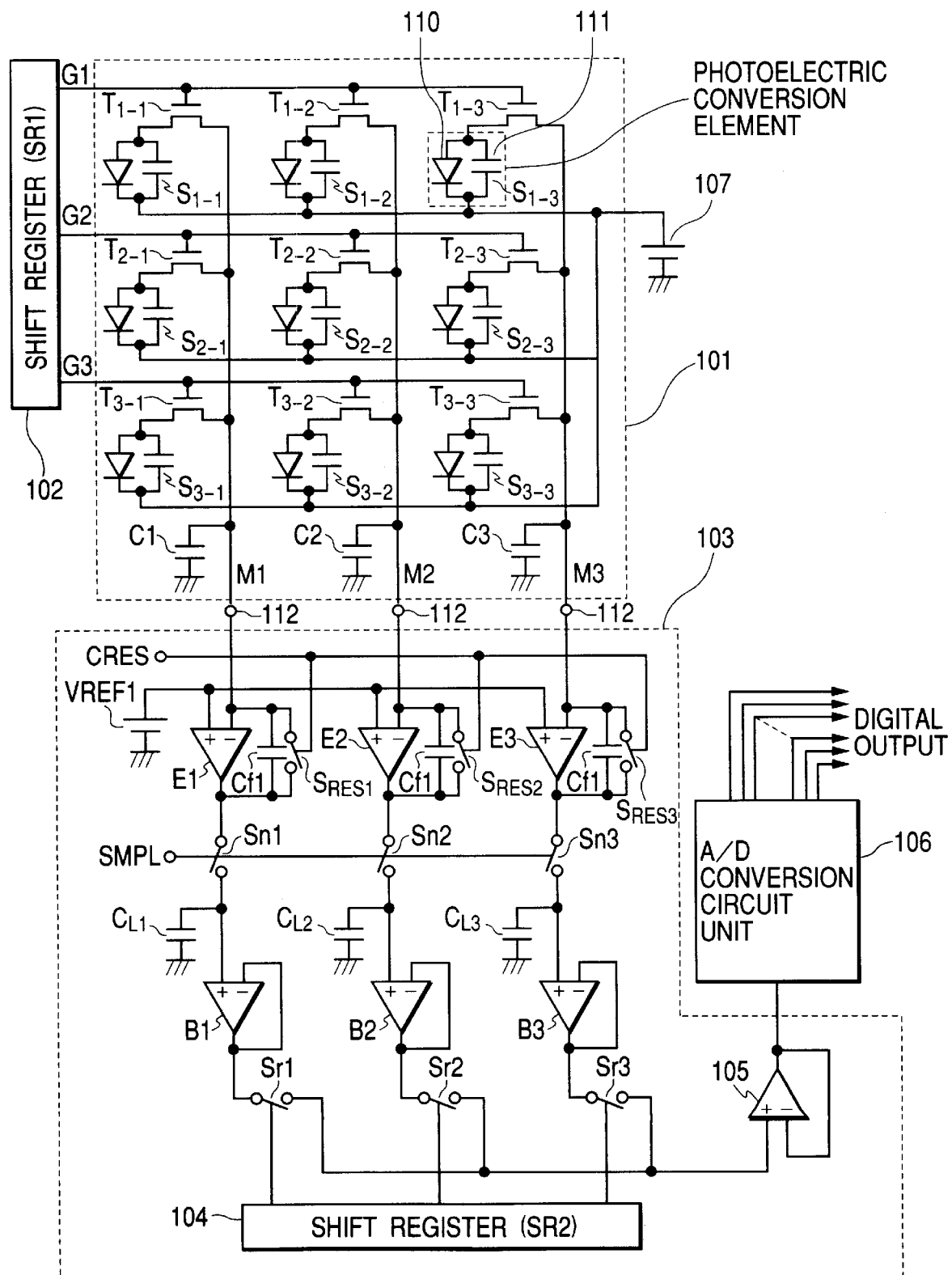
FIG. 2 is a circuit diagram of an imaging apparatus according to a second embodiment of the present invention.

FIG. 2 is a circuit diagram of an imaging apparatus according to a second embodiment of the present invention.

In FIG. 2, reference numeral 101 denotes a photoelectric conversion circuit unit; 110 denotes a light-receiving area which converts incident light into signal charges; 111 denotes interelectrode capacitance for storing the signal charges resulting from photoelectric conversion carried out by the light-receiving area 110; $S_{1-1}$ to $S_{3-3}$ denote photoelectric conversion elements, each comprising a light-receiving area 110 and interelectrode capacitance 111; M1, M2, and M3 denote matrix signal wirings serving as signal lines; $T_{1-1}$ to $T_{3-3}$ denote switching elements for transferring the signal charges formed by the photoelectric conversion elements $S_{1-1}$ to $S_{3-3}$ to the matrix signal wirings M1, M2, and M3; G1, G2, and G3 denote gate drive wirings for driving the switching elements $T_1$ to $T_{3-3}$; and C1, C2, and C3 denote load capacitances of the matrix signal wirings M1, M2, and M3, respectively. The photoelectric conversion element may be an MIS or PIN thin-film photoelectric conversion element using hydrogenated amorphous silicon films or a PN photo diode using single-crystal silicon. The switching element may be a thin-film transistor or known MOS transistor using amorphous silicon, polycrystalline silicon, or single-crystal silicon.

Reference numeral 102 denotes a drive circuit unit (shift register: SR1) for applying a drive signals to the gate drive wirings G1 to G3. Reference numeral 103 denotes a read circuit unit. Reference numeral 107 denotes a bias supply for the photoelectric conversion elements.

If thin-film elements are used as the photoelectric conversion elements and switching elements, it is preferable to construct the drive circuit unit from at least one LSI chip using single-crystal silicon and construct the read circuit unit from at least one LSI chip using single-crystal silicon transistors.

Incidentally, although a 9-pixel (3×3), two-dimensional photoelectric conversion apparatus is shown in FIG. 2 for the sake of simplicity, actual imaging apparatus consist of more pixels depending on their applications.

Also, according to this embodiment, each of the matrix signal wirings M1 to M3 is connected with two operational amplifiers, for example, (E1 and B1), (E2 and B2), or (E3 and B3), but this number is not restrictive and is determined as required: there may be other operational amplifiers.

In all the embodiments described below, the number of operational amplifiers is not restrictive and there may be operational amplifiers within the circuits in addition to those shown in the drawings.

Figure 3:
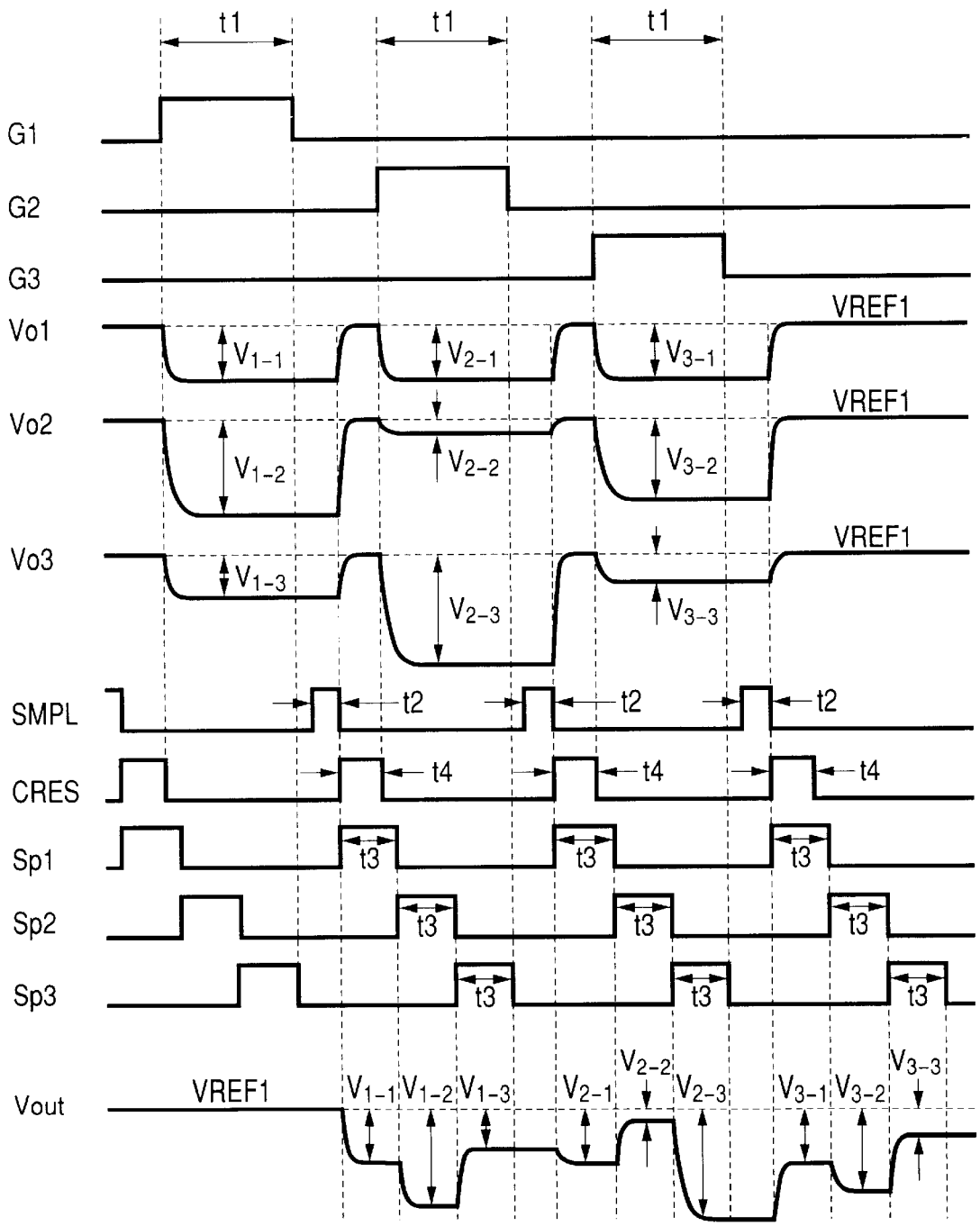
FIG. 3 is a timing chart illustrating the operation of the imaging apparatus according to the second embodiment of the present invention.

FIG. 3 is a timing chart illustrating the operation of the imaging apparatus according to this embodiment. In the figure, when a first voltage pulse for transfer is applied to the gate drive wiring G1 by the shift register SR1, which is the gate line drive circuit unit 102, for a time t1, the switching elements $T_{1-1}$, $T_{1-2}$, and $T_{1-3}$ are turned on, causing the photoelectric conversion elements $S_{1-1}$, $S_{1-2}$, and $S_{1-3}$ in the first row and the matrix signal wirings M1 to M3 to conduct. Since the matrix signal wirings M1 to M3 are connected to the inverting input terminals (−) of the first operational amplifiers E1 to E3, the respective potentials V1 to V3 of the matrix signal wirings M1 to M3 are equal to the voltage VREF1 of the non-inverting input terminals. Therefore, the above-mentioned transfer operation transfers the signal charges of the photoelectric conversion elements $S_{1-1}$, $S_{1-2}$, and $S_{1-3}$ to the respective integral capacitors Cf1. Consequently, the output voltages Vo1 to Vo3 of the first operational amplifiers E1 to E3 change as follows, where Qi (i=1 to 3) denotes the signal charges:

$$Voi = VREF1 - Qi/Cf1 \text{ for } (i=1 \text{ to } 3) \tag{10}$$

As can be seen by comparing Equation (10) above with Equation (5) shown earlier, the output voltage of the imaging apparatus according to the present invention does not depend on the load capacitances C1 to C3 of the matrix signal wirings described above. If it is assumed that the value of the integral capacitor Cf1 is equal to that of the interelectrode capacitance Cs in the photoelectric conversion elements, the output voltage is given by Equation (11), in which the signal component is expressed as Qi/Cs=Vs, which is the same as Equation (7). That is, the above construction does not degrade the S/N ratio in subsequent stages.

$$Voi = VREF1 - Qi/Cs = VREF1 - Vs \tag{11}$$

Incidentally, although it is assumed here for the sake of simplicity that Cf1=Cs, this is not restrictive. For example, if Cf1<Cs, the signal voltage will get larger, improving the S/N ratio in subsequent stages.

Figure 30:
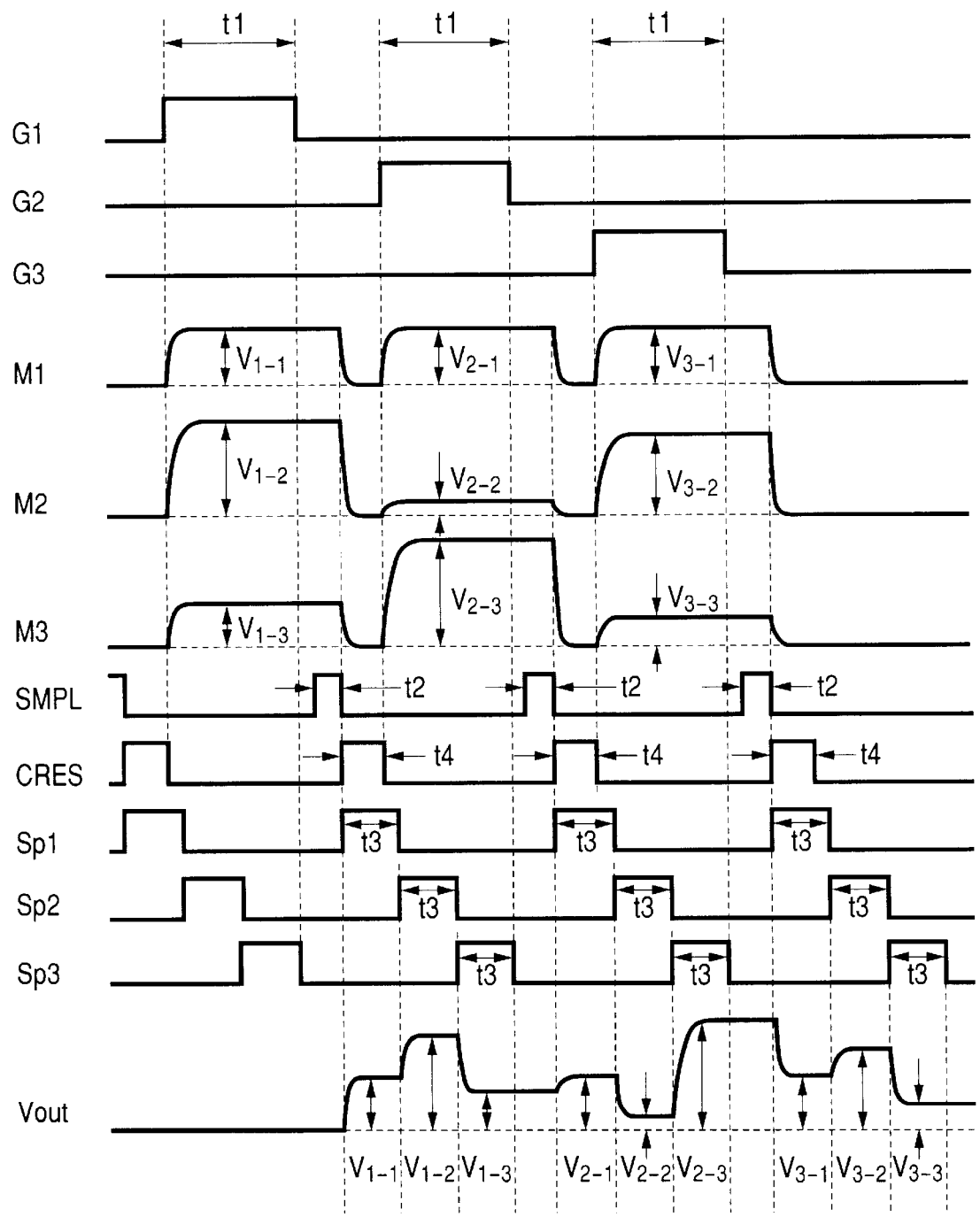
FIG. 30 is a timing chart illustrating the operation of the first example of conventional photoelectric conversion apparatus.
Figure 31:
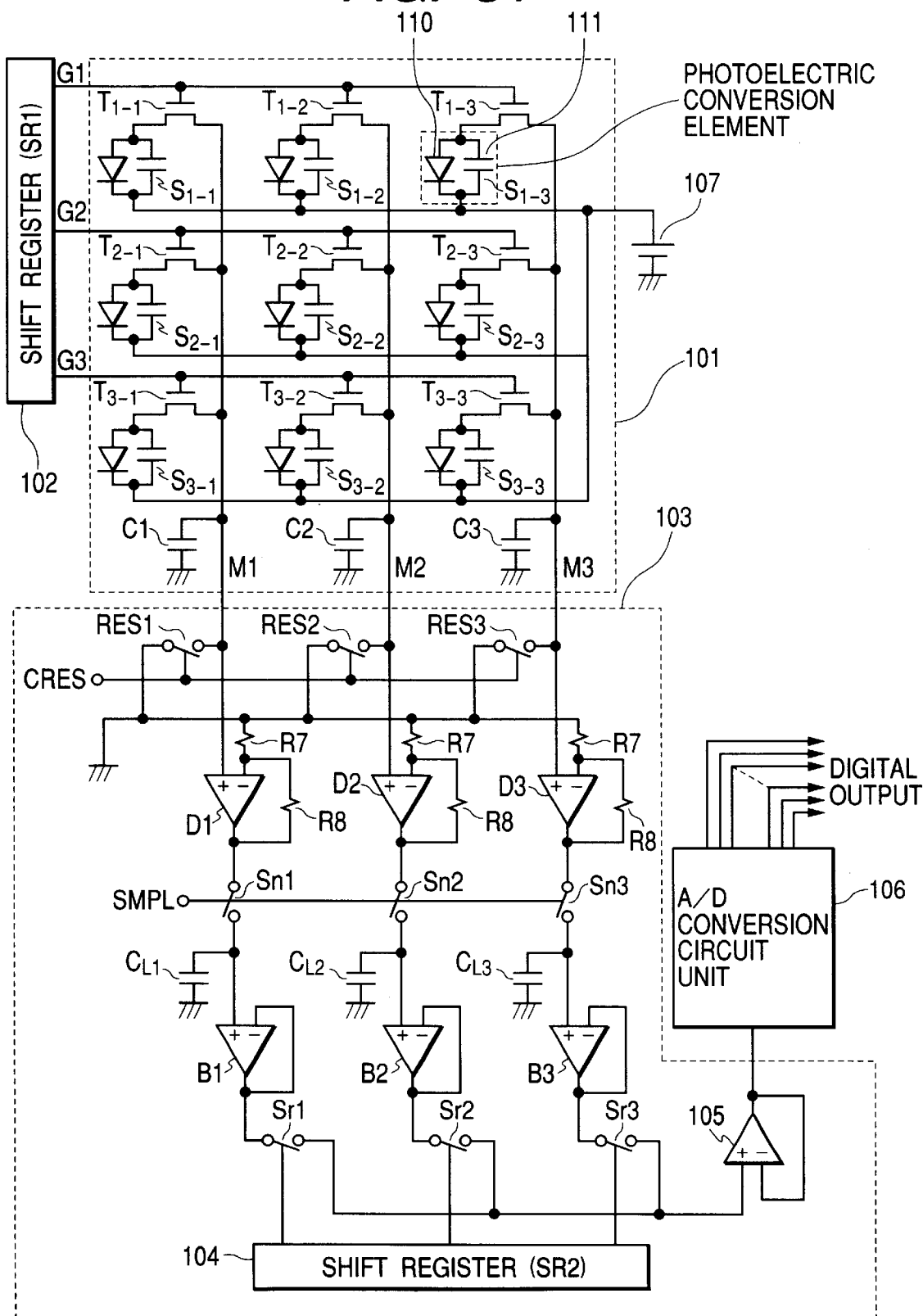
FIG. 31 is a circuit diagram of a second example of conventional photoelectric conversion apparatus.

The subsequent operation is similar to the prior art example shown in FIG. 30. The sampling switches Sn1 to Sn3 are turned on by the SMPL pulse for the time t2 and the signals are transferred to the sampling capacitors $C_{L1}$ to $C_{L3}$. Then, the read switches Sr1 to Sr3 are turned on in sequence each for a time t3 by read pulses Sp1 to Sp3 from the shift register SR2 serving as the switch drive circuit unit 104 for reading. Consequently, the signals are read out as series signals from the output buffer amplifier 105 via the respective buffer amplifiers B1 to B3 and digitized by the A/D conversion circuit unit 106. Then, the integral capacitor Cf1 is reset by the application of the control signal CRES to the reset switches $S_{RES1}$ to $S_{RES3}$ for a time t4 to prepare for a read operation of the next row. Similarly, the gate drive wirings G2 and G3 are driven in sequence by the shift register 102 to read out all the pixel data of the photoelectric conversion elements $S_{2-1}$ to $S_{3-3}$.

As described above, according to this embodiment, the matrix signal wirings M1 to M3 are connected to the inverting input-terminal of the first operational amplifiers E1 to E3, eliminating reliance on the load capacitances C1 to C3 of the matrix signal wirings M1 to M3. Besides, the signal charges are transferred to the integral capacitor Cf1. Consequently, the read circuit unit 103 can be applied to photoelectric conversion circuit units with various pixel arrays.

Also, according to this embodiment, since the signal charges outputted from the first operational amplifiers are input in other operational amplifiers (the buffer amplifiers B1 to B3 in the present embodiment), the impedance of the outputted signal charges can be converted according to their use. Besides, the signal charges outputted from the first operational amplifiers can be amplified by using other operational amplifiers in addition to the buffer amplifiers B1 to B3.

Including the embodiments described above and the embodiments described below, the signal sources available to the present invention include conversion elements which receive light and/or rays and generate electric charges, sensors which sense heat and generate signals, sensors which sense sound and generate signals, etc.

If conversion elements which receive light and/or rays and generate electric charges are used as signal sources as is the case with imaging apparatus, CMOS, CCD, bipolar, or thin-film image sensors can be used as circuit units having conversion elements.

When picking up images formed by rays such as X-rays, an imaging apparatus may be constructed from a combination of photoelectric conversion elements and a material, such as a phosphor or a light emitting substance called a scintillator, that emits visible light in response to radiation. Specifically, a radiation image pick-up apparatus can be constructed by mounting a light emitting substance such as a cesium iodide or gadolinium sulfide/oxide on a circuit-board which contains a pixel array consisting of thin-film photoelectric conversion elements and thin-film transistors.

For the purpose of the imaging apparatus and radiation image pick-up system of the present invention, rays include α, β, γ, and other rays in addition to X-rays while light means electromagnetic waves in the long wavelength region, including visible light, which are detectable by photoelectric conversion elements.

Third Embodiment

Figure 4:
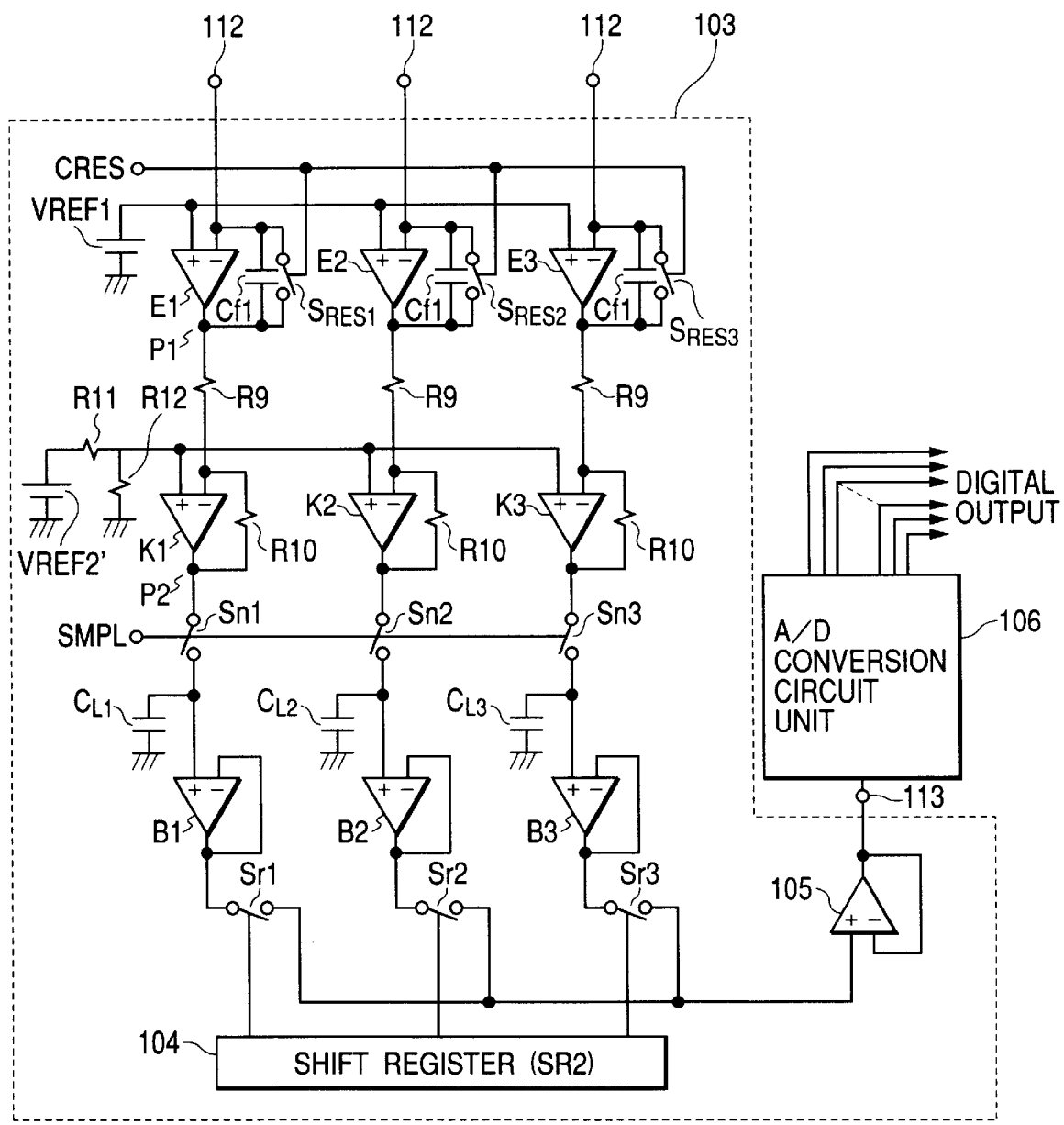
FIG. 4 is a circuit diagram of a signal transfer apparatus according to a third embodiment of the present invention.

FIG. 4 is a circuit diagram of a signal transfer apparatus according to a third embodiment of the present invention.

In FIG. 4, reference characters R9, R10, R11, and R12 denote resistor elements; K1, K2, and K3 denote second operational amplifiers whose inverting input terminals are connected with output signals from the first operational amplifiers E1, E2, and E3 via the resistor element R9 and which have the resistor element R10 connected between the inverting input terminal and output terminal; VREF2' denotes a second reference voltage set for the non-inverting input terminals of the second operational amplifiers K1 to K3 via the resistor elements R11 and R12. With this configuration, the reference voltage VREF2' is applied to the non-inverting input terminals of the second operational amplifiers after being divided by the resistor elements R11 and R12. An amplification factor H of the second operational amplifiers K1 to K3 is determined by the resistor elements R9 and R10.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Fourth Embodiment

Figure 5:
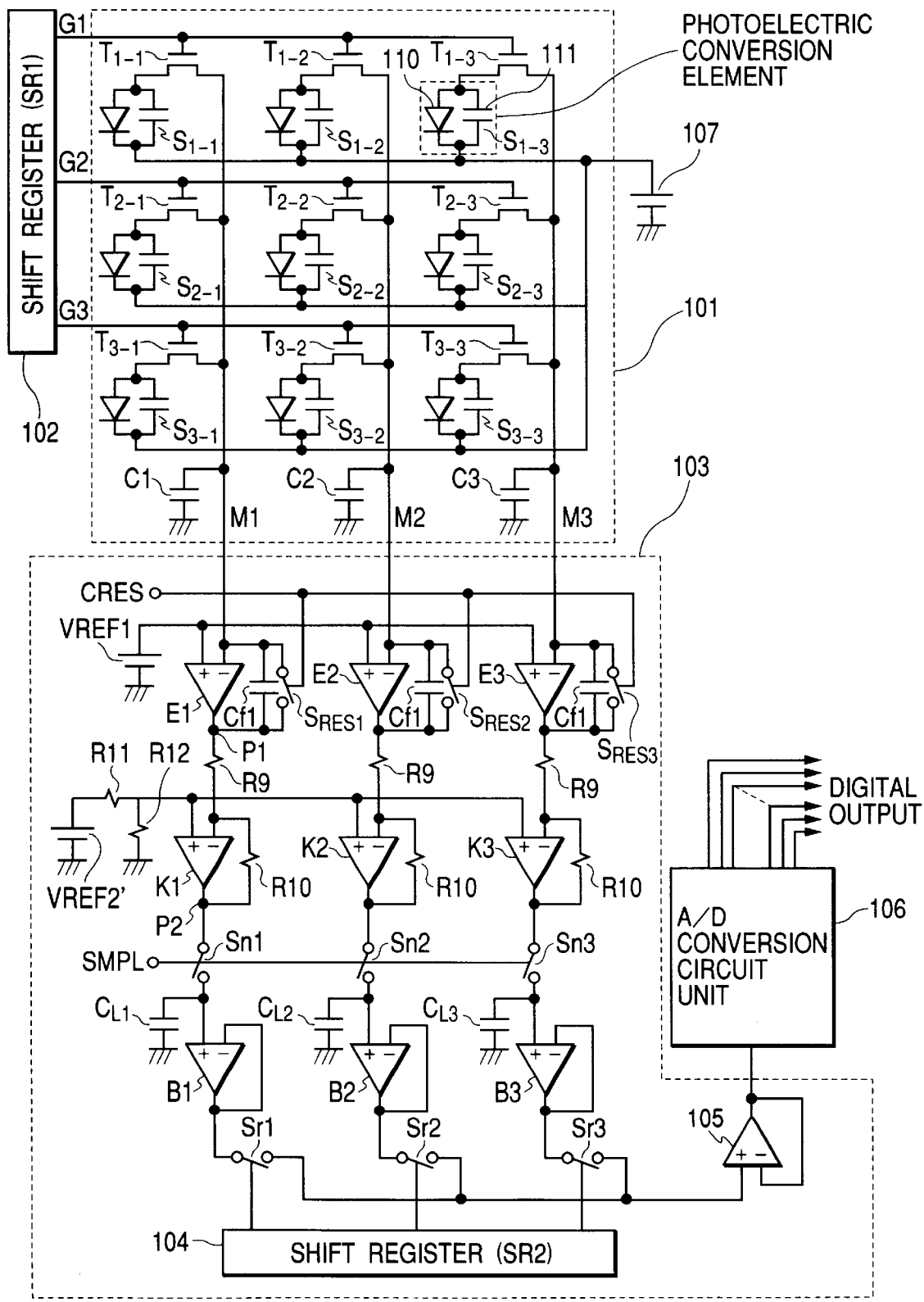
FIG. 5 is a circuit diagram of an imaging apparatus according to a fourth embodiment of the present invention.

FIG. 5 is a circuit diagram of an imaging apparatus according to a fourth embodiment of the present invention.

Incidentally, although a 9-pixel (3×3), two-dimensional photoelectric conversion apparatus is shown in FIG. 5 for the sake of simplicity, actual imaging apparatus consist of more pixels depending on their applications. Description of the components denoted by the same reference characters as those described above will be omitted.

The circuit configuration of FIG. 5 differs from that of FIG. 2 in that inverting operational amplifiers K1 to K3 with an amplification factor H are placed between the first operational amplifiers E1 to E3 and buffer amplifiers B1 to B3 and that a plurality of inverting operational amplifier stages are provided.

The configuration of this embodiment makes it possible to provide an imaging apparatus that does not depend on the load capacitances C1 to C3 of the matrix signal wirings M1 to M3 and amplifies the output signals from the first operational amplifiers E1 to E3 before being output.

Fifth Embodiment

Figure 6:
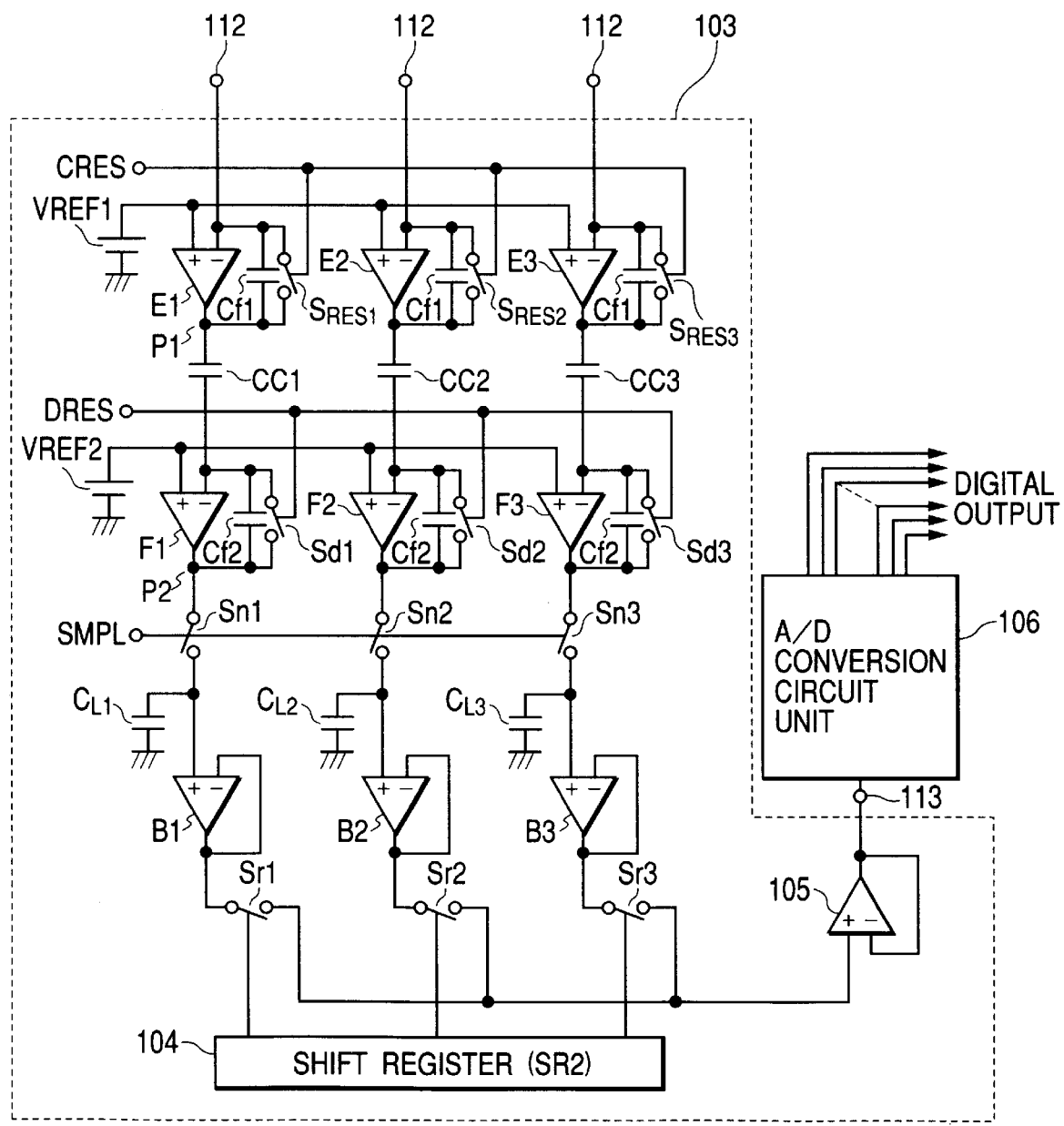
FIG. 6 is a circuit diagram of a signal transfer apparatus according to a fifth embodiment of the present invention.

FIG. 6 is a circuit diagram of a signal transfer apparatus according to a fifth embodiment of the present invention.

In FIG. 6, reference characters CC1 to CC3 denote capacitive elements which pass only the AC components of signals between the output terminals of the first operational amplifiers E1 to E3 and the sampling switches Sn1 to Sn3; F1 to F3 denote second operational amplifiers whose inverting input terminals are connected with the capacitive elements CC1 to CC3, respectively; Cf2 denotes second integral capacitor connected between the inverting input terminal and output terminal of each of the second operational amplifiers F1 to F3; Sd1, Sd2, and Sd3 denote second reset switches for resetting the respective second integral capacitors Cf2; DRES denotes a pulse signal for controlling the second reset switches Sd1 to Sd3; and VREF2 denotes a reference voltage set for the non-inverting input terminals of the second operational amplifiers F1 to F3.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Sixth Embodiment

Figure 7:
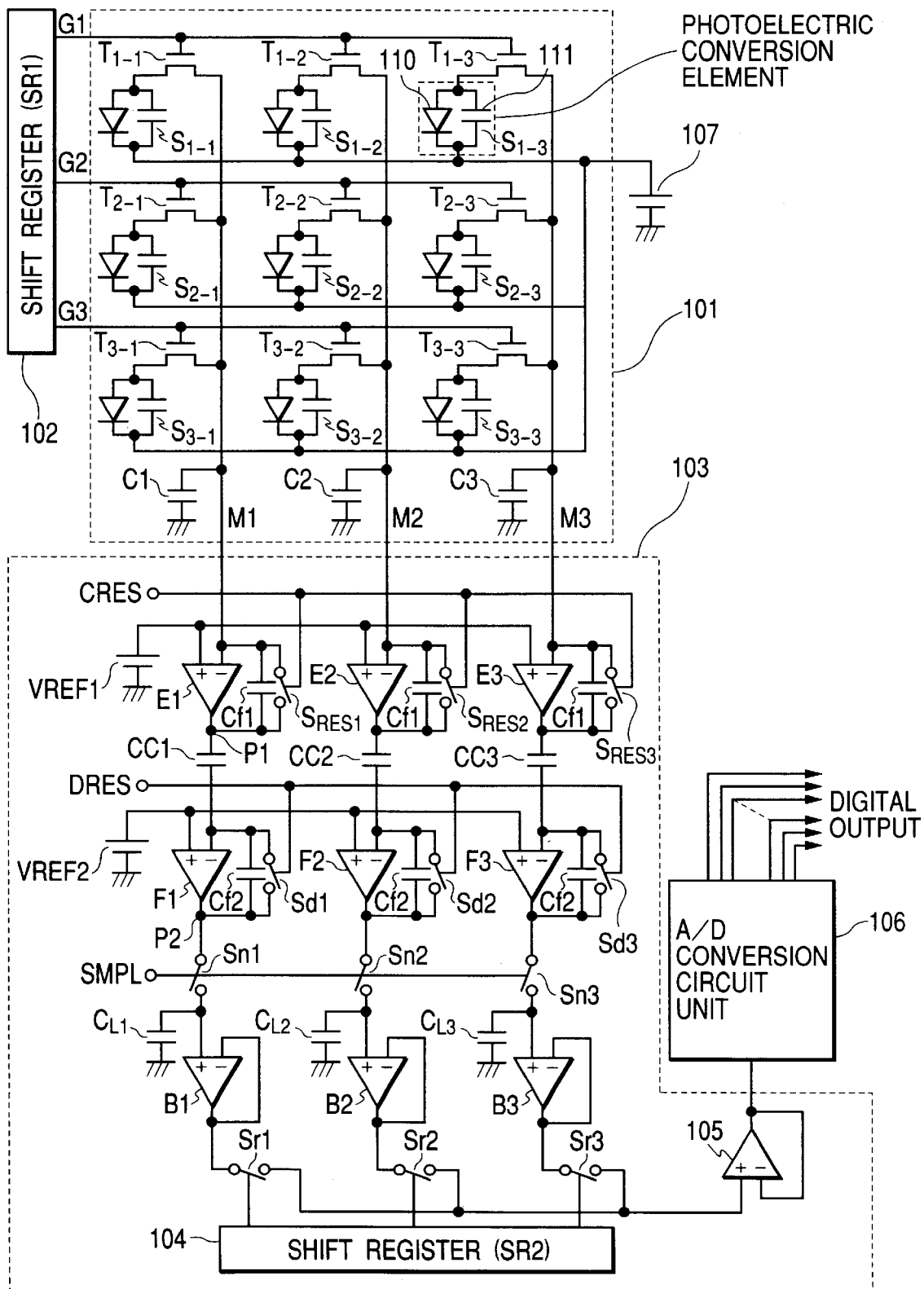
FIG. 7 is a circuit diagram of an imaging apparatus according to a sixth embodiment of the present invention.

FIG. 7 is a circuit diagram of an imaging apparatus according to a sixth embodiment of the present invention.

Incidentally, although a 9-pixel (3×3), two-dimensional photoelectric conversion apparatus is shown in FIG. 7 for the sake of simplicity, an actual imaging apparatus consists of more pixels depending on their applications.

Description of the components denoted by the same reference characters as those described above will be omitted.

Figure 8:
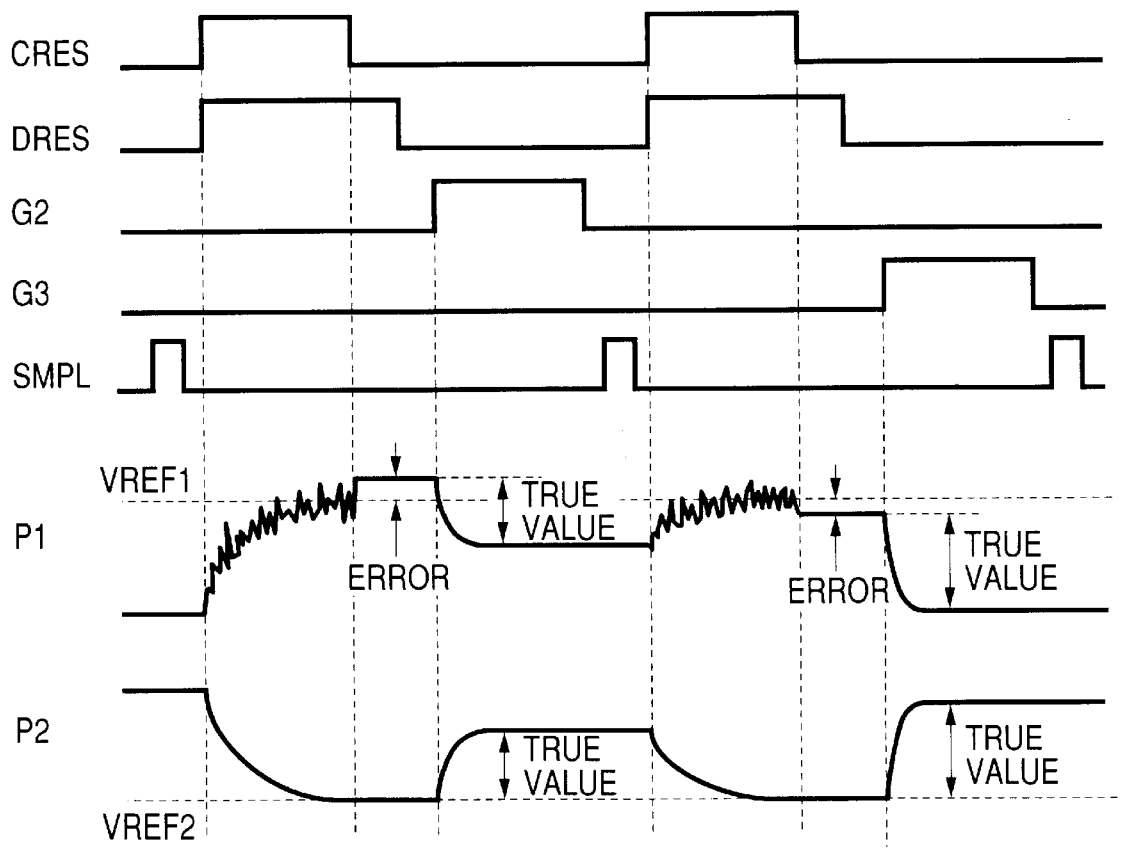
FIG. 8 is a timing chart illustrating the operation of the imaging apparatus according to the sixth embodiment of the present invention.

The circuit configuration of FIG. 7 differs from that of FIG. 5 in that the capacitive elements CC1 to CC3 are used to compose the second operational amplifiers F1 to F3 instead of the resistor elements R9 and R10 of the second operational amplifiers K1 to K3 shown in FIG. 5. In FIG. 7, the capacitive elements CC1 to CC3 have one of their electrodes connected to the output terminal of the respective first operational amplifiers E1 to E3 and the other electrode connected to the inverting input terminal (−) of the respective second operational amplifiers F1 to F3. FIG. 8 is a timing chart illustrating the operation of the first operational amplifiers E1 to E3, the second operational amplifiers F1 to F3, and the second reset switches Sd1 to Sd3 of the imaging apparatus according to the present invention shown in FIG. 7.

In a reset operation in preparation for a read operation of the next row after a read operation of a row is finished, the control signal CRES is applied, the first reset switches $S_{RES1}$ to $S_{RES3}$ are turned on and the first integral capacitor Cf1 are short-circuited at both ends, resetting the signal charges from the previous row stored in the first integral capacitor Cf1. At this time, the first operational amplifiers E1 to E3 operate as voltage followers, and thus the potential of their output terminals P1 is set at VREF1. However, the output voltage fluctuates due to thermal noise generated by the switch-on resistance of the reset switches $S_{RES1}$ to $S_{RES3}$, The fluctuations are stored in the first integral capacitor Cf1 the moment the first reset switches $S_{RES1}$ to $S_{RES3}$ are turned off upon termination of the reset period, and remain as so-called KTC noise. The KTC noise Rn (Vrms) depends only on the value of the first integral capacitor Cf1 and is given by:

$$Rn=(KT/Cf1)^{1/2} \quad (12)$$

where K is Boltzmann's constant, T is absolute temperature, and Cf1 is the value of the first integral capacitor. On the other hand, KTC noise is generated due to thermal noise produced by the switch-on resistance of the switching elements $T_{1-1}$ to $T_{3-3}$ when transferring signal charges from the interelectrode capacitances Cs of the photoelectric conversion elements $S_{1-1}$ to $S_{3-3}$ via the switching elements. It is transferred, being interposed over the signal charges. If it is assumed here, as is the case with the first embodiment described above, that Cf1=Cs, the two noises become equal and the reset noise (KTC noise) of the first integral capacitor Cf1 cannot be ignored. If Cf1>Cs, the reset noise of the first integral capacitor Cf1 itself becomes small, but the signal voltage Qi/Cf1 also becomes small, and thus the S/N ratio is not improved. Regarding the waveform P1 (waveform of the output terminals P1) in FIG. 8, the deviation (indicated as an error in FIG. 8) from the first reference voltage VREF1 after the control signal CRES is turned off is attributable to the reset noise of the first integral capacitor Cf1.

On the other hand, the reset switches Sd1 to Sd3 connected between the inverting input terminals (−) and output terminals of the second operational amplifiers F1 to F3, respectively, are controlled by the pulse signal DRES, which is turned on almost simultaneously with the control signal CRES and is turned off later than the control signal CRES. While the pulse signal DRES is being applied, the reset switches Sd1 to Sd3 remain on to reset the second integral capacitor Cf2, the second operational amplifiers F1 to F3 operate as voltage followers, and the potential of their output terminals P2 becomes equal to VREF2. Since the pulse signal DRES remains on even after the control signal CRES is turned off, the potential of the output terminals P2 remain unchanged and the reset noise of the first integral capacitor Cf1—which is a DC component—is stored in the capacitive elements CC1 to CC3. This state is maintained even after the pulse signal DRES is turned off. Then, as a gate drive pulse G2 is applied in the transfer operation for the next row and the signal charges are transferred to the first integral capacitor Cf1, output voltage P2 (output voltage of the output terminals P2) of the second operational amplifiers F1 to F3 changes. The potentials (denoted by P1 and P2) of the output terminals P1 and P2 at this time are given by:

$$P1=VREF1-Q1/Cf1+Rn \quad (13)$$

$$P2=VREF2+(Q1/Cf1)\times(CCi/Cf2) \text{ for } (i=1 \text{ to } 3) \quad (14)$$

where Equation (13) contains the reset noise Rn of the first integral capacitor Cf1.

By comparing Equations (13) and (14) above, it can be seen that only the AC component of the signal appears in the output voltage of the second operational amplifiers F1 to F3, canceling the reset noise of the first integral capacitor Cf1. Also, as can be seen from Equation (14), the signal voltage is amplified by a gain equal to the ratio of the capacitive elements CC1 to CC3 to the second integral capacitor Cf2. If CCi (i=1 to 3) is set larger than Cf2, the S/N ratio downstream of the sampling switches Sn1 to Sn3 will be further improved. Incidentally, the output voltage P2 (voltage of the output terminals P2) is actually superimposed by the reset noise (KTC noise) of the second integral capacitor Cf2. However, the amount of the reset noise is equivalent to Cf2/CCi in terms of input. Besides, since the gains of the second operational amplifiers F1 to F3 are determined by the ratio of capacitances alone as described above, the value of the second integral capacitor Cf2 can be made large compared to the first integral capacitor Cf1. Consequently, the reset noise of the second integral capacitor Cf2 can be ignored and thus is omitted from Equation (14).

The subsequent operation is the same as that shown in FIG. 3 and thus description thereof will be omitted.

As described above, according to this embodiment, the read circuit unit 103 is configured such that the capacitive elements CC1 to CC3 which pass only the AC components of signals are connected with the second amplifiers F1 to F3 between the output terminals of the first operational amplifiers E1 to E3 and the sampling switches Sn1 to Sn3, and that the second reset switches Sd1 to Sd3 are placed between the inverting input terminals and output terminals of the second operational amplifiers F1 to F3. This makes it possible to remove the reset noise of the first integral capacitor Cf1 to which the signal charges are transferred and thus provide a photoelectric conversion apparatus with a high S/N ratio.

Comparing the fourth and sixth embodiments of the present invention, it can be said that although the configuration of the fourth embodiment is effective in itself, this configuration is more suitable for operational amplifiers which transmit signals by means of the capacitive elements CC1 to CC3 as with the second operational amplifiers F1 to F3 shown in FIG. 7 rather than by means of resistor elements, for the reasons shown in (a) and (b) shown below.

(a) The configuration shown in FIG. 7 can remove reset noise of CF1.

Since the outputs of the first operational amplifiers E1 to E3 in the first stage are connected to the second operational amplifiers K1 to K3 in the next stage via the resistor elements R9 as can be seen from FIG. 5, the DC component can pass through them. Therefore, the reset noise Rn of the first integral capacitor Cf1 superimposed over the outputs of the first-stage operational amplifiers E1 to E3 are amplified by the second operational amplifiers K1 to K3 in the next stage as shown by Equation (13). This is disadvantageous in terms of S/N ratio and requires a separate noise-canceling circuit.

$$Rn=(KT/Cf1)^{1/2} \quad (12)$$

$$P1=VREF1-Q1/Cf1+Rn \quad (13)$$

The output voltage P1 from the first operational amplifiers E1 to E3 in the first stage, shown in Equation (13), is amplified by the second operational amplifiers K1 to K3 and F1 to F3 in the next stage shown in FIG. 5 and FIG. 7, respectively, as follows:

The output voltage P2 from the second operational amplifiers F1 to F3 in the next stage shown in FIG. 7 is given by:

$$P2=VREF2+(Q1/Cf1)\times(CCi/Cf2) \text{ for } (i=1 \text{ to } 3) \quad (14)$$

On the other hand, assuming that R11 and R12 are equal to R9 and R10, respectively, the output voltage P2 from the second operational amplifiers K1 to K3 in the next stage shown in FIG. 5 is given by:

$$P2=(R10/R9)\times(VREF2'-VREF1)+(R10/R9)\times(Qi/Cf1+Rn) \quad (15)$$

By comparing Equations (14) and (15), it can be seen that with the configuration of FIG. 5, the reset noise Rn of the first integral capacitor Cf1 is multiplied by the gain (R10/R9) and appears in outputs. Also, equal signal charges Qi give the same output voltage, if the capacitance value, resistance value, and reference voltage VREF2' are determined Equations (14) and (15) such that they satisfy the following relationships:

$$CCi/Cf2 = R10/R9 \text{ for } (i=1 \text{ to } 3) \tag{16}$$

$$VREF2' = (R10/R9) \times (VREF2' - VREF1) \tag{17}$$

Figure 9:
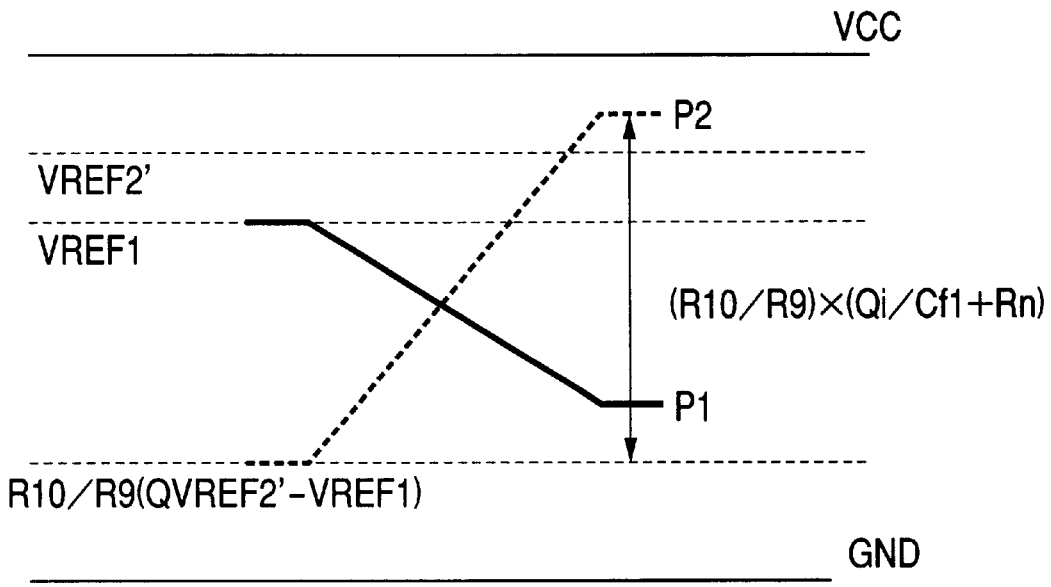
FIG. 9 is a diagram illustrating the output voltage of a non-inverting operational amplifier shown in FIG. 5.
Figure 10:
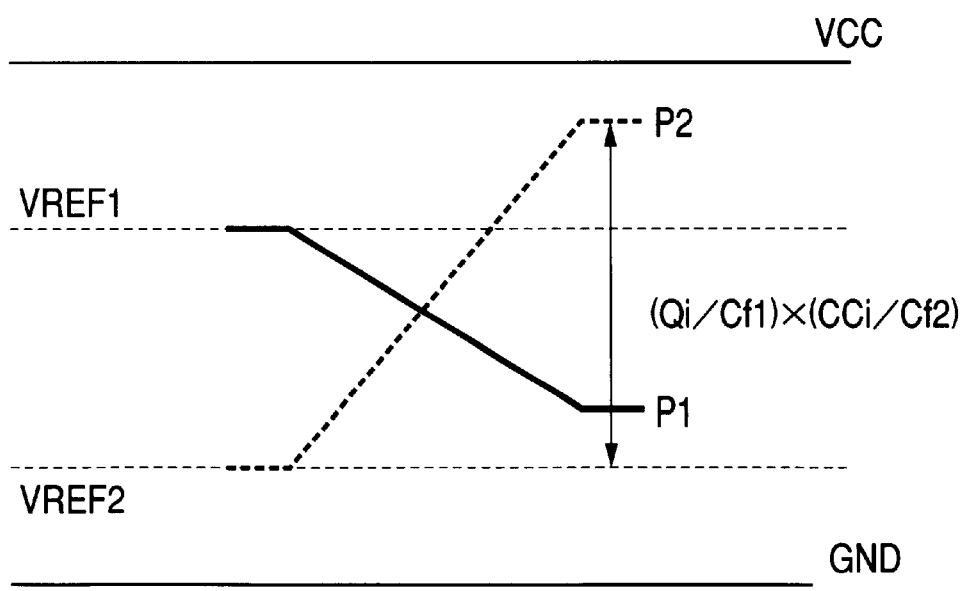
FIG. 10 is a diagram illustrating the output voltage of a non-inverting operational amplifier shown in FIG. 7.

FIG. 9, which corresponds to FIG. 5, illustrates the output P1 from the first operational amplifiers E1 to E3 in the first stage and the output voltage P2 from the second operational amplifiers K1 to K3 and F1 to F3 in the next stage while FIG. 10, which corresponds to FIG. 7, illustrates the output P1 from the first operational amplifiers E1 to E3 in the first stage and the output voltage P2 from the second operational amplifiers K1 to K3 and F1 to F3 in the next stage.

(b) With the configuration shown in FIG. 7, the power consumption of the system remains constant even if the signal level changes.

With the configuration in FIG. 5, due to the potential difference across the resistors R9 connected between the output terminals of the first operational amplifiers E1 to E3 in the first stage and the inverting input terminals of the second operational amplifiers K1 to K3 in the next stage, the value of the current flowing through the resistors R9 changes. Specifically, the second reference voltage VREF2' divided by the resistor elements R11 and R12 is applied to the non-inverting input terminals of the second operational amplifiers K1 to K3 in the next stage and the voltage at the inverting input terminals remains unchanged and equal to the voltage at the non-inverting input terminals. On the other hand, the voltage at the other end of the resistors R9 changes with the signal charges Qi as shown by Equation (13), and the signal current component i9 flowing through the resistors R9 is expressed as:

$$i9 = (1/R9) \times (Qi/Cf1) \tag{18}$$

This means that the power consumption of the system increases in the imaging apparatus when the image to be photographed is light and decreases when the image is dark.

Incidentally, although this embodiment uses 3×3 pixels for the sake of simplicity, the medical X-ray image pickup apparatus described above has as many as 4,000 rows of matrix signal wirings. Consequently, even a minor current variation per signal matrix line will result in an undesirably large current variation.

As described above, when amplifying signal charges by means of a plurality of operational amplifiers cascaded together, it is useful to connect inverting operational amplifiers via capacitive elements as exemplified by the sixth embodiment of the present invention so that signals can be transmitted by means of charge transfer. Incidentally, although two stages of inverting operational amplifiers cascaded together are used in the example described above, this number is not restrictive.

Seventh Embodiment

Figure 11:
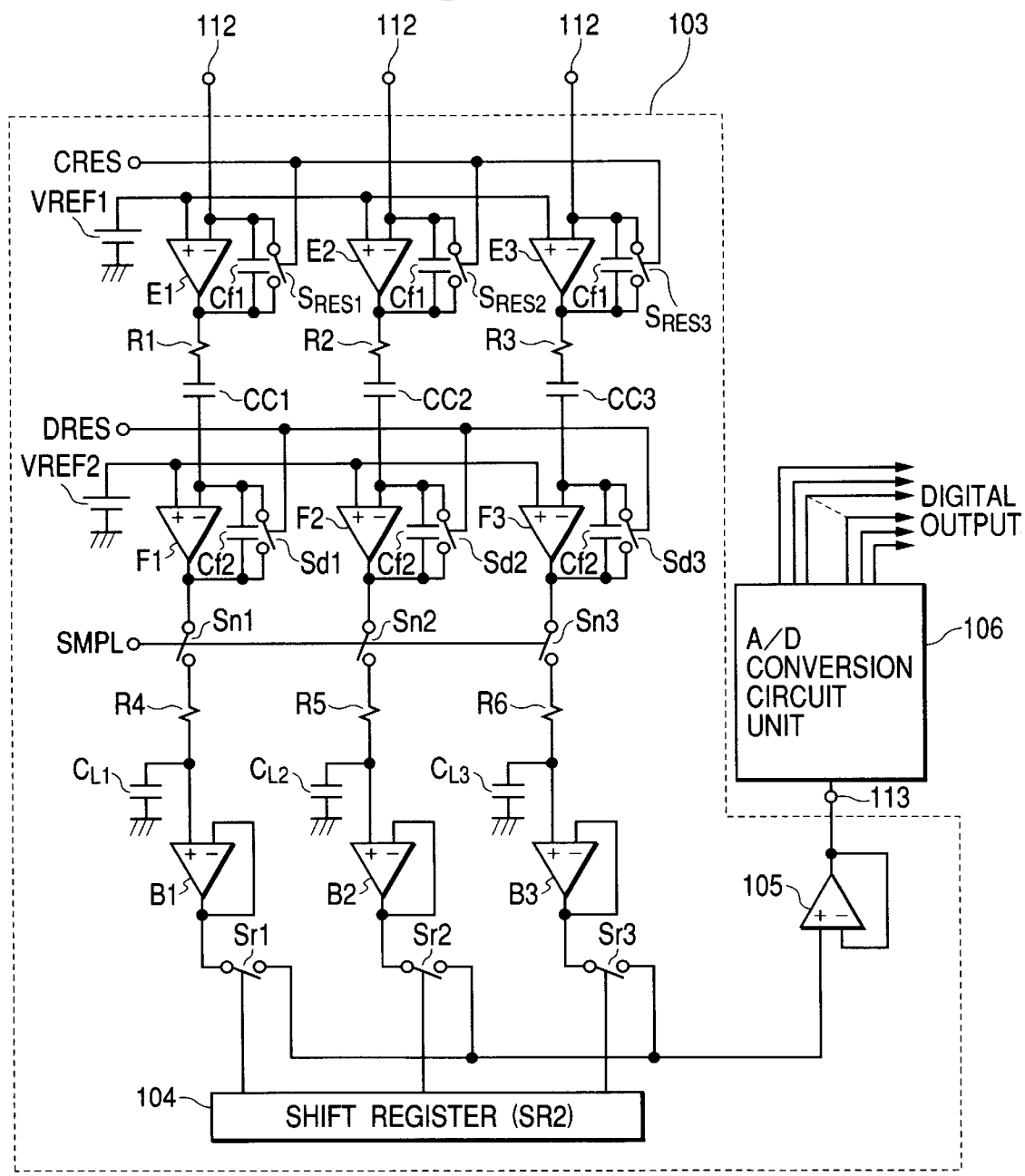
FIG. 11 is a circuit diagram of a signal transfer apparatus according to a seventh embodiment of the present invention.

FIG. 11 is a circuit diagram of a signal transfer apparatus according to a seventh embodiment of the present invention.

In FIG. 11, reference characters R1 to R3 denote resistor elements placed between the first operational amplifiers E1 to E3 and capacitive elements CC1 to CC3, and R4 to R6 denote resistor elements placed between the sampling switches Sn1 to Sn3 and sampling capacitors $C_{L1}$ to $C_{L3}$.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Eighth Embodiment

Figure 12:
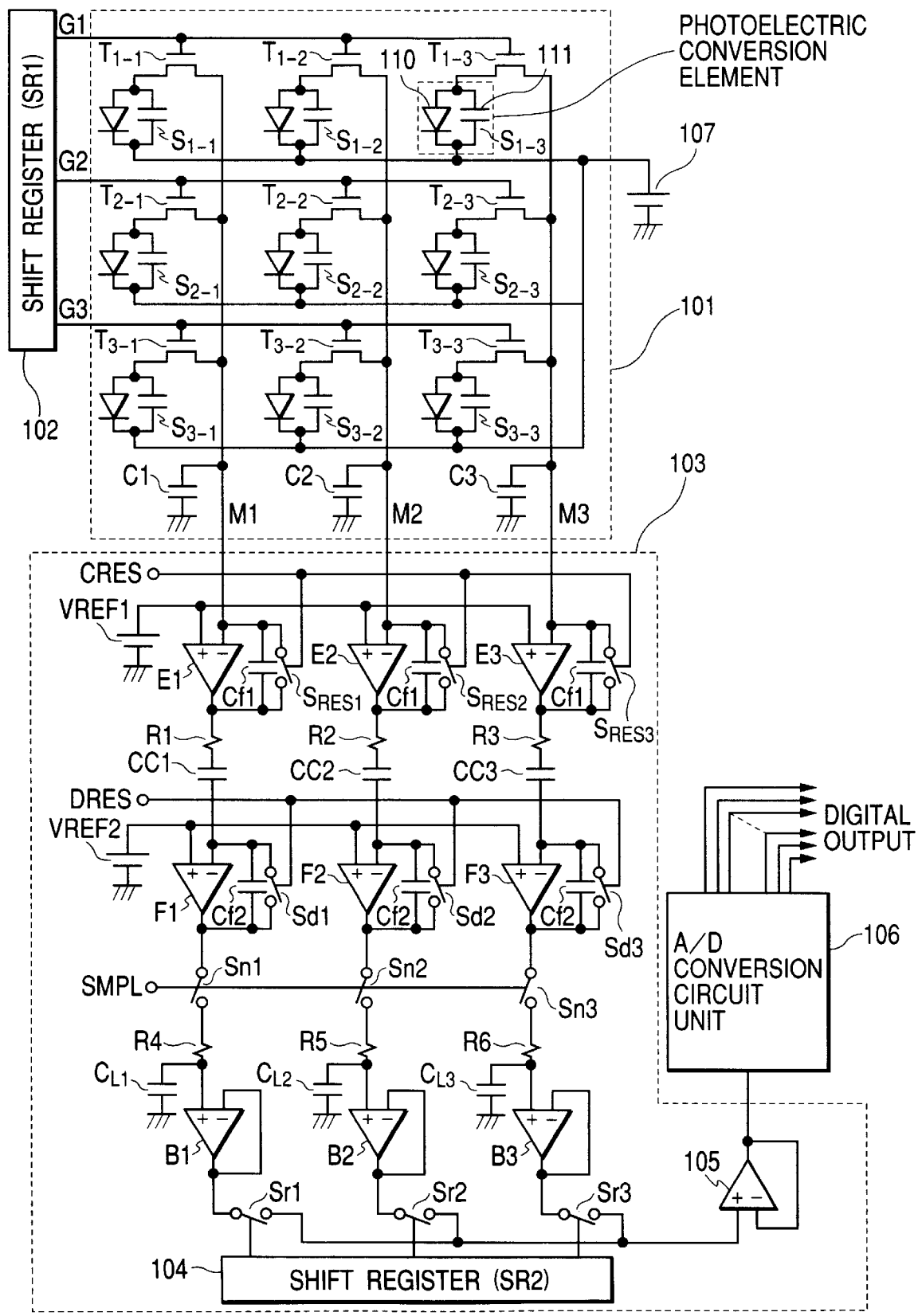
FIG. 12 is a circuit diagram of an imaging apparatus according to an eighth embodiment of the present invention.

FIG. 12 is a circuit diagram of an imaging apparatus according to an eighth embodiment of the present invention.

The configuration of FIG. 12 differs from that of FIG. 7 in that it contains resistor elements R1 to R3 and resistor elements R4 to R6.

Generally, random noise can be defined as a collection of noises with various frequency components. The total amount of noise observed is equal to the integral of the fluctuation from the mean value per unit frequency over the pass band of the system. Therefore, a detection system with a frequency band unduly wider than the pass band sufficient for the transfer of the signal charges obtained by photoelectric conversion may degrade the S/N ratio of the system.

In FIG. 12, the noise of the first operational amplifiers E1 to E3 appears in their outputs, being band-limited by the operational amplifiers themselves. First, this noise is terminated by the capacitive elements CC1 to CC3 the moment the first reset switches $S_{RES1}$ to $S_{RES3}$ are turned off. Then, the noise is superimposed over the signal charges again and further band-limited by the second operational amplifiers F1 to F3 while the signal charges are transferred. Then, it is stored in the sampling capacitors $C_{L1}$ to $C_{L3}$. The above events are independent events, and thus noise charges obtained by multiplying the noise of the first operational amplifiers E1 to E3 by √2 are stored in the sampling capacitors $C_{L1}$ to $C_{L3}$. Besides, the noise of the second operational amplifiers F1 to F3 is terminated by the sampling capacitors $C_{L1}$ to $C_{L3}$, being band-limited by the operational amplifiers themselves. The amount of the noise stored in the sampling capacitors $C_{L1}$ to $C_{L3}$ presents no problem if the frequency bands of the first operational amplifiers E1 to E3 and second operational amplifiers F1 to F3 are designed optimally for the pass band of the signals. However, it is difficult to actually design and build operational amplifiers with a simple configuration, but with the desired frequency band and a high accuracy. Therefore, this embodiment constructs a first low-pass filter with a desired cut-off frequency fc1 (Hz) using the resistor elements R1 to R3 and capacitive elements CC1 to CC3, to band-limit the first operational amplifiers E1 to E3. Also, it constructs a second low-pass filter with a desired cut-off frequency fc2 (Hz) using the resistor elements R4 to R6 and sampling capacitors $C_{L1}$ to $C_{L3}$, to band-limit the second operational amplifiers F1 to F3. The cut-off frequencies fc1 and fc2 are given by the following equations, respectively:

$$fc1 = 1/(2\pi CCi \cdot Ri) \text{ for } (i=1 \text{ to } 3) \tag{19}$$

$$fc2 = 1/(2\pi C_{Li} \cdot R_j) \text{ for } (i=1 \text{ to } 3, j=4 \text{ to } 6) \tag{20}$$

As described above, this embodiment can construct primary low-pass filters easily by the insertion of resistor elements and capacitive elements, which can shut out the high-frequency noise components of the operational amplifiers. Thus, it can provide a photoelectric conversion apparatus with a high S/N ratio without complicating circuits.

Ninth Embodiment

The above-mentioned KTC noise as well as thermal noise generated by the transistor elements and resistor elements composing the operational amplifiers depend on absolute temperature T. Besides, it is known that with increases in ambient temperature, dark current components increase in the photoelectric conversion circuit unit and change into fixed-pattern noise. Both of these factors play a role in degrading S/N ratio. Therefore, it is necessary to minimize heat generation by reducing the power consumption of the apparatus itself. Taking the above-mentioned chest X-ray image pickup apparatus with 4,000×4,000 pixels as an example, since a vast number of operational amplifiers are connected to 4,000 rows of matrix signal wirings, the read circuit unit 103 constitutes a major source of heat in the photoelectric conversion apparatus, which means that the power consumption of the read circuit unit 103 needs to be reduced.

Figure 13:
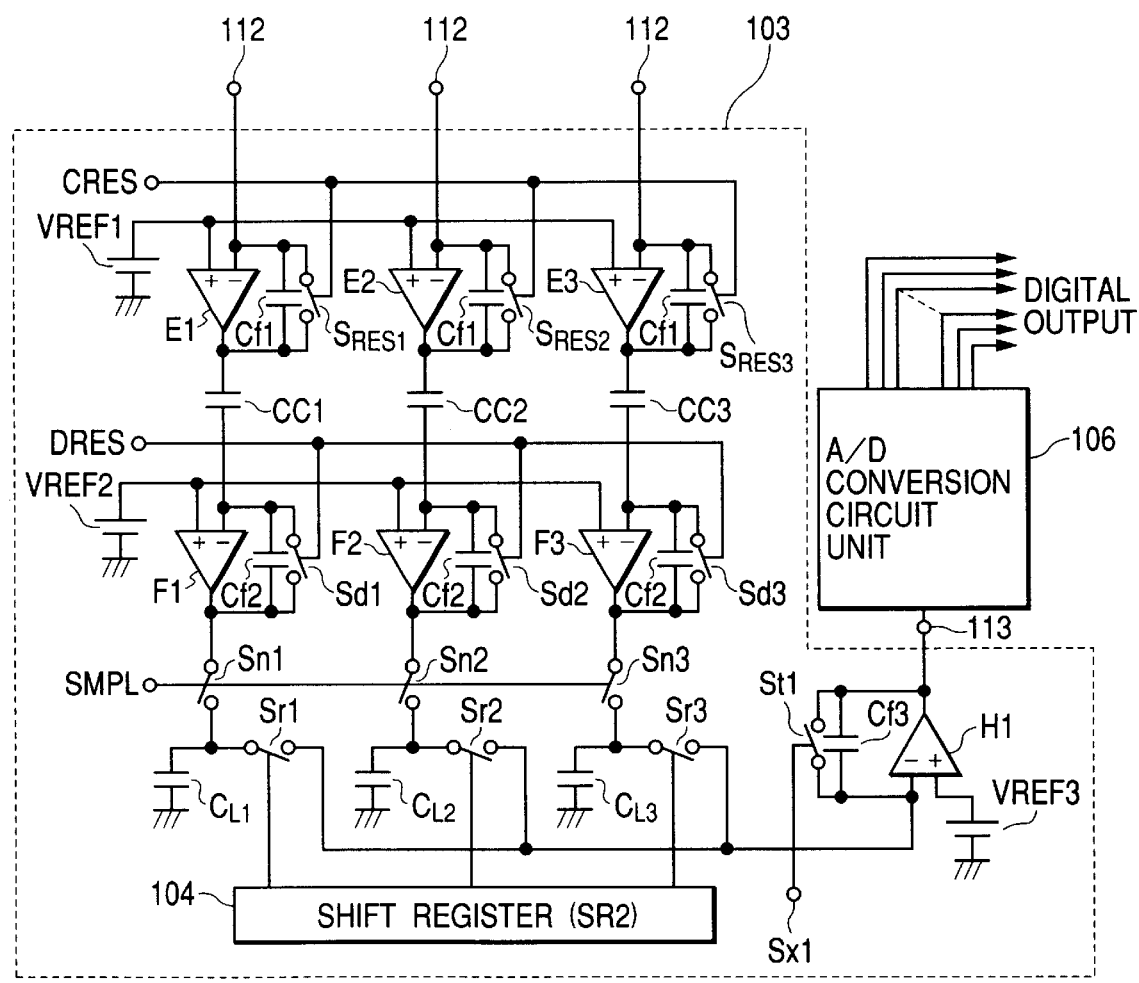
FIG. 13 is a circuit diagram of a signal transfer apparatus according to a ninth embodiment of the present invention.

FIG. 13 is a circuit diagram of a signal transfer apparatus according to a ninth embodiment of the present invention.

In FIG. 13, reference character H1 denotes a third operational amplifier whose inverting input terminal is connected with the common output of the read switches Sr1 to Sr3; Cf3 denotes third integral capacitor connected between the inverting input terminal and output terminal of the third operational amplifier H1; St1 denotes a third reset switch for resetting the third integral capacitor Cf3; Sx1 denotes a drive pulse for controlling the reset switch St1; and VREF3 denotes a third reference voltage set for the non-inverting input terminal of the third operational amplifier H1.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Tenth Embodiment

Figure 14:
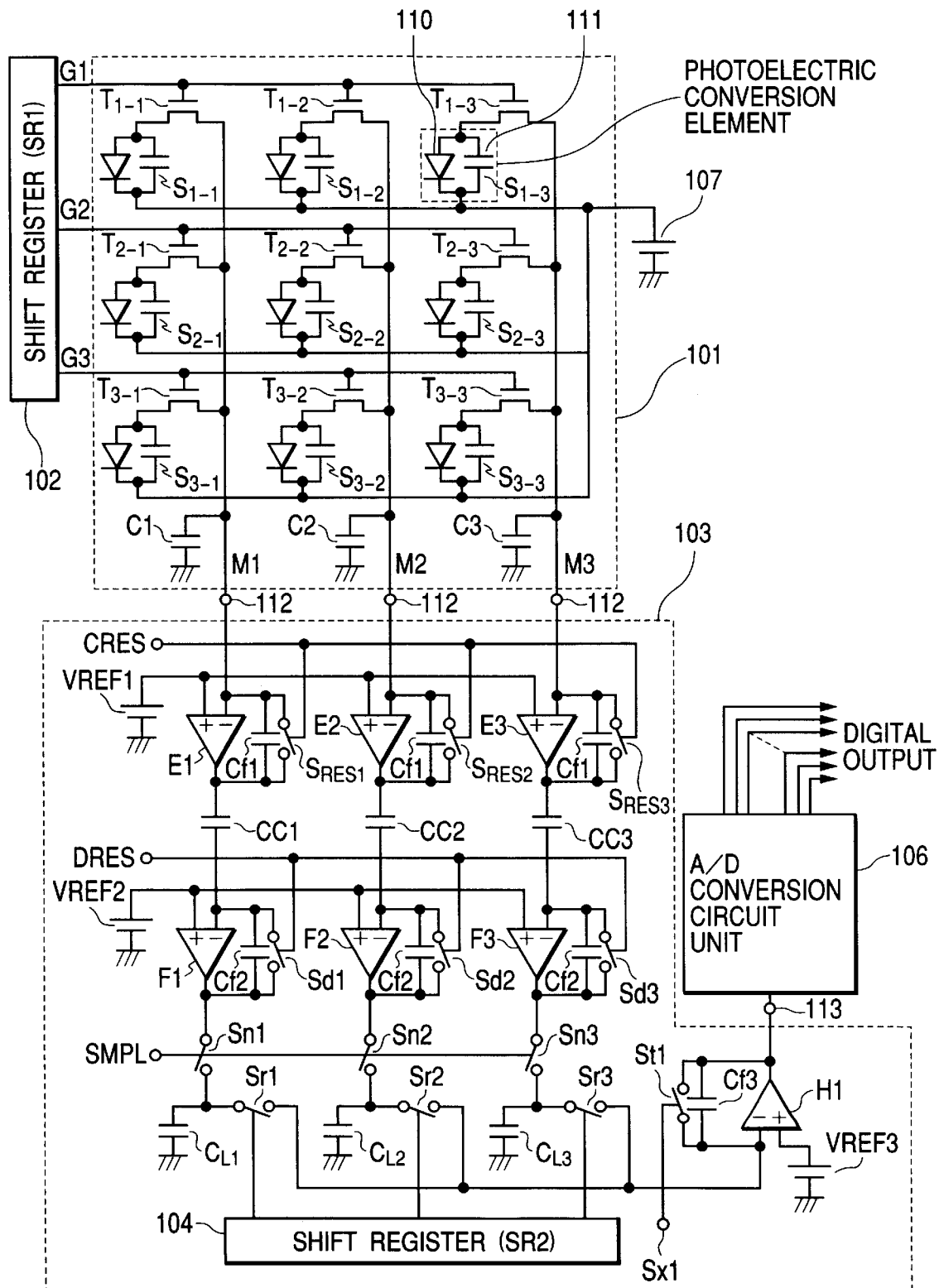
FIG. 14 is a circuit diagram of an imaging apparatus according to a tenth embodiment of the present invention.

FIG. 14 is a circuit diagram of an imaging apparatus according to a tenth embodiment of the present invention.

Description of the components denoted by the same reference characters as those described above will be omitted.

The configuration of FIG. 14 differs from that of FIG. 12 in that the buffer amplifiers B1 to B3 connected right behind the sampling capacitors $C_{L1}$ to $C_{L3}$ have been removed, that the sampling capacitors $C_{L1}$ to $C_{L3}$ are connected directly to the read switches Sr1 to Sr3, that the number of amplifier stages, i.e., the number of the operational amplifiers in a block connected to each of the matrix signal wirings M1 to M3 and subjecting a signal to parallel processing has been reduced from three to two per line, and that final output buffer amplifier 105 behind the read switches Sr1 to Sr3 has been replaced by the third operational amplifier H1.

The above configuration cuts one operational amplifier per line, which means that a total of 4,000 analog operational amplifiers are reduced in the case of the chest X-ray image pickup apparatus, reducing power consumption greatly.

Figure 15:
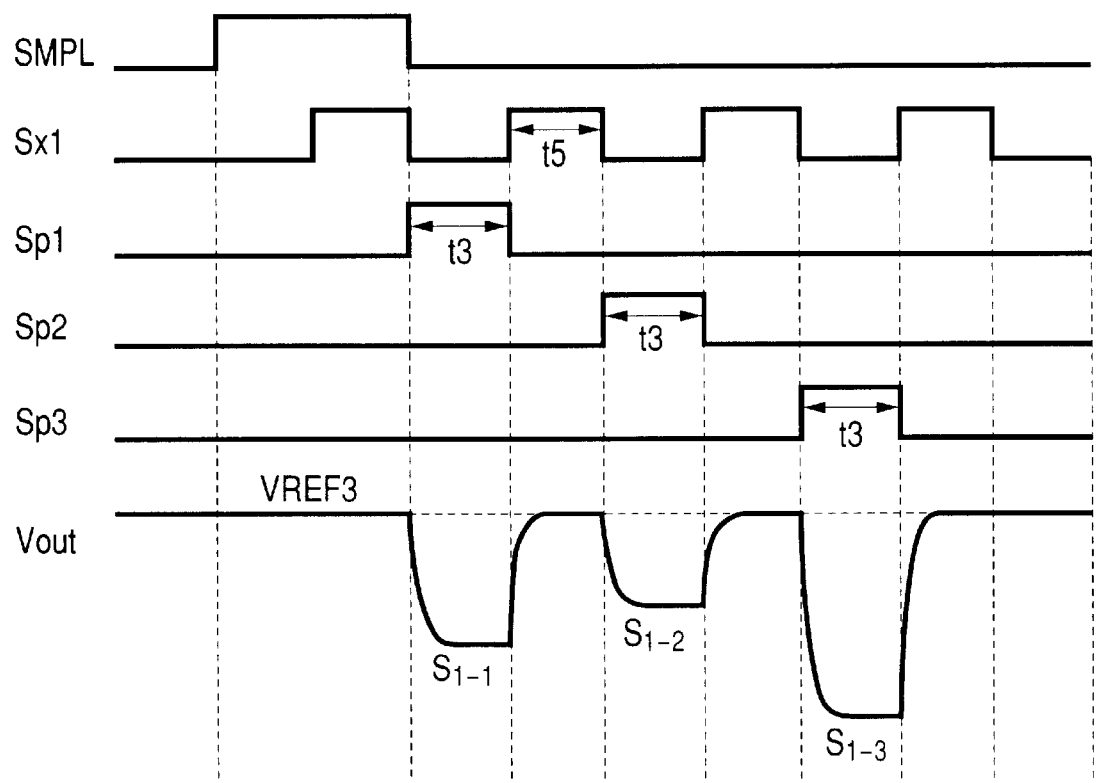
FIG. 15 is a timing chart illustrating the operation of the imaging apparatus according to the tenth embodiment of the present invention.

Now, the read operation after sampling according to this embodiment will be described with reference to the timing chart in FIG. 15. The operation before the sampling is the same as that of the sixth embodiment shown in FIG. 8, and thus description thereof will be omitted.

The third reset switch St1 is turned on by the drive pulse Sx1 for a time t5 during each of the read pulses Sp1 to Sp3 for reading to reset the third integral capacitor Cf3. The third operational amplifier H1 operates as a buffer amplifier while the third reset switch St1 is on, and thus its output voltage Vout equals the third reference voltage VREF3. As the read operation starts after the sampling operation, the first read pulse Sp1 is applied and the signal charge stored in the sampling capacitor $C_{L1}$ is read to the third integral capacitor Cf3. When the first signal charge has been read, the third reset switch St1 is turned on to reset the third integral capacitor Cf3. Then, the second read pulse Sp2 is applied and the second signal stored in the sampling capacitor $C_{L2}$ is read to the third integral capacitor Cf3 again, and so on. The output voltage Vout at this time is given by:

$$Vout=\{(1+Cf3/C_{Li})VREF3-(Cf3/C_{Li})VREF2\}-(Cf3/C_{Li})(CCi/Cf2)(Q1/Cf1) \text{ for } (i=1 \text{ to } 3) \quad (21)$$

where the second term is a signal component and Qi is the signal charges generated in the photoelectric conversion elements $S_{1-1}$ to $S_{3-3}$. The first term of the equation represents the output voltage level during a dark period. Any value can be selected for the second reference voltage VREF2 and third reference voltage VREF3 as far as the dynamic range permits. For example, if the values of the reference voltages are set such that VREF2=VREF3, the first term becomes VREF3, simplifying Equation (21). Also, as can be seen from the equation, it is possible to provide a gain equal to the ratio ($Cf3/C_{Li}$) of the third integral capacitor Cf3 to the sampling capacitor $C_{Li}$, in the third operational amplifier H1 as well.

As described above, according to this embodiment, the read circuit unit is configured such that the sampling capacitors $C_{Li}$ are connected directly to the read switches and that signals are read directly from the common output of the read switches to the integral capacitor of the operational amplifier. This makes it possible to reduce the number of the operational amplifiers in a block connected to each of the matrix signal wirings M1 to M3 and subjecting a signal to parallel processing, and thus provide an imaging apparatus with reduced power consumption.

Eleventh Embodiment

Figure 16:
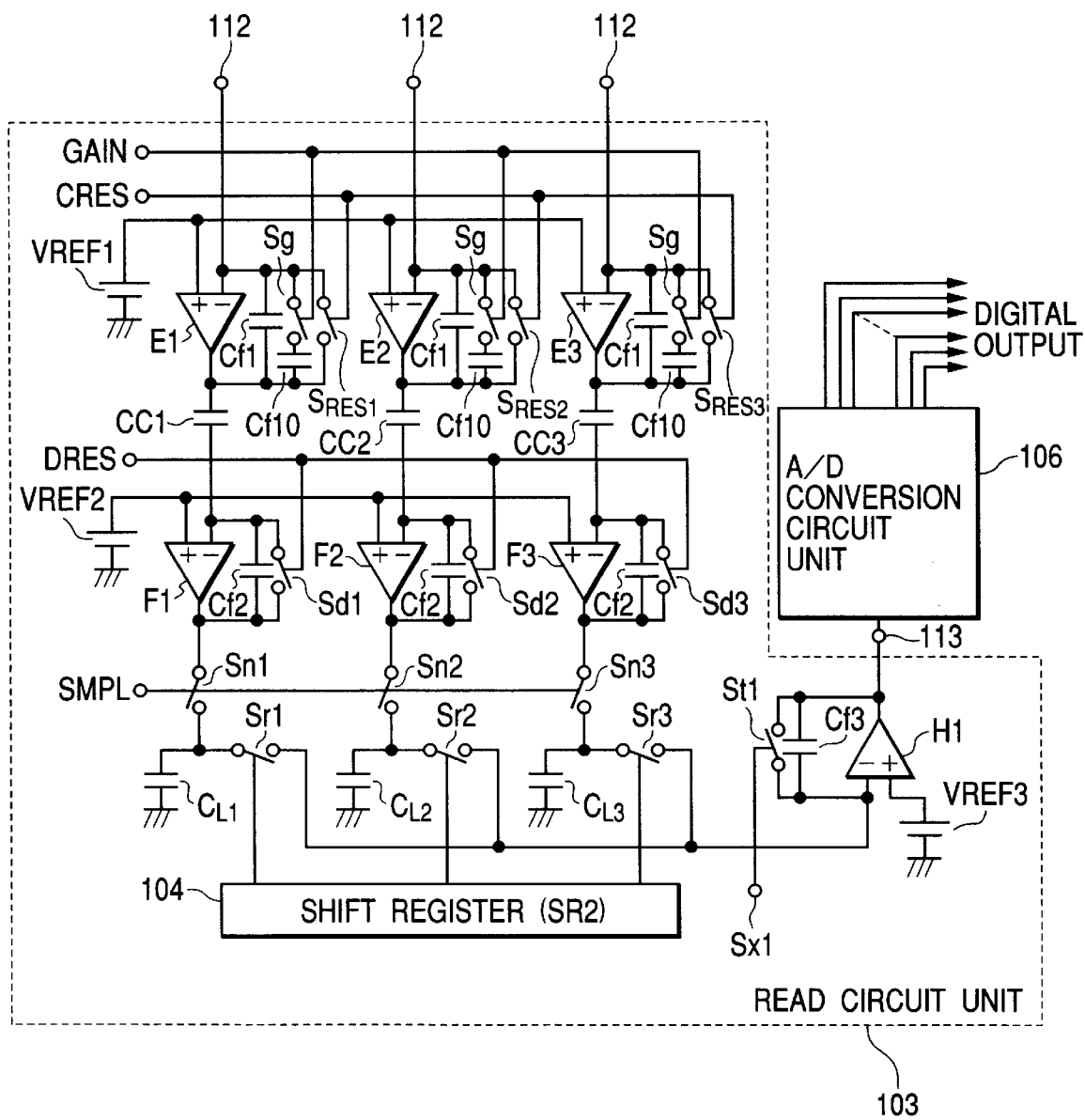
FIG. 16 is a circuit diagram of a signal transfer apparatus according to an eleventh embodiment of the present invention.

FIG. 16 is a circuit diagram of a signal transfer apparatus according to an eleventh embodiment of the present invention.

In FIG. 16, reference character Cf10 denotes an integral capacitor which provides integral capacitor connected in parallel with the first integral capacitor Cf1 which is connected to each of the first operational amplifiers E1 to E3; Sg denotes a switch for turning on and off the integral capacitor Cf10; GAIN denotes an external control signal for controlling the switches Sg.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Twelfth Embodiment

Figure 17:
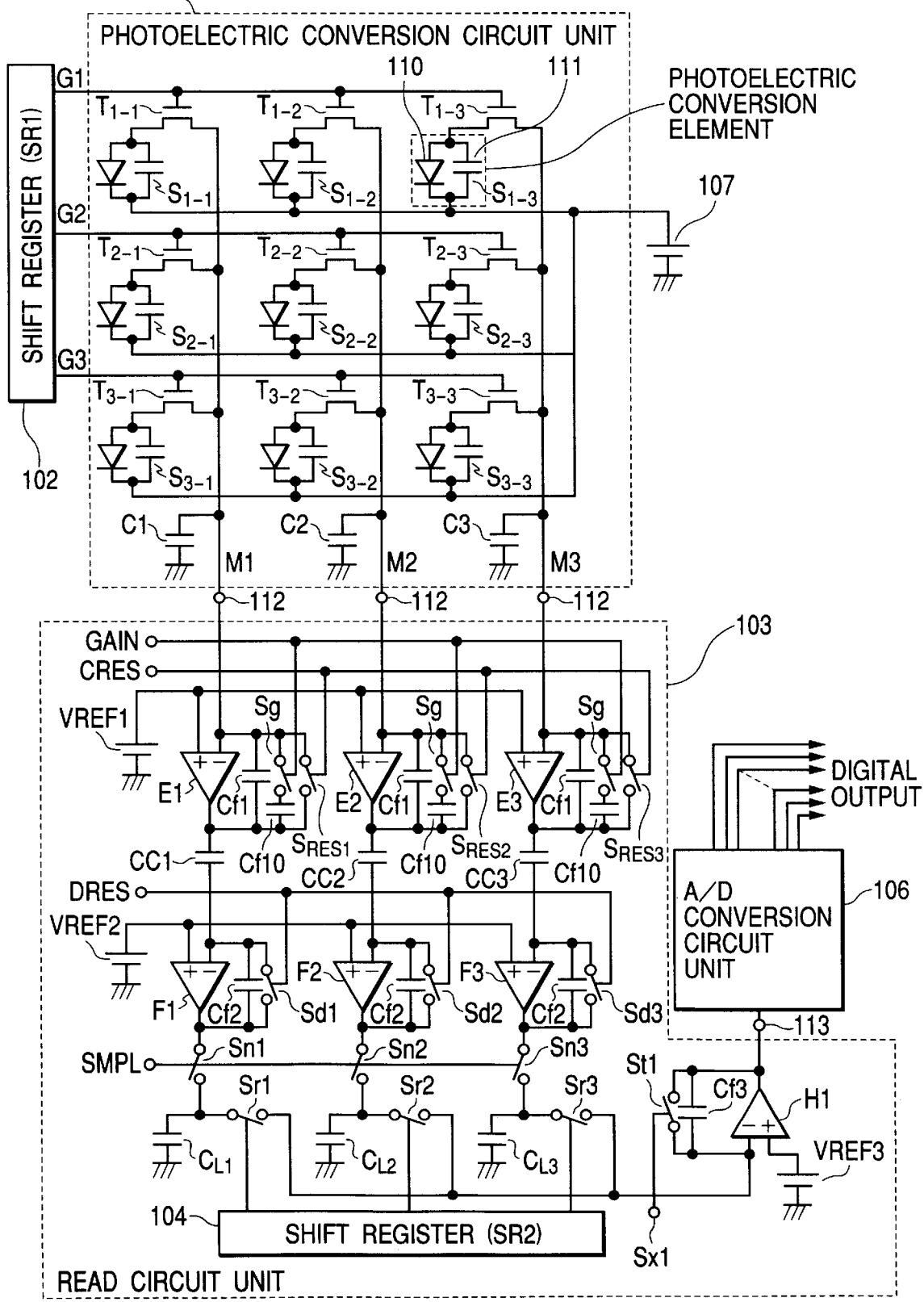
FIG. 17 is a circuit diagram of an imaging apparatus according to a twelfth embodiment of the present invention.

FIG. 17 is a circuit diagram of an imaging apparatus according to a twelfth embodiment of the present invention.

Description of the components denoted by the same reference characters as those described above will be omitted.

The configuration of FIG. 17 differs from that of FIG. 14 in that the integral capacitor Cf1 connected to each of the first operational amplifiers E1 to E3 is connected in parallel with the integral capacitor Cf10 as well as with the switch Sg for turning on and off the integral capacitor Cf10 under the control of the external control signal GAIN.

Thus, this embodiment differs from the other embodiments in that the integral capacitor Cf10 and switch Sg act to change signal gain. Specifically, if the signal charge is Qi, the output voltages Voi and Voi' (i=1 to 3) of the first operational amplifiers E1 to E3 when the switch Sg is turned on and off by the external control signal GAIN are given, respectively:

$$Voi = VREF1 - Qi/(Cf1 + Cf10) \text{ for } (i=1 \text{ to } 3) \quad (22)$$

$$Voi' = VREF1 - Qi/Cf1 \text{ for } (i=1 \text{ to } 3) \quad (23)$$

As can be seen by comparing the two equations, when the switch Sg is turned on, the signal voltage after impedance conversion by the first operational amplifiers E1 to E3 gets smaller for the same signal charge Qi because the integral capacitor Cf1 and integral capacitor Cf10 are connected in parallel. Thus, the signal gain can be varied.

The capability to change signal gain, such as the one shown in this embodiment, is useful in making full use of a dynamic range. For example, in a higher-resolution photoelectric conversion apparatus, signal charges are inevitably smaller since pixel size is smaller. However, it is possible to make full use of the input dynamic range of the A/D conversion circuit unit 106 by setting signal gain at a higher level using the external control signal GAIN. This in turn makes it possible to apply the read circuit unit 103 according to this embodiment generally to photoelectric conversion apparatus which vary not only in pixel arrays but also in pixel size.

Besides, due to variations encountered during manufacturing processes and other causes, individual photoelectric conversion elements produce different outputs. However, the photoelectric conversion apparatus according to this embodiment, which is capable of controlling the gain of the read circuit unit 103 using signals from outside the circuit unit, can correct output variations easily. This makes it possible to reduce the number of external parts for correction and improve yields, which in turn will result in cost reduction.

Although this embodiment uses pairs of the switch Sg and integral capacitor Cf10 and provides two gain levels for the sake of simplicity, this is not restrictive. More precise gain control will be possible if a plurality of switches and capacitive elements are provided and the gain is controlled by a plurality of external control signals.

Also, although only the gain of the first operational amplifiers E1 to E3 are variable according to this embodiment, the gain of second operational amplifiers F1 to F3 and third operational amplifier H1 can be made variable as well using a similar configuration with similar results.

Thirteenth Embodiment

As the number of pixel arrays increases and a photoelectric conversion unit accommodates increasingly more pixels, the read time allocated to each pixel becomes shorter if all the pixels are to be read in a certain period of time. Taking the above-mentioned chest X-ray image pickup apparatus with 4,000×4,000 pixels as an example, suppose a still image is to be read at a rate of one frame per second, the time allowed for reading one pixel is $1/(4000 \times 4000) = 62.5 \times 10^{-9}$, which is extremely short. Generally, there are attempt to decrease the read speed of individual pixels, for example, by dividing all the pixels into four units (2,000-by-2,000-pixel units) to be subjected to parallel processing instead of reading them serially. However, in order to take full advantage of "immediacy," one of the features of medical X-ray digital camera, to support outputs of higher-resolution still images and high-frame-rate moving images, it is important to increase the read speed of individual pixels itself in addition to the above-mentioned division.

In the case of the ninth embodiment described earlier, in which only one operational amplifier, i.e., the third operational amplifier H1, is used to read signals from the sampling capacitors $C_{Li}$, the read operation of one pixel takes not only the switch-on time t3 of the read pulses Sp1 to Sp3 but also the switch-on time t5 of the third reset switch St1 for resetting the third integral capacitor CB in preparation for the read operation of the next signal. The switch-on time t3 is the time needed for the third operational amplifier H1 to respond sufficiently to the amount of charge transferred from the sampling capacitors $C_{L1}$ to $C_{L3}$ to the third integral capacitor Cf3 and is determined by the performance of the third operational amplifier H1. On the other hand, the time t5 is the time needed to discharge the charge of the third integral capacitor Cf3. To reset the previous charge sufficiently, $t5 \geq 5\tau$ must be satisfied (where $\tau$ is a time constant determined by the product of the third integral capacitor Cf3 by the switch-on resistance of the third reset switch St1). As an example, if the value of the third integral capacitor CB is 10 pF and the switch-on resistance of the third reset switch St1 is 1 KΩ, the time constant $\tau$ is $10 \times 10^{-9}$ second. The time t5 needed to reset third integral capacitor Cf3 is 5 times this value or $50 \times 10^{-9}$ second. Thus, the time t3 allowed for reading an output of 4,000×4,000 pixels serially in one second is $62.5 \times 10^{-9} - 50 \times 10^{-9} = 12.5 \times 10^{-9}$ second. This means that the third operational amplifier H1 must operate very fast. The time constant could be made smaller by using a smaller value, for example, 1 pF, for the third integral capacitor Cf3. This is not desirable, however, because reduction in the value of the third integral capacitor Cf3 will increase the reset noise (KTC noise) of the third integral capacitor Cf3. Also, there is a limit to the reduction in the switch-on resistance of the third reset switch St1. Thus, the ninth embodiment described earlier needs improvement if it is to be used in a system designed for a large number of pixels and high-speed reading.

Figure 18:
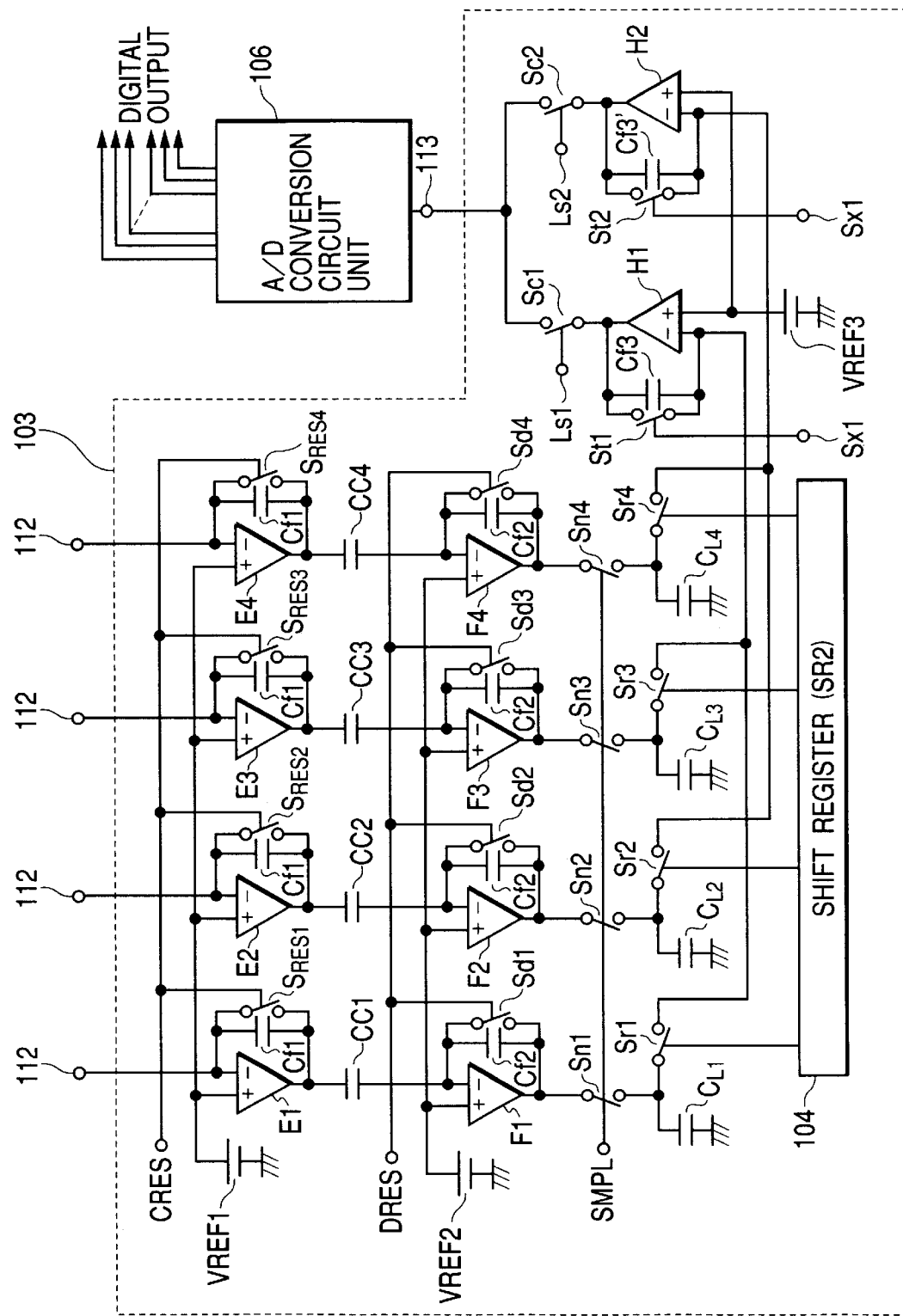
FIG. 18 is a circuit diagram of a signal transfer apparatus according to a thirteenth embodiment of the present invention.

FIG. 18 is a circuit diagram of a signal transfer apparatus according to a thirteenth embodiment of the present invention, which takes into consideration the points described above.

In FIG. 18, reference character H1 denotes a third operational amplifier whose inverting input terminal is connected with the common output of the read switches Sr1 and Sr3 and which has the same configuration as the third operational amplifier H1 of the ninth embodiment described earlier; H2 denotes a third operational amplifier whose inverting input terminal is connected with the common output of the read switches Sr2 and Sr4; Cf3' denotes a third integral capacitor connected between the inverting input terminal and output terminal of the third operational amplifier H2; St2 denotes a third reset switch for resetting the third integral capacitor Cf3'; Sx2 denotes a drive pulse for controlling the reset switch St2, and VREF3 denotes a third reference voltage set for the non-inverting input terminals of the third operational amplifiers H1 and H2; Sc1 denotes an output selector switch for connecting the third operational amplifier H1 and the A/D conversion circuit unit 106; Ls1 denotes a drive pulse for controlling the output selector switch Sc1; Sc2 denotes an output selector switch for connecting the third operational amplifier H2 and the A/D conversion circuit unit 106; and Ls2 denotes a drive pulse for controlling the output selector switch Sc2.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Fourteenth Embodiment

Figure 19:
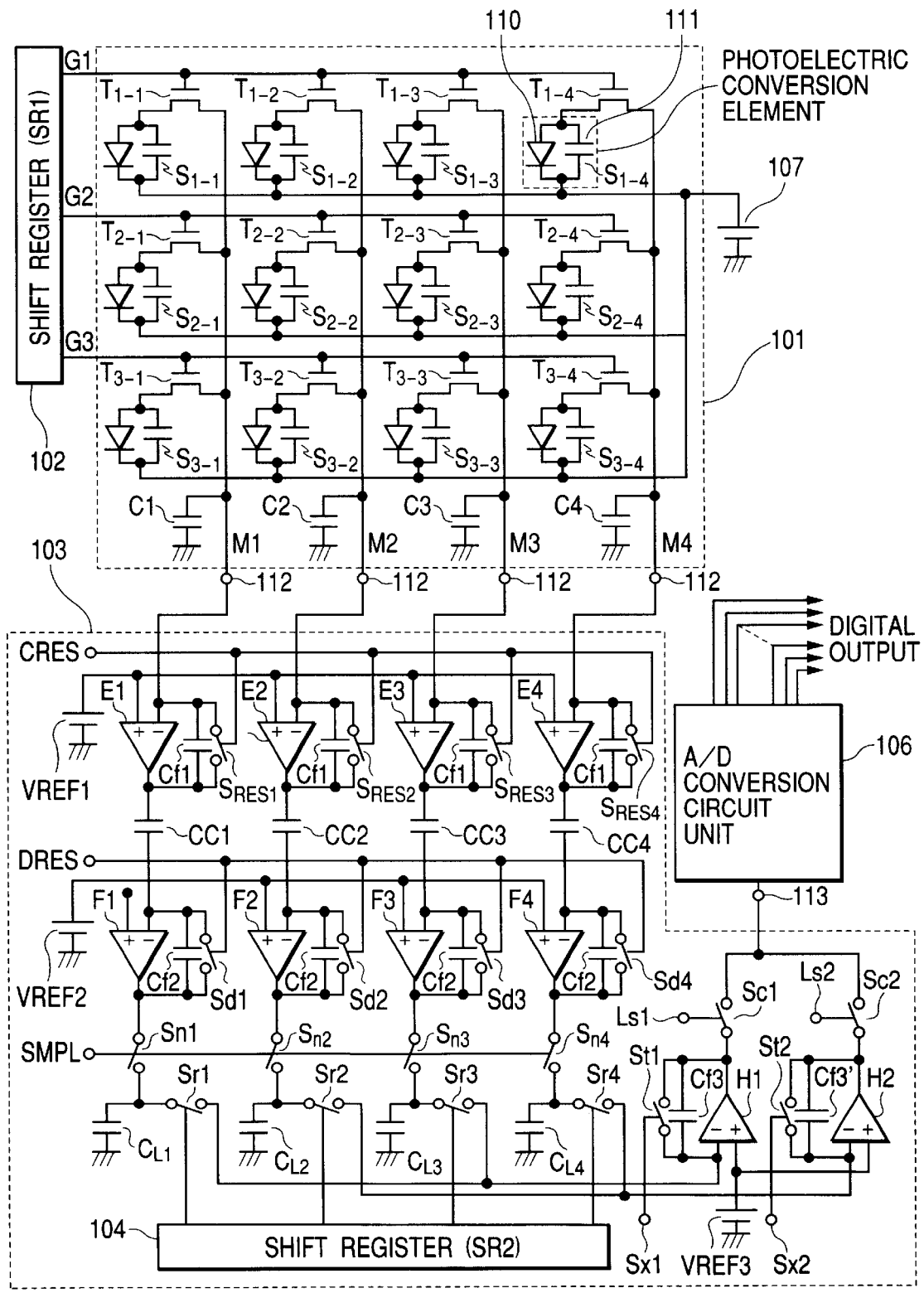
FIG. 19 is a circuit diagram of an imaging apparatus according to a fourteenth embodiment of the present invention.

FIG. 19 is a circuit diagram of an imaging apparatus according to a fourteenth embodiment of the present invention.

Description of the components denoted by the same reference characters as those described above will be omitted.

The configuration of FIG. 19 differs from that of FIG. 14 in that the read switches Sr1 to Sr4 for reading signals from the sampling capacitors $C_{L1}$ to $C_{L4}$ are connected alternately to the third operational amplifier H1 or H2, that the outputs of the third operational amplifiers H1 and H2 are connected to the output selector switches Sc1 and Sc2, respectively, while the other terminals of the output selector switches Sc1 and Sc2 make a common connection for input into the A/D conversion circuit unit 106.

Figure 20:
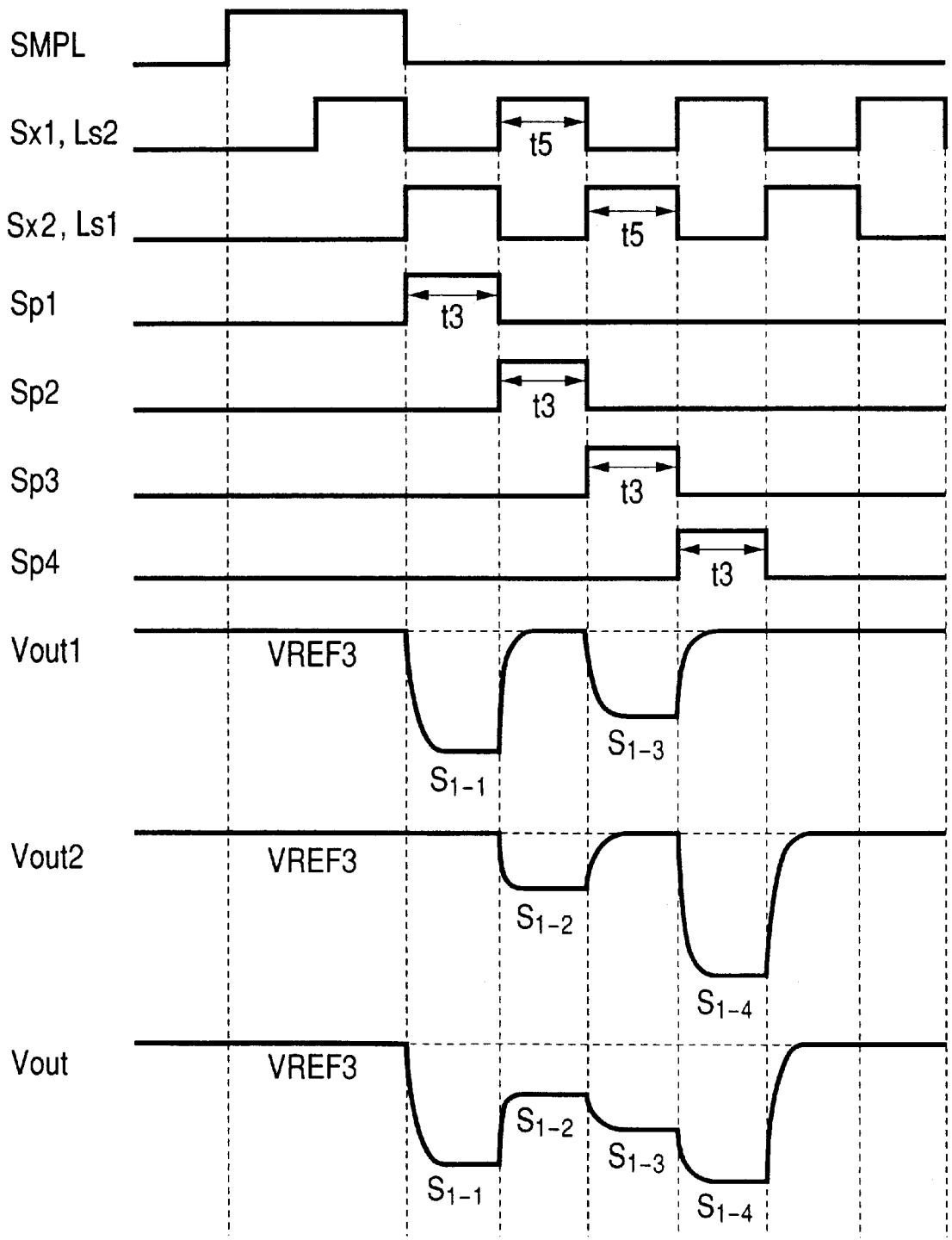
FIG. 20 is a timing chart illustrating the operation of the imaging apparatus according to the fourteenth embodiment of the present invention.

FIG. 20 is a timing chart illustrating the operation after sampling according to the fourteenth embodiment. The operation before the sampling is the same as that of the sixth embodiment shown in FIG. 8, and thus description thereof will be omitted.

As the read operation starts after the sampling operation, the first read pulse Sp1 is applied and the signal stored in the sampling capacitor $C_{L1}$ is read to the third integral capacitor Cf3 of the third operational amplifier H1. At this time, the reset switch St2 of the third integral capacitor Cf3' of the third operational amplifier H2 has been turned on by the drive pulse Sx2, and thus the third integral capacitor Cf3' has been reset. Regarding the output selector switches Sc1 and Sc2 connected to the output terminals of the third operational amplifiers H1 and H2, respectively, the output selector switch Sc1 has been turned on by the drive pulse Ls1 and the output selector switch Sc2 has been turned off by the drive pulse Ls2. Consequently, the output of the third operational amplifier H1 is selected and inputted into the A/D conversion circuit unit 106. When the first signal has been read, the respective drive pulses Sx1, Sx2, Ls1, and Ls2 for the reset switches St1 and St2 and output selector switches Sc1 and Sc2 of the third integral capacitor Cf3 and Cf3' undergo a polarity reversal, the third operational amplifier H1 is reset to prepare for a read operation of the third signal from the sampling capacitor $C_{L3}$, and the third operational amplifier H2 is connected with the A/D conversion circuit unit 106. The second signal stored in the sampling capacitor $C_{L2}$ is read to the third integral capacitor Cf3' of the third operational amplifier H2, being triggered by the second read pulse Sp2, and is output through the connection.

These actions are repeated and each pixel signal is output alternately through two output channels, the third operational amplifiers H1 and H2. Therefore, the reset period t5 of the integral capacitor does not appear in the serial output fed to the A/D conversion circuit unit 106 and only the time t3 is required to read each pixel. This eliminates the need for very fast operational amplifiers. Incidentally, although two read channels are used according to this embodiment, this number is not restrictive, and three or more channels many be used as required.

As described above, according to this embodiment, since a plurality of read channels are provided after sampling, allowing one of the operational amplifiers to be reset in preparation for the next read operation during the output period of the other operational amplifier, signals can be read fast without intermission.

Also, according to this embodiment, the signals from the third operational amplifiers H1 and H2 are output alternately to the A/D conversion circuit unit 106 as the drive pulses Sx1 and Sx2 are turned on and off alternately and the output selector switches Sc1 and Sc2 are selected alternately by the drive pulse Ls1 and Ls2. However, this method is not restrictive.

For example, it is also possible to output signals alternately to the A/D conversion circuit unit 106 only by controlling the output selector switches Sc1 and Sc2 alternately by the drive pulse Ls1 and Ls2 while turning on the drive pulses Sx1 and Sx2 simultaneously.

However, if the drive pulses Sx1 and Sx2 are turned on simultaneously and signals are transmitted simultaneously, the outputs of the third operational amplifiers H1 and H2 also change simultaneously. If these outputs are switched by the output selector switches Sc1 and Sc2 before they are sent to the A/D conversion circuit unit 106, there will be a difference between the third operational amplifiers H1 and H2 in the time until the outputs from them are taken into the A/D conversion circuit unit 106 after the read pulses Sx1 and Sx2 are turned on. When reading at a fast read speed, if Ls1 is turned on first, for example, the output from the third operational amplifier H1 will be taken into the A/D conversion circuit unit 106 before it reaches a desired voltage sufficiently while the output from the third operational amplifier H2 will be taken into the A/D conversion circuit unit 106 some time later after it has reached a desired voltage. This may result in fringes in the picture even if the signals from the third operational amplifiers H1 and H2 are identical.

Thus, in view of the demand for increasingly faster read speed, this embodiment, which turns on the drive pulses Sx1 and Sx2 alternately, is preferable.

Fifteenth Embodiment

Figure 21:
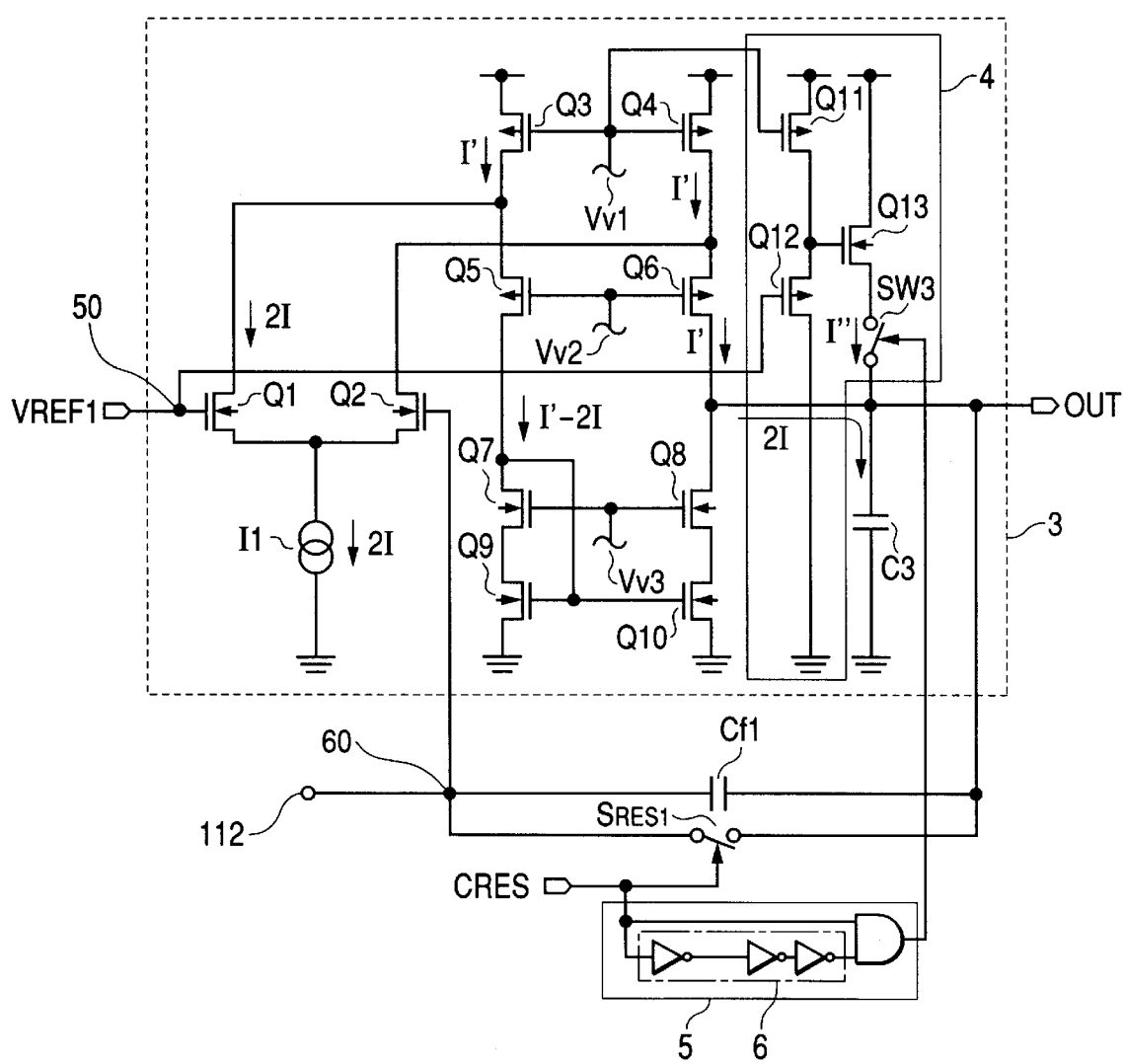
FIG. 21 is a circuit diagram of a signal transfer apparatus according to a fifteenth embodiment of the present invention.

FIG. 21 is a circuit diagram of a signal transfer imaging apparatus comprising a suitable operational amplifier characterized by increased signal-charge read speed and composing a signal transfer apparatus according to the present invention.

In FIG. 21, reference numeral 3 denotes an operational amplifier; C3 denotes a phase compensation capacitor mounted in the operational amplifier 3; SW3 denotes a switch for switching the phase compensation capacitor C3; Q1 to Q13 denote transistors; 4 denotes a switching circuit consisting of a first conductive transistor Q13, second conductive transistors Q11 and Q12, the source electrode of the transistor Q13, the phase compensation capacitor C3, and the switch SW3, among which the transistors Q13, Q11, and Q12 compose a level shift circuit; 5 denotes a control circuit for controlling the switching circuit 4; 6 denotes an inverter delay circuit consisting of an odd number of stages and composing part of the control circuit 5 for the switching circuit 4; 7 denotes a dual input AND circuit composing part of the control circuit 5 for the switching circuit 4; 50 denotes a non-inverting input terminal of the operational amplifier 3; 60 denotes an inverting input terminal of the operational amplifier 3; I1 denotes a constant-current source; and Vv1, Vv2, and Vv3 denote constant-voltage sources.

The gate of the transistor Q12 composing the switching circuit 4 is connected to a power supply which supplies the reference voltage VREF1. One input terminal each of the inverter delay circuit 6 and dual input AND circuit is connected with the control signal CRES for driving the reset switch $S_{RES1}$ and the other end of the dual input AND circuit and the output terminal of the inverter delay circuit 6 are connected to each other.

It is also possible to construct the inverter delay circuit 6 of the control means 5 from one or more shift resisters and connect an inverting output terminal of the shift resistor in the final stage to an input terminal of an AND gate of the control circuit 5. Furthermore, it is also possible to construct the inverter delay circuit 6 of the control circuit 5 from a time constant circuit, such as an RC circuit, with an inverter connected in series with it and connect an output terminal of the inverter to an input terminal of an AND gate of the control means 5.

Description of the components denoted by the same reference characters as those described above will be omitted.

The signal transfer apparatus of the present invention can be suitably used in an imaging apparatus described below. The operation of the signal transfer apparatus will be described later with reference to imaging apparatus that use it.

Sixteenth Embodiment

Figure 22:
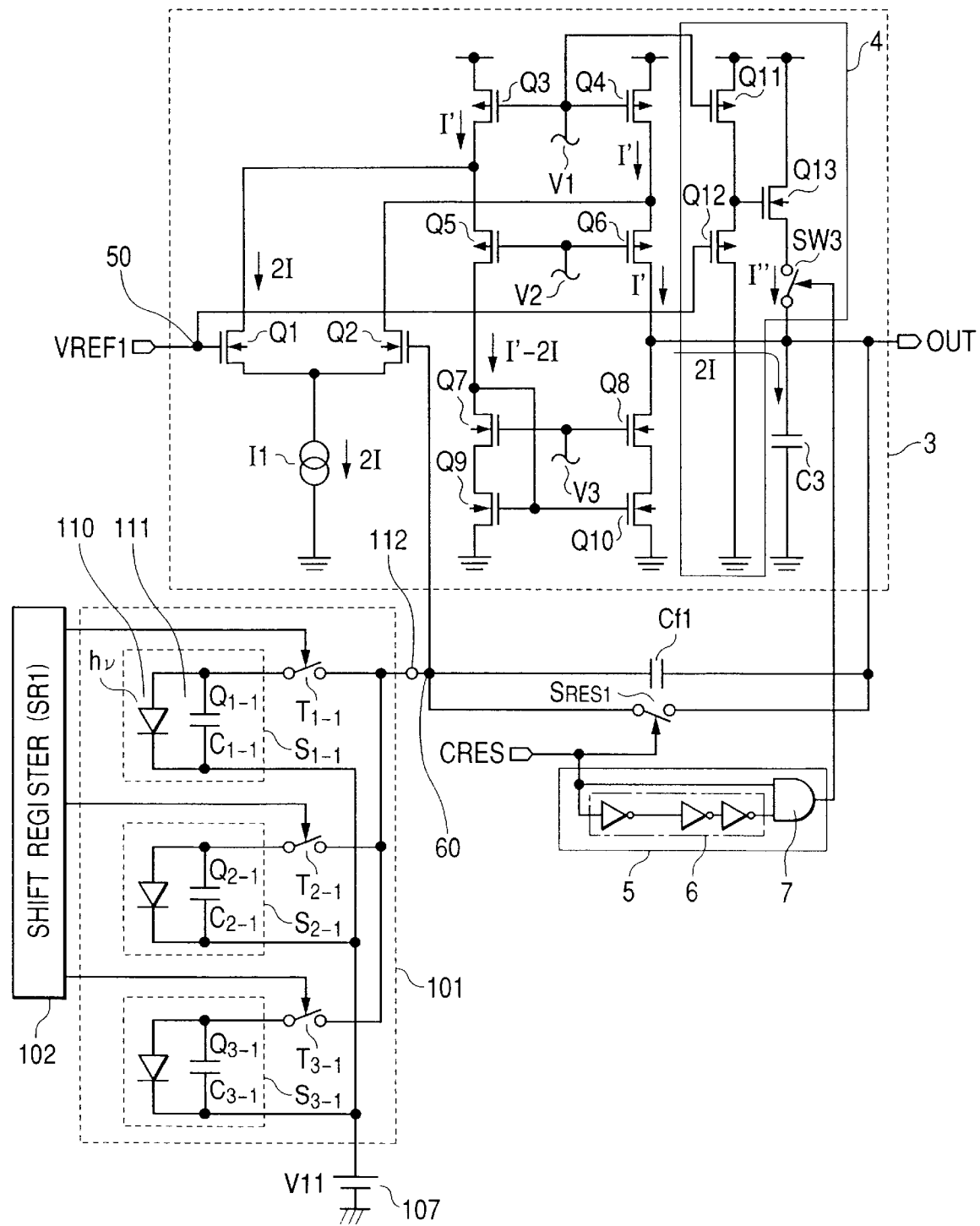
FIG. 22 is a circuit diagram of an imaging apparatus according to a sixteenth embodiment of the present invention.

FIG. 22 is a circuit diagram of an imaging apparatus according to a sixteenth embodiment of the present invention.

Description of the components denoted by the same reference characters as those described above will be omitted.

In FIG. 22, $C_{1-1}$, $C_{2-1}$ and $C_{3-1}$ denote the interelectrode capacitance for storing the signal charges of each photoelectric conversion elements $S_{1-1}$, $S_{2-1}$ and $S_{3-1}$; $Q_{1-1}$, $Q_{2-1}$ and $Q_{3-1}$ denote the amount of signal charges stored in each interelectrode capacitance $C_{1-1}$, $C_{2-1}$ and $C_{3-1}$.

In FIG. 22, the operational amplifier 3 is placed in the first stage with respect to the photoelectric conversion elements $S_{1-1}$, $S_{2-1}$, and $S_{3-1}$ as is the case, for example, with the first operational amplifier E1 in FIG. 14 for ease of comparison with the other embodiments herein. According to the present invention, however, its mounting location is not limited to this, and it may be mounted in the place of the second operational amplifiers F1 to F3 and/or third operational amplifier H1 shown in FIG. 14.

Now the operation of the imaging apparatus according to the present invention will be described with reference to FIG. 23.

Figure 23:
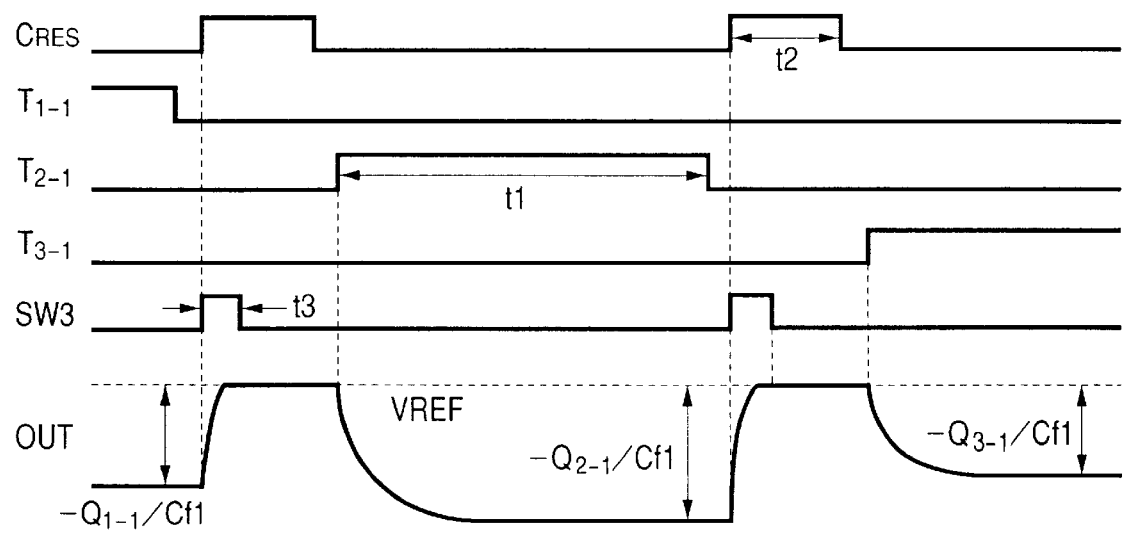
FIG. 23 is a timing chart illustrating the operation of the imaging apparatus according to the sixteenth embodiment of the present invention.

First, the signal charges resulting from photoelectric conversion by $S_{1-1}$, $S_{2-1}$, $S_{3-1}$ are stored in the interelectrode capacitance 111 in the photoelectric conversion elements for a certain period (not shown in FIG. 23).

Then, as a first transfer pulse is applied to the switches $T_{1-1}$, $T_{2-1}$, and $T_{3-1}$ by the shift register 102 for the time t1, the photoelectric conversion element $S_{1-1}$ and as the inverting input terminal of the operational amplifier 3 conduct, the signal charge $Q_{1-1}$ is transferred to the first integral capacitor Cf1, the output of the operational amplifier 3 changes, and the output signal is transmitted to a processing circuit in the subsequent stage (read operation).

Then, in order to read the next photoelectric conversion element $S_{2-1}$, it is necessary to reset the first integral capacitor Cf1 storing the signal charge of the previous pixel. For that, the reset switch $S_{RES1}$ is turned on by the application of the control signal CRES, turning on a differential-input transistor Q1 of the operational amplifier 3 and turning off a differential-input transistor Q2 of the operational amplifier 3, and consequently the phase compensation capacitor C3 is charged with a bias current 21. In addition, according to this embodiment, when the control signal CRES of the first reset switch $S_{RES1}$ becomes high, the output of the control means 5 goes high simultaneously, turning on the switch SW3, which in turn causes the Q13's source electrode and the phase compensation capacitor C3 to conduct. Consequently, the phase compensation capacitor C3 is charged also with a time constant τ3, which is determined by the output impedance of the transistor Q13, the switch-on resistance of the switch SW3, and the value of the phase compensation capacitor C3. Incidentally, the output impedance of the transistor Q13 and the switch-on resistance of the switch SW3 can be decreased by increasing their transistor size, and thus the time constant τ3 can be made sufficiently small, increasing the slew rate of the operational amplifier 3.

Then, when the delay time t3 of the inverter delay circuit 6 elapses, the output of the control circuit 5 becomes low, turning off the switch SW3 and thereby causing the operational amplifier 3 to operate as a buffer amplifier. It is possible here to reduce the reset time t2 by adjusting transistor size as well as the current value of the transistor Q11, which is a constant-current source, in advance such that the gate-source voltages of the transistors Q12 and Q13, which compose the level shift circuit, will be equal to each other: since the potential of the phase compensation capacitor C3 becomes the same as when the operational amplifier 3 operates as a buffer amplifier, the output voltage of the operational amplifier 3 stabilizes quickly at VREF1 after the forced reset period t3, resulting in a shorter reset time t2.

When the reset period is over, the read operation is started. The signal charge of the next pixel of the photoelectric conversion apparatus 101 is read to the first integral capacitor Cf1 by the shift register 102 and the switching elements $T_{1-1}$, $T_{1-2}$, and $T_{1-3}$.

According to this embodiment, although transient current I" is generated during charging because the phase compensation capacitor C3 of the operational amplifier 3 is charged forcefully by the switching circuit 4, it is limited to the period until the potential of C3 reaches the desired potential VREF1, i.e., to the time t3 at the maximum, and thus the increase in power consumption can be kept to the necessary minimum.

Seventeenth Embodiment

Figure 24:
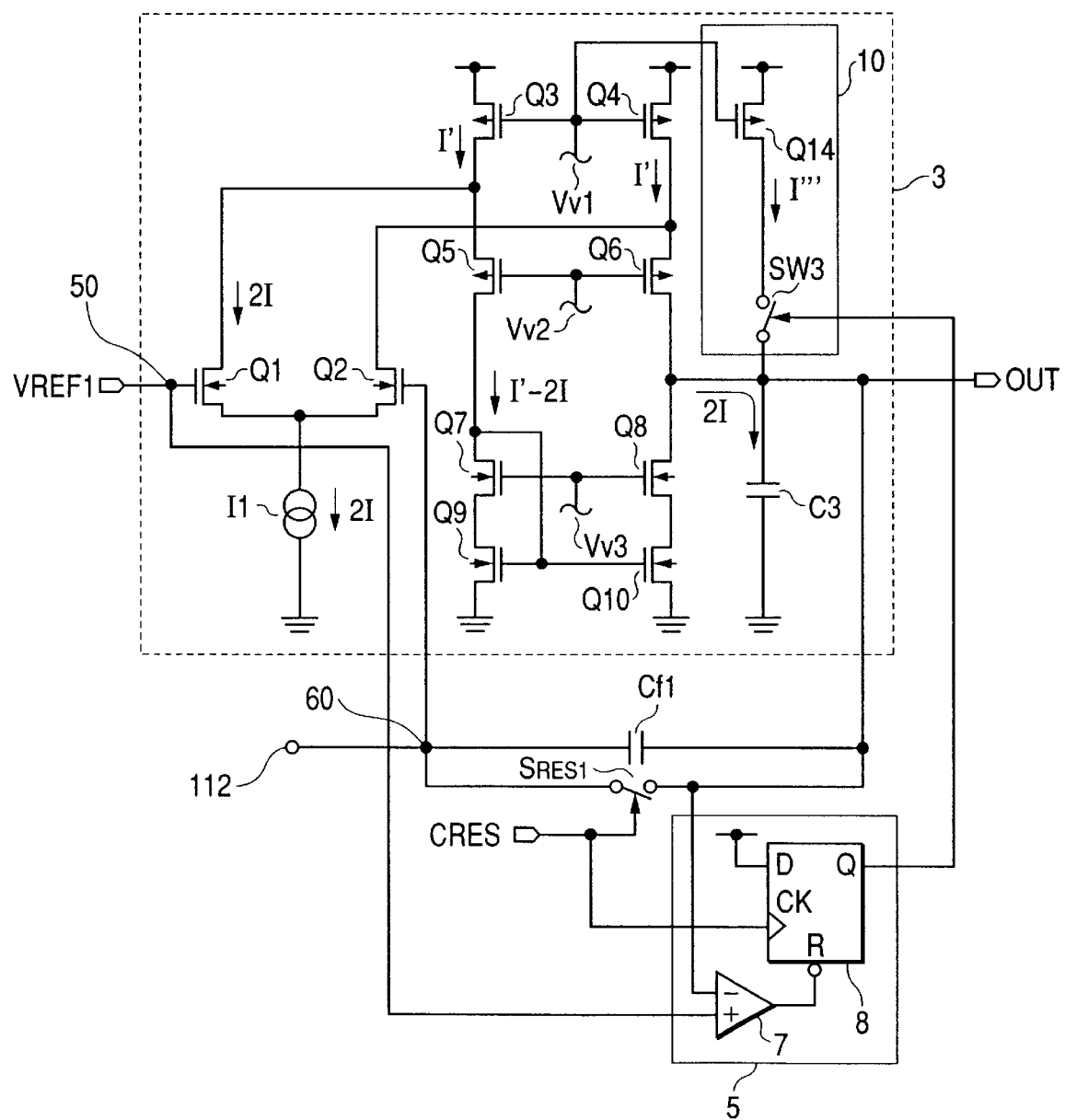
FIG. 24 is a circuit diagram of a signal transfer apparatus according to a seventeenth embodiment of the present invention.

FIG. 24 is a circuit diagram of a signal transfer apparatus comprising a suitable operational amplifier characterized by increased signal-charge read speed and composing a signal transfer apparatus according to the present invention.

In FIG. 24, reference numeral 7 denotes a comparator, 8 denotes a latch circuit, Q14 denotes a second conductive transistor serving as a constant-current source, 10 denotes a switching circuit for charging the phase compensation capacitor C3 of the operational amplifier 3 consisting of the transistor Q14 and the switch SW3, and 9 denotes a control circuit which consists of the comparator 7 and latch circuit 8 and controls the switching circuit 10. The inverting input terminal of the comparator 7 is connected with the output terminal of the operational amplifier 3 while the non-inverting input terminal is connected with the reference voltage VREF1. A data input terminal of the latch circuit 8 is connected with a power supply, a clock input terminal is connected with the control signal CRES for driving the reset switch $S_{RES1}$, a reset terminal is connected with an output terminal of the comparator 7, and a non-inverting data output terminal drives the switch SW3.

Description of the components denoted by the same reference characters as those described above will be omitted.

This embodiment is characterized in that the phase compensation capacitor C3, which is charged, when reset, said capacitor C3 is also charged with a constant current I''' as the switch SW3 is turned on.

The signal transfer apparatus of the present invention can be suitably used in an imaging apparatus described below. The operation of the signal transfer apparatus will be described later with reference to imaging apparatus that use it.

Eighteenth Embodiment

Figure 25:
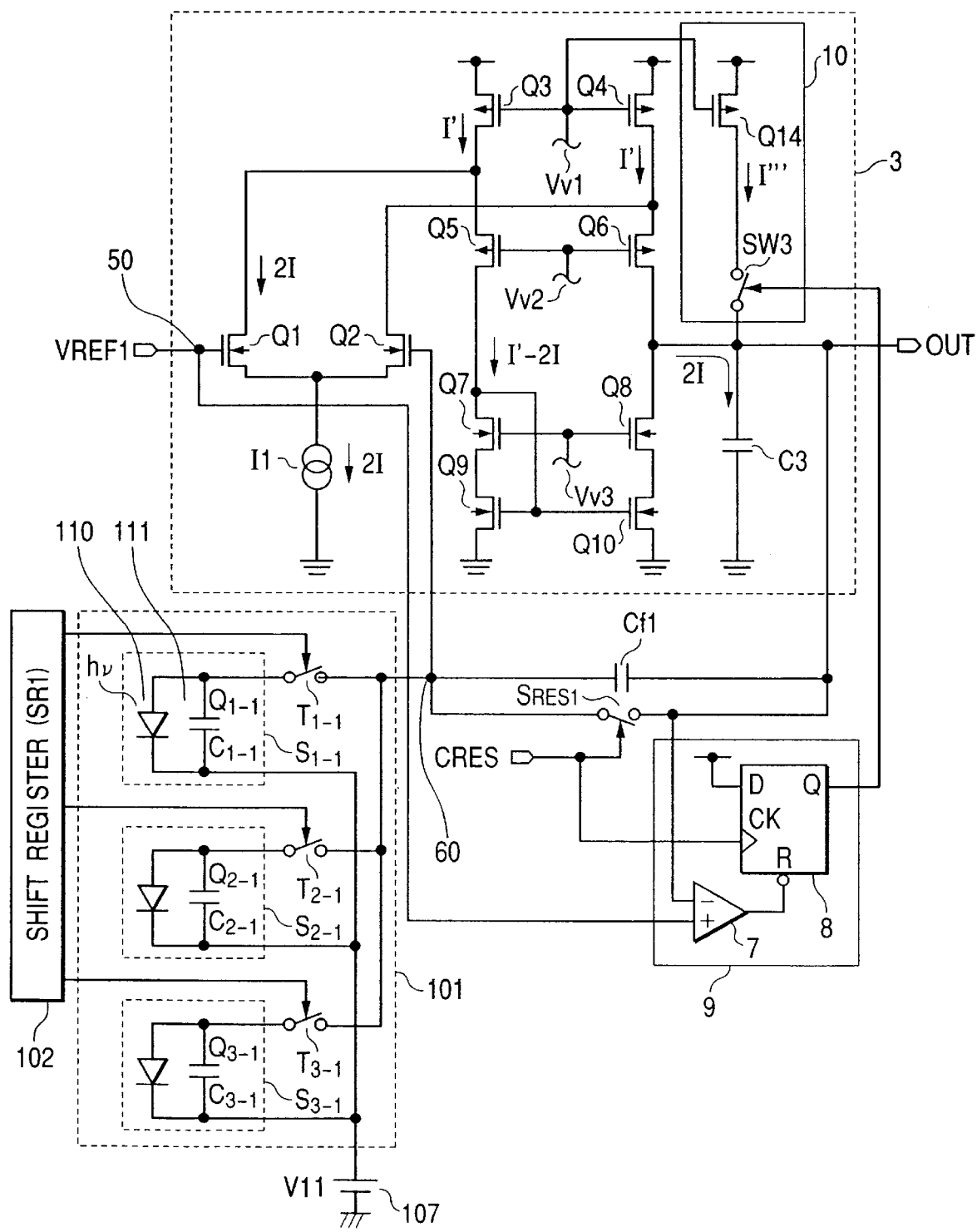
FIG. 25 is a circuit diagram of an imaging apparatus according to an eighteenth embodiment of the present invention.

FIG. 25 is a circuit diagram of an imaging apparatus according to an eighteenth embodiment of the present invention.

Description of the components denoted by the same reference characters as those described above will be omitted.

The configuration of FIG. 25 differs from that of FIG. 22 in that the control circuit for controlling the switching circuit 10 consists of the comparator 7 and latch circuit 8.

In FIG. 25, the operational amplifier 3 is placed in the first stage with respect to the photoelectric conversion elements $S_{1-1}$, $S_{2-1}$, and $S_{3-1}$ as is the case, for example, with the first operational amplifier E1 in FIG. 14 for ease of comparison with the other embodiments herein. According to the present invention, however, its mounting location is not limited to this, and it may be mounted in the place of the second operational amplifiers F1 to F3 and/or third operational amplifier H1 shown in FIG. 14.

Figure 26:
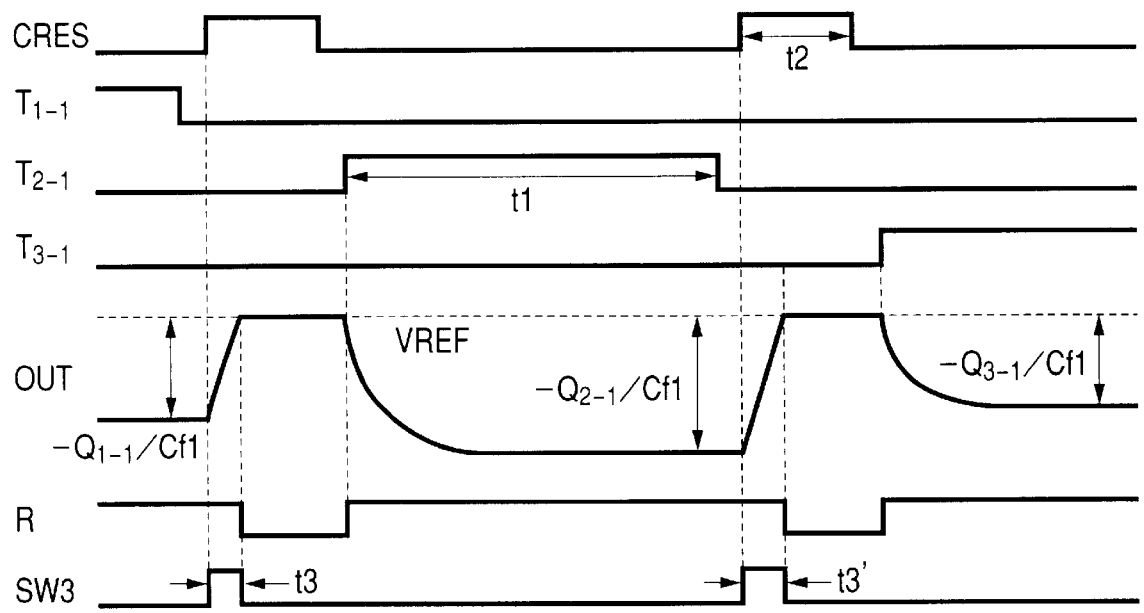
FIG. 26 is a timing chart illustrating the operation of the imaging apparatus according to the eighteenth embodiment of the present invention.

Now the operation of the imaging apparatus according to the present invention will be described with reference to FIG. 26.

First, the signal charges resulting from photoelectric conversion by $S_{1-1}$, $S_{2-1}$, $S_{3-1}$ are stored in the interelectrode capacitance 111 in the photoelectric conversion elements for a certain period (not shown in FIG. 25).

Then, as a first transfer pulse is applied to the switches $T_{1-1}$, $T_{2-1}$, and $T_{3-1}$ by the shift register 102 for the time t1, the photoelectric conversion element $S_{1-1}$ and the inverting input terminal of the operational amplifier 3 conduct, the signal charge $Q_{1-1}$ is transferred to the first integral capacitor Cf1, the output of the operational amplifier 3 changes, and the output signal is transmitted to a processing circuit in the subsequent stage (read operation).

Then, in order to read the next photoelectric conversion element $S_{2-1}$, it is necessary to reset the first integral capacitor Cf1 storing the signal charge of the previous pixel. For that, the reset switch $S_{RES1}$ is turned on by the application of the control signal CRES. At that very moment, the comparator 7 output is high since the output of the first operational amplifier E1 is lower than VREF1, remaining in the state in which it was when the signal of the previous pixel was output. Therefore, the latch circuit 8 is enabled, the control signal CRES and output data become high simultaneously, turning on the switch SW3, which in turn causes the transistor Q14 and phase compensation capacitor C3 to conduct. Consequently, the phase compensation capacitor C3 is charged also with the constant current I''' supplied by Q14, increasing the through rate of the operational amplifier 3.

$$1/SR(t/V) = C3/(2I+I''') \qquad (24)$$

When the phase compensation capacitor C3 is charged, the moment the output voltage of the operational amplifier 3 exceeds the desired voltage VREF1 for the operational amplifier 3 to operate as a buffer amplifier during the reset period, the comparator 7 output goes low. This resets the latch circuit 8, turning off the switch SW3 and thereby causing the operational amplifier 3 to operate as a buffer amplifier and stabilize.

When the reset period is over, the read operation is started. The signal charges of the next pixel of the photoelectric conversion apparatus 101 are read to the first integral capacitor Cf1 by the shift register 102 and the switching elements $T_{1-1}$, $T_{1-2}$, and $T_{1-3}$.

According to this embodiment, although the phase compensation capacitor C3 of the operational amplifier 3 is charged forcefully with the constant current I''' supplied from the switching circuit 10, it is limited to the period until the output voltage of the operational amplifier 3 reaches the desired voltage VREF1. Besides, the power consumption of the comparator 7 can be reduced compared to the bias current I. This makes it possible to reduce the reset time t2 while keeping increase in power consumption at a low level.

Now, a radiation image pick-up system according to an embodiment of the present invention will be described below. The imaging apparatus according to the embodiments described above can be used as this imaging apparatus.

Figure 27A:
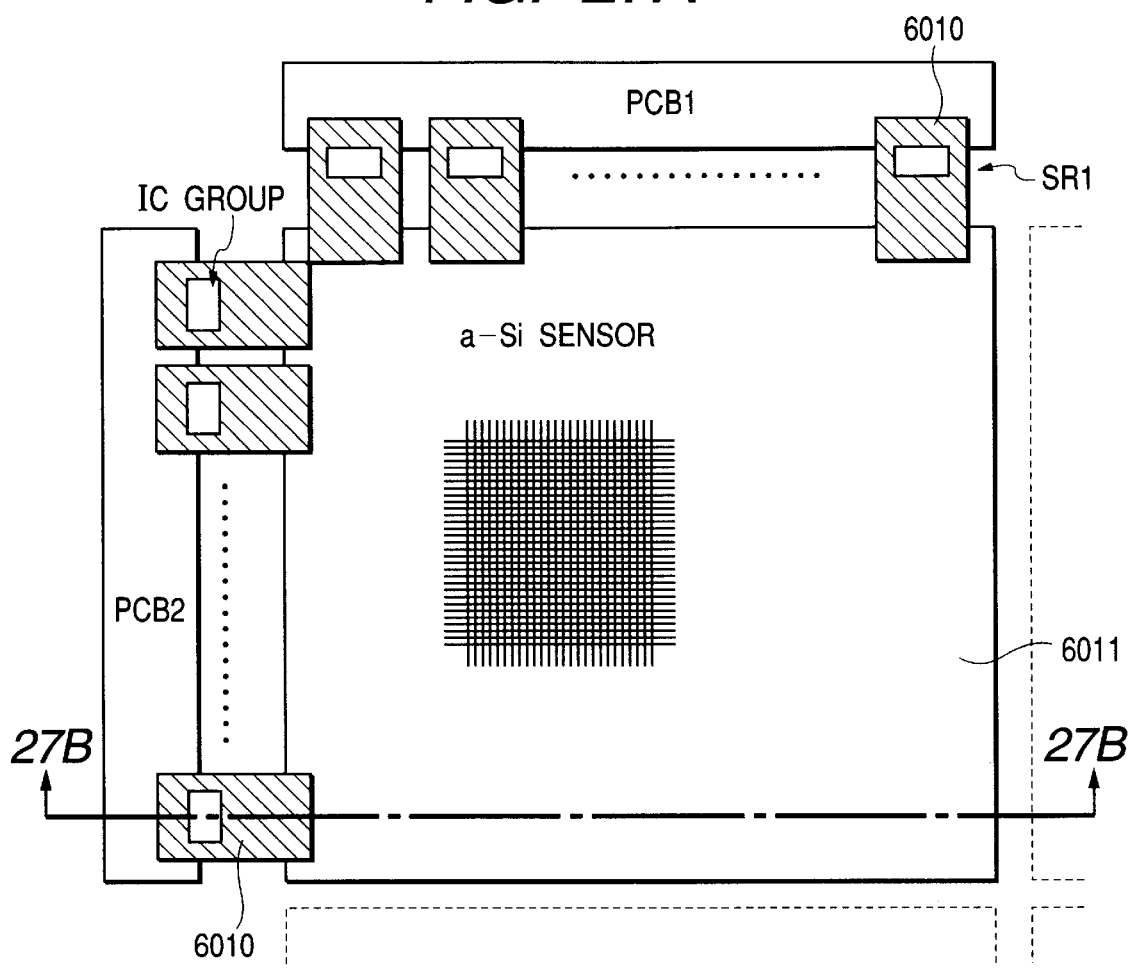
FIG. 27A is a schematic block diagram showing an implementation example of a radiation image pick-up apparatus according to the present invention.
Figure 27B:
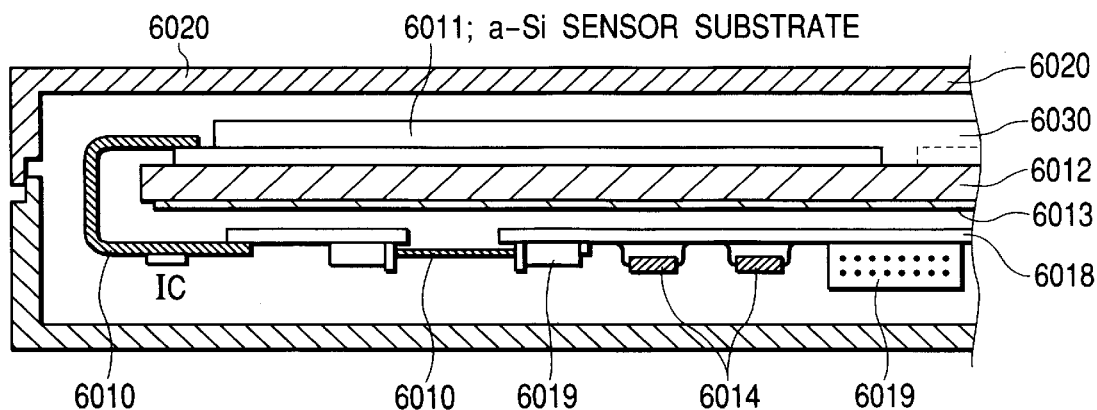
FIG. 27B is a schematic sectional view taken along line 27B—27B in FIG. 27A.
Figure 29:
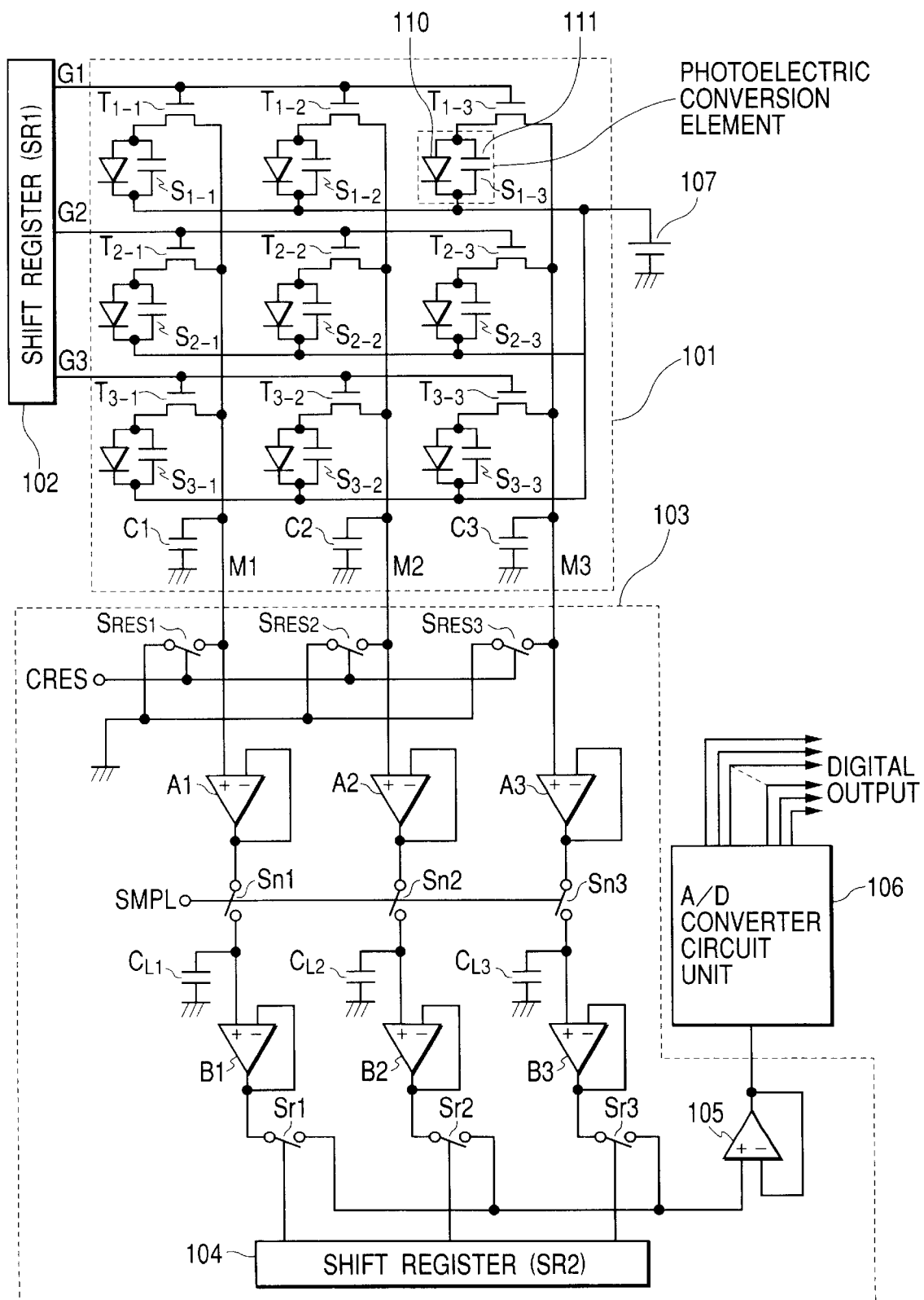
FIG. 29 is a circuit diagram of a first example of conventional photoelectric conversion apparatus.

FIG. 27A is a schematic block diagram showing an implementation example of an X-ray detecting apparatus as a radiation image pick-up apparatus according to the present invention. FIG. 27B is a schematic sectional view taken along line 27B—27B in FIG. 27A.

Reference numeral 6011 denotes a sensor substrate (a-Si sensor substrate) on which a plurality of amorphous silicon photoelectric conversion elements and a plurality of amorphous silicon TFTs are formed (both of which are not shown), SR1 denotes a shift register, 6010 denotes a flexible circuit board on which the shift register SR1 and a detector integrated circuit IC are mounted, PCB1 denotes a circuit board connected with the a-Si sensor substrate 6011 via the flexible circuit board 6010, and PCB2 similarly denotes a circuit board connected with the a-Si sensor substrate 6011 via the flexible circuit board 6010. An LSI chip (IC) containing the signal transfer apparatus according to the present invention is mounted on the flexible circuit board. Reference numeral 6012 denotes a base substrate for forming a large photoelectric conversion apparatus by bonding a plurality of a-Si sensor substrates 6011; 6014 denotes memory; 6013 denotes a lead plate for protecting the memory 6014 from X-rays; 6018 denotes a processing circuit, 6019 denotes a connector; 6020 denotes a carbon fiber case for housing the entire apparatus; 6030 denotes a scintillator for converting an X-ray incident on the a-Si sensor substrates 6011 to visible light. The scintillator 6030 may be, for example, CsI prepared by evaporation.

FIG. 28 shows an X-ray diagnostic system as a radiation image pick-up system according to the present invention, an application of the imaging apparatus described above.

In FIG. 28, reference numeral 6050 denotes an X-ray tube; 6060 denotes X-rays generated by the X-ray tube 6050; 6040 denotes an image sensor serving as an imaging apparatus; 6061 denotes a patient or subject; 6062 denotes the chest of the subject 6061; 6070 denotes an image processor for image processing; 6080 and 6081 denote displays; 6090 denotes transmission means such as a telephone line; 6100 denotes a film processor; and 6110 denotes a film serving as a recording means.

The operation of the X-ray diagnostic system shown in FIG. 28 flows as follows: X-rays 6060 generated by the X-ray tube 6050 pass through the chest 6062 of the subject 6061 and enter the image sensor 6040 consisting of the photoelectric conversion apparatus with the scintillator mounted on its upper side. The incident X-rays contain information about the inner body of the subject 6061. In response to the incident X-rays, the scintillator emits light, which is converted to corresponding electric information. After the electric information is converted into digital form, it is subjected to image processing by the image processor 6070. Then it can be viewed on the display 6080 in a control room.

The information may be transmitted to remote locations via transmission means such as the telephone line 6090, displayed on the display 6081 in a doctor room, etc. elsewhere, or stored in a magneto-optical disk or other recording means, to allow doctors in remote locations to conduct diagnosis. The information may also be recorded on the film 6110 or other recording means via the film processor 6100.

COMPARATIVE EXAMPLES

Two examples, first and second comparative examples, will be cited below for comparison with the sixteenth and eighteenth embodiments of the present invention.

Figure 32:
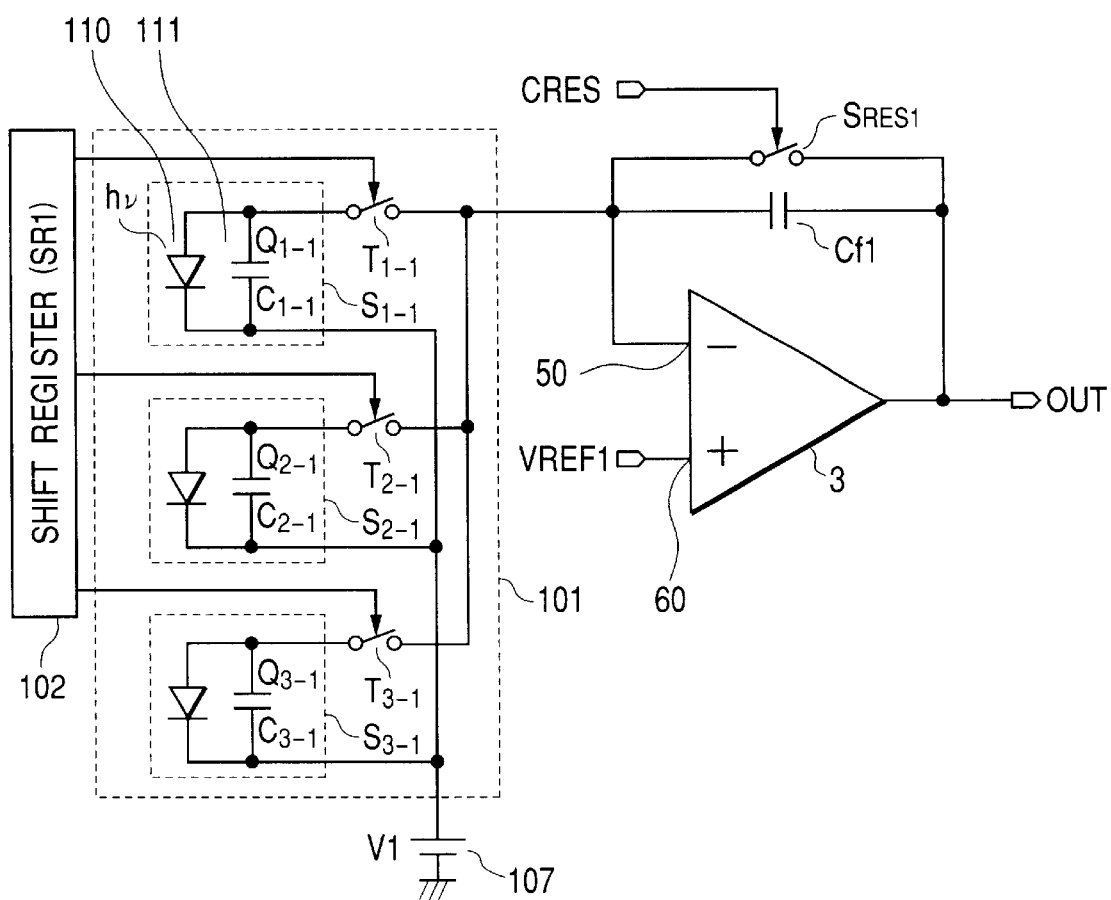
FIG. 32 is a circuit diagram of an imaging apparatus provided as a first comparative example.
Figure 33:
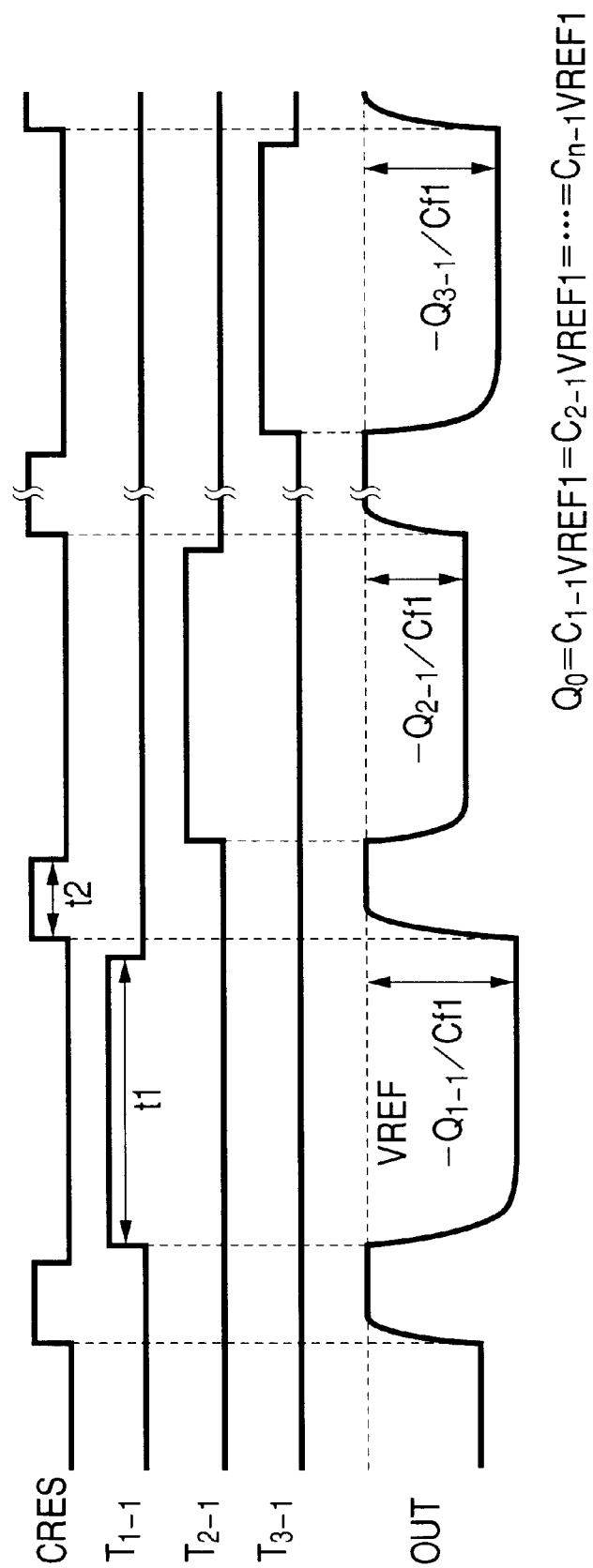
FIG. 33 is a timing chart illustrating the operation of the imaging apparatus provided as the first comparative example.

FIG. 32 is a circuit diagram of an imaging apparatus provided as a first comparative example. FIG. 33 is a timing chart illustrating the operation of the first comparative example shown in FIG. 32.

Figure 34:
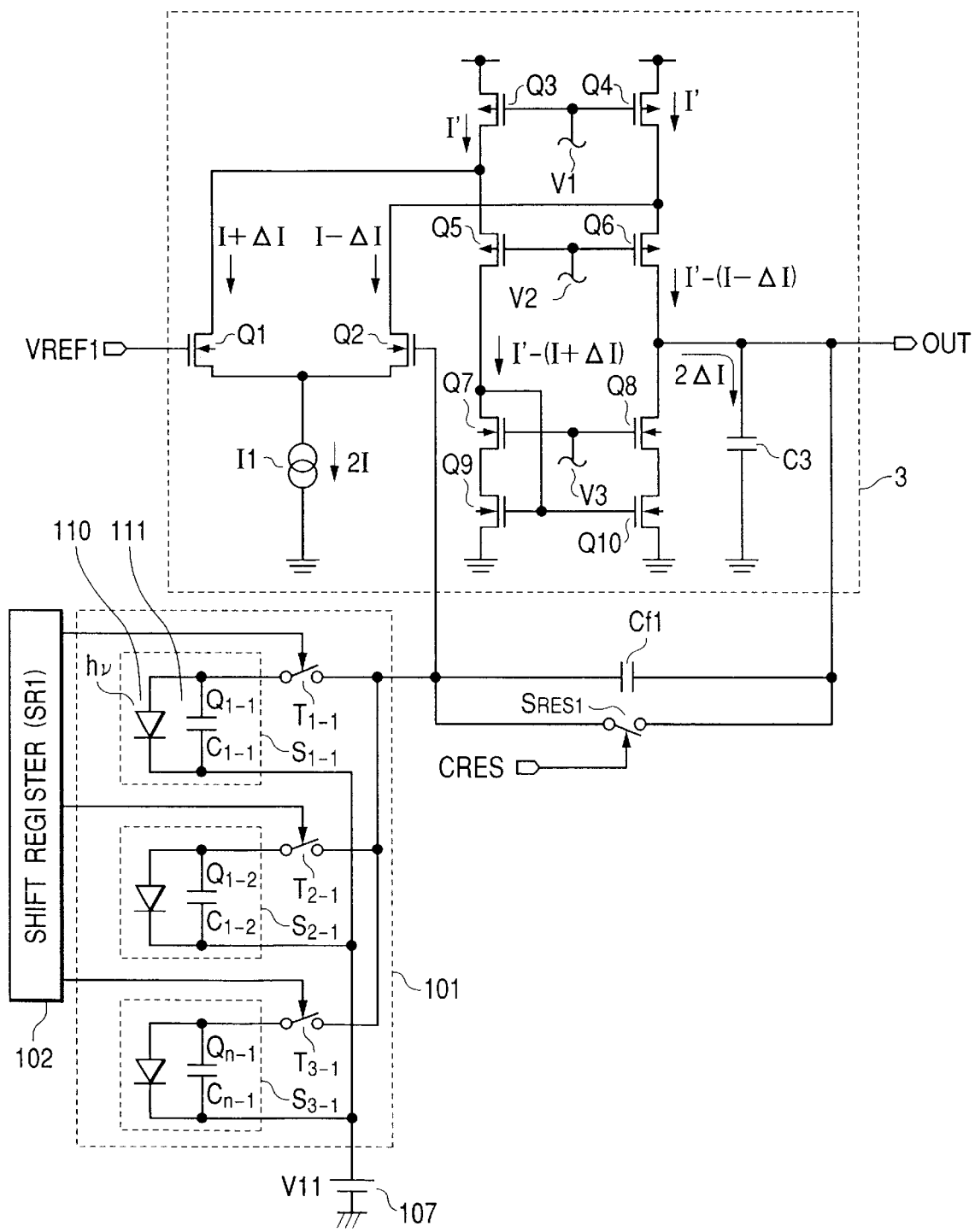
FIG. 34 is a circuit diagram of an imaging apparatus provided as a second comparative example.
Figure 35:
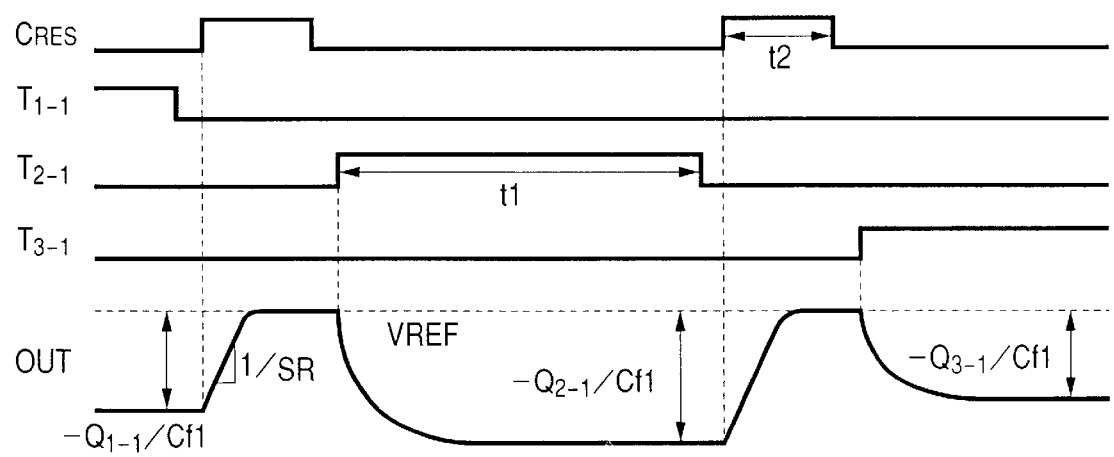
FIG. 35 is a timing chart illustrating the operation of the imaging apparatus provided as the second comparative example.

FIG. 34 is a circuit diagram of an imaging apparatus provided as a second comparative example. FIG. 35 is a timing chart illustrating the operation of the second comparative example shown in FIG. 34.

The first comparative example differs from the sixteenth and eighteenth embodiments in that the first comparative example contains no equivalent to the switching circuit 4, control circuit 5, switching circuit 9, and control circuit 10 of the sixteenth or eighteenth embodiment.

In FIG. 32, reference characters $C_{1-1}$ to $C_{3-1}$ denote the value of interelectrode capacitance 111, and V11 denotes a voltage value of a bias supply 107.

Description of the components denoted by the same reference characters as those described above will be omitted.

Now the operation of the imaging apparatus shown in FIG. 32 will be described with reference to FIG. 33.

First, the signal charges resulting from photoelectric conversion by photo diodes $S_{1-1}$, $S_{2-1}$, $S_{3-1}$ are stored in interelectrode capacitances 111 in the photoelectric conversion elements for a certain period.

Then, as a first transfer pulse is applied to the switch $T_{1-1}$ by the shift register 102 for the time t1, the first photoelectric conversion element $S_{1-1}$ and the inverting input terminal of the operational amplifier 3 conduct, the signal charge $Q_{1-1}$ of the photo diode $D_{1-1}$ is transferred to the integral capacitor Cf1, the output of the operational amplifier 3 changes, and the output signal is transmitted to a processing circuit in the subsequent stage (read operation).

The output voltage Vo of the operational amplifier 3 at this time is given by:

$$Vo = VREF1 - Q_{1-1}/Cf1 \tag{25}$$

Also, since the operational amplifier 3 is an inverting operational amplifier, the electric charge on the interelectrode capacitance $C_{1-1}$ is initialized to the value given by Equation (26):

$$Qo = C_{1-1} \times (VREF1 - V11) \tag{26}$$

Next, in preparation for reading the signal charge of the next pixel, the reset switch $S_{RES1}$ is turned on by the control signal CRES for the time t2 to reset the signal charge $Q_{1-1}$ of the previous pixel by shorting the integral capacitor Cf1 at both ends (reset operation).

As the operational amplifier 3 operates as a buffer amplifier at this time, the output voltage Vo is given by:

$$Vo = VREF1 \tag{27}$$

Then, a second transfer pulse is applied to the switch $T_{2-1}$ by the shift register 102, and the signal charge $Q_{2-1}$ is read newly from the second photoelectric conversion element $S_{2-1}$ to the integral capacitor Cf1. Subsequently, reset and read operations are repeated in sequence until the signal charges of all the pixels are read out.

As can be seen from Equation (25), the output voltage Vo of the operational amplifier 3 changes according to the signal charges $Q_{1-1}$ to $Q_{3-1}$ of the photoelectric conversion elements $S_{1-1}$ to $S_{3-1}$ resulting from photoelectric conversion. FIG. 33 is a case in which the signal charges vary in amount. However, the photoelectric conversion element $S_{1-1}$ to $S_{3-1}$ are uniform, and thus their interelectrode capacitances $C_{1-1}$ to $C_{3-1}$ are assumed to be equal to one another.

Therefore, in an imaging apparatus for multiple pixels, the following relationship holds, where n is any integer:

$$C_{1-1} = C_{2-1} = \ldots = C_{n-1} \tag{28}$$

Thus, the time Ttotal required to read all the pixels in the imaging apparatus shown in FIG. 32 is expressed as the sum of the storage time t0 of the signal charges in the photoelectric conversion element $S_{1-1}$ to $S_{3-1}$, transfer time t1 of the signal charges for all the pixels, and reset time t2 of the integral capacitor Cf1:

$$Ttotal = t0 + (t1 + t2) \times n \tag{29}$$

In Equation (29), the storage time t0 does not depend on the total number n of pixels because all the pixels are stored at once. However, the transfer time t1 and reset time t2 of the signal charges are required for each pixel. Thus, total processing time increases if a large number of pixels are to be handled as is the case, for example, with two-dimensional photoelectric conversion apparatus. Consequently, reductions in the above-mentioned times are required of the read circuit in photoelectric conversion apparatus that need high-speed signal processing in handling moving images or the like.

On the other hand, FIG. 34, provided as a second comparative example, shows the internal circuit of an operational amplifier 3 typically used in the imaging apparatus shown in FIG. 32. FIG. 35 is a timing chart illustrating the second comparative example.

Next, the reset operation of the operational amplifier 3 will be described with reference to FIG. 34.

When the gate potentials of first inductive transistors Q1 and Q2 composing a pair of differential-input transistors change, their drain currents change as follows:

$$IQ1 = I + \Delta I \tag{30}$$

$$IQ2 = I - \Delta I \tag{31}$$

The drains of Q1 and Q2 are connected to the drains of second conductive transistors Q3 and Q4 composing a constant-current source, respectively, and the differential current is input in second conductive grounded-gate transistors Q5 and Q6. The current passing through Q5 enters a current mirror circuit consisting of first conductive transistors Q7 to Q10. The output voltage is varied when the differential current between this output current i.e., the drain current of Q8, and the current that has passed through Q6 charges and discharges the phase compensation capacitor C3.

$$IQ8=I'-(I+\Delta I) \quad (32)$$

$$IQ6=I'-(I-\Delta I) \quad (33)$$

$$IQ6-IQ8=2\Delta I \quad (34)$$

The variation in the output voltage is fed back to an inverting input terminal, i.e., a gate electrode of Q2 and stabilizes such that $\Delta I=0$.

At the moment the reset switch $S_{RES1}$ is turned on, the output terminal remains in the state in which it was when the signal of the previous pixel was output, as shown by Equation (25). Consequently, the gate potential of the transistor Q2 becomes lower than that of transistor Q1, turning on Q1 and turning off Q2. The variation in the drain current of Q1 and Q2 caused by that is given by:

$$\Delta I=I \quad (35)$$

Therefore, the phase compensation capacitor C3 is charged with the bias current 2I of the differential pair Q1 and Q2. The time required to change the output voltage by 1 V, i.e., the inverse of the slew rate SR of the operational amplifier 3 is given by Equation (36):

$$1/SR(t/V)=C3/2I \quad (36)$$

Thus, the reset time t2 must be no less than the value of Equation (36) multiplied by the maximum signal voltage Vsigmax.

$$t2>>Vsigmax/SR=Vsigmax\times(C3/2I) \quad (37)$$

It can be seen from Equation (37), that to shorten the reset time t2, either the value of the phase compensation capacitor C3 can be decreased or the value of the bias current 2I can be increased. However, since the operational amplifier 3 operates as a buffer amplifier during reset operations, a reduced phase compensation capacitor value will make the system unstable. Therefore, a relatively large value is used for C3 to stabilize the system even during reset operations, but a large bias current is needed to charge it and hence enhance the slew rate SR. However, this bias current is not desirable because it turns into a DC current which is consumed not only during the reset period but also during the read period, increasing the power consumption of the entire system.

Under the above circumstances, there has been a demand for a signal charge read circuit capable of reducing the reset time t2 and increasing the read speed of signal charges without making the system unstable by reduced phase compensation capacitor while keeping down increase in power consumption.

The time t1 required to transfer the signal charges $Q_{1-1}$ to $Q_{3-1}$ to the integral capacitor Cf1 is normally determined by the transfer efficiency of the transfer switches $T_{1-1}$ to $T_{3-1}$, i.e., a time constant T1 which in turn is determined by the product of the switch-on resistance Ron of the switches $T_{1-1}$ to $T_{3-1}$ multiplied by the sum of input capacitance C0 of the operational amplifier 3 and the integral capacitor Cf1. The transfer switches $T_{1-1}$ to $T_{3-1}$ normally consist of TFTs or the like. Since they are provided for each pixel, if the size of the switches are increased to reduce their switch-on resistance, the aperture ratio of the pixels will be reduced, lowering sensitivity. Therefore, there is a limit to the reduction of switch-on resistance. Thus, the approximate time required to secure sufficient transfer efficiency is given by:

$$t1>>5\tau 1 \quad (38)$$

$$\tau 1=Ron\times(C0+Cf2) \quad (39)$$

On the other hand, the integral capacitor Cf1 is reset by a time constant $\tau 2$—determined by the switch-on resistance of a reset switch $S_{RES1}$ and Cf1—when the switch $S_{RES2}$ is turned on. Since the switch-on resistance of the switch $S_{RES1}$ can be made sufficiently small, the time constant $\tau 2$ is not a dominant factor in determining the reset time t2, which is determined instead by the response speed of the operational amplifier 3.

The sixteenth and eighteenth embodiments, according to which the switching circuit charges and discharges the phase compensation capacitor C3 of the operational amplifier 3 forcefully to bring its potential to a desired level by turning on during a period determined by the control circuit in reset period t2, provide a more suitable operational amplifier than the first and second comparative examples.

As described above, the present invention, according to which the signal output voltage of the read circuit unit does not depend on the load capacitance of the signal lines and the signals outputted from the first operational amplifiers in the first stage of the read circuit unit are input into other operational amplifiers, can provide a signal transfer apparatus capable of amplifying the signals by subjecting the outputted signal charges to impedance conversion as required according to their use or by inputting them into still other operational amplifiers.

Also, the present invention, according to which the capacitive elements connected in series with the output terminals of the first operational amplifiers of the read circuit unit act to pass only the AC components of signals, can provide a photoelectric conversion apparatus which has achieved a high S/N ratio with a capability to cancel the KTC noise generated during reset operations as well as a signal transfer apparatus in which power consumption does not vary with the signal level.

Also, the present invention, according to which the high-frequency noise component higher than the signal pass band is shut out by low-pass filters formed by resistor elements and capacitive elements connected in series with the first operational amplifiers of the read circuit unit, can provide a signal transfer apparatus with a high S/N ratio.

Also, the present invention, according to which the operational amplifier that handles the serial conversion output of the read circuit unit reads the signal charges from sampling capacitors directly into integral capacitors, can provide a signal transfer apparatus that can reduce the number of operational amplifiers necessary for serial conversion, reducing the power consumption of the system as well as reducing fixed-pattern noise caused by increased dark current components due to heat generation, and thus realizing a high S/N ratio.

Also, the present invention, according to which a plurality of operational amplifiers can be provided for handling the serial conversion output of the read circuit unit, allowing high-speed reading, can provide a signal transfer apparatus suitable for outputting high-resolution still images as well as moving images.

Also, the present invention, according to which the read circuit unit comprises means of changing its amplification factor by using a control signal from outside, allowing gain adjustment of signal output, can provide a very versatile photoelectric conversion apparatus with a wide dynamic range sufficient to support various applications with different amounts of signal charges. Besides, it can provide an inexpensive signal transfer apparatus capable of correcting output variations of the photoelectric conversion element and producing uniform outputs.

Also, the present invention, according to which the signal charge read circuit is provided with inverting operational amplifiers, a switching circuit for forcefully charging and discharging phase compensation capacitor of the operational amplifiers during the reset period of the integral capacitor connected between the inverting input terminal and output terminal of each of the operational amplifiers to read signal charges, and a control circuit for controlling the switching circuit, resulting in a shorter reset time, can provide a signal transfer apparatus suitable for photoelectric conversion apparatus that handle a large number of pixels and need fast signal read speed, such as two-dimensional photoelectric conversion apparatus for handling moving images.

The present invention, according to which the signal output voltage of the read circuit unit does not depend on the load capacitance of the signal lines and the signals outputted from the first operational amplifiers in the first stage of the read circuit unit are input into other operational amplifiers, can provide an imaging apparatus capable of amplifying the signals by subjecting the outputted signal charges to impedance conversion as required according to their use or by inputting them into still other operational amplifiers.

Also, the present invention, according to which the capacitive elements connected in series with the output terminals of the first operational amplifiers of the read circuit unit act to pass only the AC components of signals, can provide a photoelectric conversion apparatus which has achieved a high S/N ratio with a capability to cancel the KTC noise generated during reset operations as well as an imaging apparatus in which power consumption does not vary with the signal level.

Also, the present invention, according to which the high-frequency noise higher than the signal pass band is shut out by low-pass filters formed by resistor elements and capacitive elements connected in series with the first operational amplifiers of the read circuit unit, can provide an imaging apparatus with a high S/N ratio.

Also, the present invention, according to which the operational amplifier that handles the serial conversion output of the read circuit unit reads the signal charges from sampling capacitors directly into integral capacitors, can provide an imaging apparatus that can reduce the number of operational amplifiers necessary for serial conversion, reducing the power consumption of the system as well as reducing fixed-pattern noise caused by increased dark current components due to heat generation, and thus realizing a high S/N ratio.

Also, the present invention, according to which a plurality of operational amplifiers can be provided for handling the serial conversion output of the read circuit unit, allowing high-speed reading, can provide an imaging apparatus suitable for outputting high-resolution still images as well as moving images.

Also, the present invention, according to which the read circuit unit comprises means of changing its amplification factor by using a control signal from outside, allowing gain adjustment of signal output, can provide a very versatile photoelectric conversion apparatus with a wide dynamic range sufficient to support various applications with different amounts of signal charges. Besides, it can provide an inexpensive imaging apparatus capable of correcting output variations of the photoelectric conversion element and producing uniform outputs.

Also, the present invention, according to which the signal charge read circuit is provided with inverting operational amplifiers, a switching circuit for forcefully charging and discharging phase compensation capacitor of the operational amplifiers during the reset period of the integral capacitor connected between the inverting input terminal and output terminal of each of the operational amplifiers to read signal charges, and a control circuit for controlling the switching circuit, resulting in a shorter reset time, can provide an imaging apparatus suitable for photoelectric conversion apparatus that handle a large number of pixels and need fast signal read speed, such as two-dimensional photoelectric conversion apparatus for handling moving images.

What is claimed is:
1. A signal transfer apparatus, comprising:
   a plurality of terminals connected to a plurality of signal sources; and
   a read circuit unit for converting signals received from said terminals into series signals and outputting the resulting series signals,
   wherein said read circuit unit comprises:
      first operational amplifiers connected to said terminals; and
      second operational amplifiers for receiving outputs of said first operational amplifiers, and
      each of said first operational amplifier comprises:
         an inverting input terminal connected to each of said terminals;
         an output terminal with an integral capacitor and switch being connected in parallel between it and the inverting input terminal; and
         a non-inverting input terminal supplied with a reference voltage.

2. The signal transfer apparatus according to claim 1, wherein said read circuit unit comprises:
   sampling switches for sampling output signals outputted via said first operational amplifiers;
   sampling capacitances for storing said sampled output signals; and
   read switches for reading signals from said sampling capacitances in sequence as series signals.

3. The signal transfer apparatus according to claim 2, wherein a resistor element is placed between said sampling switch and said sampling capacitance.

4. The signal transfer apparatus according to claim 2, wherein said sampling capacitances are commonly connected to an inverting input terminal of a third operational amplifier via said read switches, an integral capacitor and reset switch are connected between the inverting input terminal and an output terminal of said third operational amplifier, and a non-inverting input terminal of the third operational amplifier is supplied with a reference voltage.

5. The signal transfer apparatus according to claim 2, wherein said sampling capacitances are connected to any of a plurality of common output lines via said read switches, and said output signals stored in said sampling capacitances are input into third operational amplifiers connected to each of the plurality of common output lines.

6. The signal transfer apparatus according to claim 5, wherein the output terminals from said third operational amplifiers are connected to a common output terminal via respective selector switches.

7. The signal transfer apparatus according to claim 1,
wherein said second operational amplifier comprises:
a non-inverting input terminal supplied with a reference voltage; and
an inverting input terminal for receiving outputs of said first operational amplifier.

8. The signal transfer apparatus according to claim 7,
wherein an integral capacitor and reset switch are connected between said inverting input terminal and output terminal of said second operational amplifier.

9. The signal transfer apparatus according to claim 8,
wherein said read circuit unit comprise a circuit for controlling switching times of said reset switch of said first operational amplifier and a reset switch of said second operational amplifier.

10. The signal transfer apparatus according to claim 1,
wherein a capacitive element is placed between said output terminal of said first operational amplifier and said inverting input terminal of said second operational amplifier.

11. The signal transfer apparatus according to claim 1,
wherein a resistor element is placed between said first operational amplifier and said second operational amplifier.

12. The signal transfer apparatus according to claim 1,
wherein said first operational amplifiers or second operational amplifiers are provided with a capability to change their amplification factor by using a control signal from outside.

13. The signal transfer apparatus according to claim 1,
wherein said first operational amplifier is connected with an integral capacitor and a switch which are connected in parallel between said inverting input terminal and said output terminal, and
said signal transfer apparatus is provided with: a switching circuit for charging and discharging phase compensation capacitor of said operational amplifier; and a control circuit for controlling said switching circuit according to the operation of said reset switch.

14. A signal transfer apparatus comprising an operational amplifier,
wherein said operational amplifier comprises:
an inverting input terminal and output terminal with an integral capacitor and reset switch being connected in parallel between them; and
a non-inverting input terminal supplied with a reference voltage, and
said signal transfer apparatus is provided with: a switching circuit for charging and discharging phase compensation capacitor of said operational amplifier; and a control circuit for controlling said switching circuit according to the operation of said reset switch.

15. The signal transfer apparatus according to claim 14,
wherein said switching circuit comprises a power supply and switching element.

16. The signal transfer apparatus according to claim 15,
wherein said switching circuit comprises a level shift circuit, which is connected to said power supply.

17. The signal transfer apparatus according to claim 14,
wherein said switching circuit comprises a constant-current circuit and switching element.

18. The signal transfer apparatus according to claim 14,
wherein said control circuit comprises a delay circuit.

19. The signal transfer apparatus according to claim 18,
wherein said delay circuit comprises an inverter.

20. The signal transfer apparatus according to claim 18,
wherein said delay circuit comprises a shift register.

21. The signal transfer apparatus according to claim 18,
wherein said delay circuit consists of a time constant circuit.

22. The signal transfer apparatus according to claim 14,
wherein said control circuit comprises a voltage comparator and latch circuit.

23. An imaging apparatus, comprising:
a circuit unit which contains conversion elements for converting at least either incident light or rays into electrical signals;
a signal transfer circuit unit for transferring signals from said circuit unit;
first operational amplifiers connected to said circuit unit; and
second operational amplifiers which receive the output of the first operational amplifier,
wherein an inverting input terminal is connected to said circuit unit, an integral capacitor and switch are connected between the inverting input terminal and output terminal of each of said first operational amplifier, and a non-inverting input terminal is connected to a reference voltage source.

24. The imaging apparatus according to claim 23, comprising:
sampling switches for sampling output signals outputted via said first operational amplifiers;
sampling capacitances for storing said sampled output signals; and
read switches for reading signals from said sampling capacitances in sequence as series signals.

25. The imaging apparatus according to claim 24,
wherein a resistor element is placed between said sampling switch and said sampling capacitance.

26. The imaging apparatus according to claim 24,
wherein said sampling capacitances are commonly connected to an inverting input terminal of a third operational amplifier via said read switches, an integral capacitor and reset switch are connected between the inverting input terminal and an output terminal of said third operational amplifier, and a non-inverting input terminal of the third operational amplifier is supplied with a reference voltage.

27. The imaging apparatus according to claim 24,
wherein said sampling capacitances are connected to any of a plurality of common output lines via said read switches, and said output signals stored in said sampling capacitances are input into third operational amplifiers connected to each of the plurality of common output lines.

28. The imaging apparatus according to claim 27,
wherein the output terminals from said third operational amplifiers are connected to a common output terminal via respective selector switches.

29. The imaging apparatus according to claim 23,
wherein said second operational amplifier comprises a non-inverting input terminal supplied with a reference voltage, and an inverting input terminal for receiving an output of said first operational amplifier.

30. The imaging apparatus according to claim 29,
wherein an integral capacitor and reset switch are connected between said inverting input terminal and output terminal of said second operational amplifier.

31. The imaging apparatus according to claim 30, further comprising a circuit for controlling switching times of said switch of said first operational amplifier and a reset switch of said second operational amplifier.

32. The imaging apparatus according to claim 23,
wherein a capacitive element is placed between said output terminal of said first operational amplifier and said inverting input terminal of said second operational amplifier.

33. The imaging apparatus according to claim 23,
wherein a resistor element is placed between said first operational amplifier and said second operational amplifier.

34. The imaging apparatus according to claim 23,
wherein said first operational amplifiers or second operational amplifiers are provided with a capability to change their amplification factor by using a control signal from outside.

35. The imaging apparatus according to claim 23,
wherein said operational amplifier is provided with a phase compensation capacitor, a switching circuit for charging and discharging said phase compensation capacitor, and a control circuit for controlling said switching circuit according to the operation of said reset switch.

36. The imaging apparatus according to any one of claims 23 or 35,
wherein said circuit unit comprises matrix signal wirings.

37. The imaging apparatus according to any one of claims 23 or 35,
wherein said circuit unit comprises thin-film photoelectric conversion elements and thin-film switching elements.

38. The imaging apparatus according to any one of claims 23 or 35,
wherein said circuit unit comprises photoelectric conversion elements and a light emitting substance which emits light in response to radiation.

39. A radiation image pick-up system, comprising:
an imaging apparatus according to claim 38
signal processing means for processing signals from said imaging apparatus;
recording means for recording signals from said signal processing means;
display means for displaying signals from said signal processing means;
transmission processing means for transmitting signals from said signal processing means; and
a radiation source for generating said radiation.

40. An imaging apparatus, comprising:
a circuit unit containing conversion elements for converting at least either incident light or rays into electrical signals; and
a signal transfer circuit unit for transferring signals from the above described circuit unit,
wherein the above described circuit unit is connected with inverting input terminals of operational amplifiers of the above described signal transfer circuit unit,
an integral capacitor and reset switch are connected in parallel between an output terminal and inverting input terminal of each of the above described operational amplifiers,
a non-inverting input terminal of the operational amplifier is connected with a reference voltage source and
the above described signal transfer circuit unit is provided with a switching circuit for charging and discharging phase compensation capacitor of the above described operational amplifiers, and a control circuit for controlling the above described switching circuit according to the operation of the above described reset switches.

41. The imaging apparatus according to claim 40,
wherein said switching circuit comprises a power supply and switching element.

42. The imaging apparatus according to claim 41,
wherein said switching circuit comprises a level shift circuit, which is connected to said power supply.

43. The imaging apparatus according to claim 40,
wherein said switching circuit comprises a constant-current circuit and switching element.

44. The imaging apparatus according to claim 40,
wherein said control circuit comprises a delay circuit.

45. The imaging apparatus according to claim 44,
wherein said delay circuit comprises an inverter.

46. The imaging apparatus according to claim 44,
wherein said delay circuit comprises a shift register.

47. The imaging apparatus according to claim 44,
wherein said delay circuit consists of a time constant circuit.

48. The imaging apparatus according to claim 40,
wherein said control circuit comprises a voltage comparator and latch circuit.

* * * * *

UNITED STATES PATENT AND TRADEMARK OFFICE
CERTIFICATE OF CORRECTION

PATENT NO.    : 6,538,591 B2
DATED         : March 25, 2003
INVENTOR(S)   : Toshiaki Sato et al.

It is certified that error appears in the above-identified patent and that said Letters Patent is hereby corrected as shown below:

Column 9,
Line 24, "a" should be deleted.

Column 19,
Line 61, "attempt" should read -- attempts --.

Column 21,
Line 63, "many" should read -- may --.

Column 27,
Line 15, "doctor" should read -- doctor's --.

Column 33,
Line 12, "comprise" should read -- comprises --.

Column 35,
Line 39, "claim 38" should read -- claim 38, --.

Signed and Sealed this

Twenty-eighth Day of October, 2003

JAMES E. ROGAN
*Director of the United States Patent and Trademark Office*